(12) United States Patent
Kaneko et al.

(10) Patent No.: US 7,472,136 B2
(45) Date of Patent: Dec. 30, 2008

(54) DATA STRUCTURE OF METADATA OF MOVING IMAGE AND REPRODUCTION METHOD OF THE SAME

(75) Inventors: Toshimitsu Kaneko, Kanagawa (JP); Tooru Kamibayashi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 178 days.

(21) Appl. No.: 11/065,558

(22) Filed: Feb. 25, 2005

(65) Prior Publication Data

US 2005/0283490 A1 Dec. 22, 2005

(30) Foreign Application Priority Data

Jun. 17, 2004 (JP) ............................. 2004-180266

(51) Int. Cl.
*G06F 17/30* (2006.01)
(52) U.S. Cl. .................. 707/104.1; 707/101; 707/3; 707/102
(58) Field of Classification Search .............. None
See application file for complete search history.

(56) References Cited

U.S. PATENT DOCUMENTS 6,405,256 B1 * 6/2002 Lin et al. .................. 709/231
6,748,158 B1 * 6/2004 Jasinschi et al. ............. 386/69
6,876,668 B1 * 4/2005 Chawla et al. .............. 370/468
6,970,639 B1 * 11/2005 McGrath et al. ............. 386/52
7,194,563 B2 * 3/2007 Plourde, Jr. ................. 710/52
2002/0052947 A1 * 5/2002 Duimovich et al. ......... 709/224

FOREIGN PATENT DOCUMENTS

JP 2000-285253 10/2000
JP 2001-111996 4/2001
JP 2004-120440 4/2004

OTHER PUBLICATIONS

U.S. Appl. No. 11/065,558, filed Feb. 25, 2005, Kaneko et al.
U.S. Appl. No. 11/094,445, filed Mar. 31, 2005, Kaneko et al.

* cited by examiner

*Primary Examiner*—Cam Y T Truong
(74) *Attorney, Agent, or Firm*—Oblon, Spivak, McClelland, Maier & Neustadt, P.C.

(57) ABSTRACT

There is provided an invention in which a buffer size and a data buffering size before a reproduction start can be determined according to a transfer rate of data and a network protocol used. In metadata of a moving image, a dynamic range of a data amount in a buffer is described, and the buffer size and the data buffering size before the reproduction start of the metadata are determined by this dynamic range.

6 Claims, 41 Drawing Sheets

ACTION ATTRIBUTE OF OBJECT

| FIELD | NUMBER OF BITS | NUMBER OF BYTES | VALUE | COMMENT |
|---|---|---|---|---|
| attribute_id | 16 | 2 | 01h | bit string |
| data_length | 16 | 2 | variable | unsigned integer |
| script_language | 8 | 1 | variable | bit string |
| script_length | >=8 | >=1 | variable | unsigned integer |
| script | script_length*8 | script_length | variable | char string |

| TIME STAMP | ACCESS POINT |
|---|---|
| time #1 | offset #1 |
| time #2 | offset #2 |
| time #3 | offset #3 |
| time #4 | offset #4 |
| ⋮ | ⋮ |
| time #n | offset #n |

F I G. 9
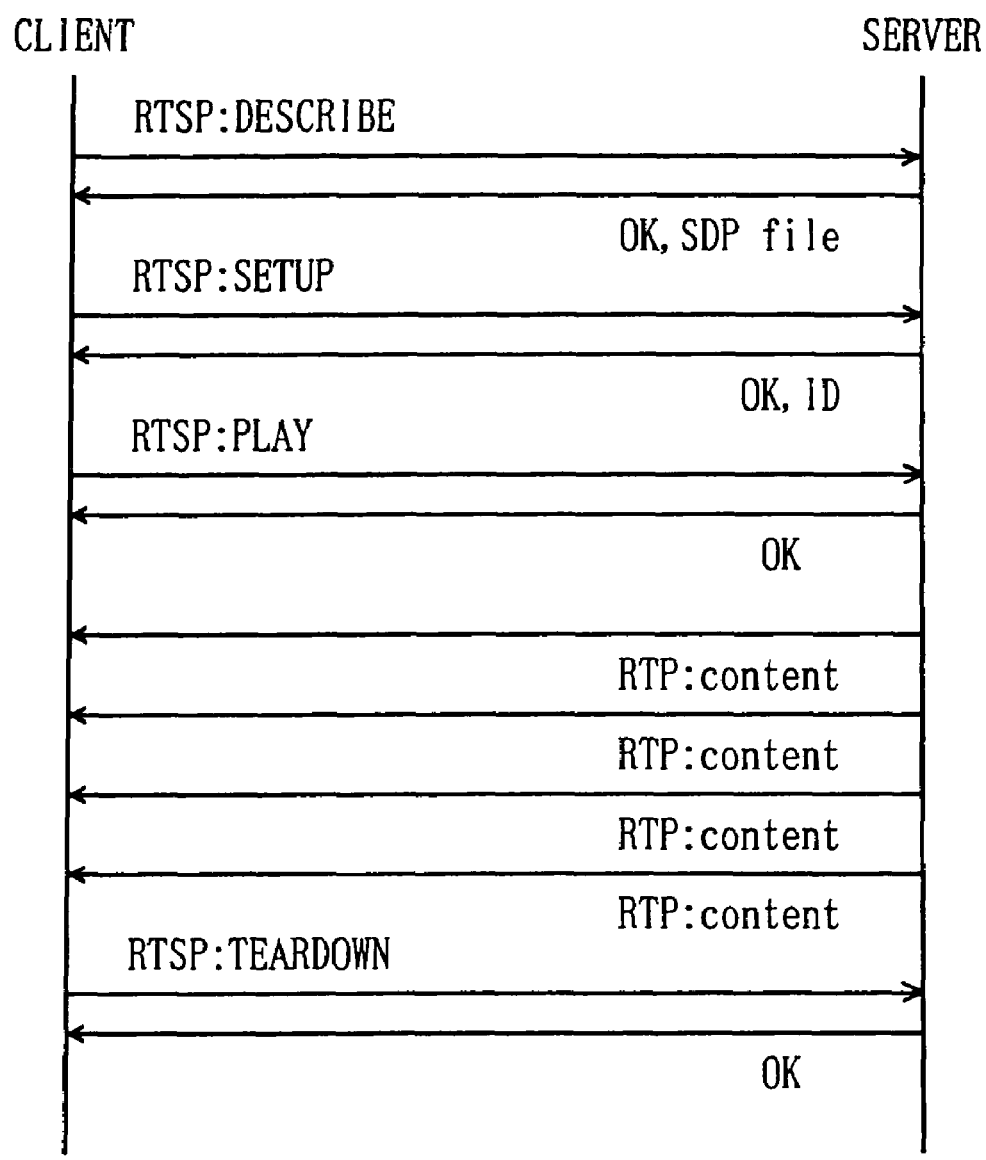

FIG. 11

HEADER OF Vclick STREAM

| FIELD | NUMBER OF BITS | NUMBER OF BYTES | VALUE | COMMENT |
|---|---|---|---|---|
| vclick_version | 16 | 2 | 02h | bit string |
| vclick_length | 32 | 4 | variable | unsigned integer |

FIG. 12

HEADER OF Vclick AU

| FIELD | NUMBER OF BITS | NUMBER OF BYTES | VALUE | COMMENT |
|---|---|---|---|---|
| vau_start_code | 16 | 2 | fixed | bit string |
| vau_length | 16 | 2 | variable | unsigned integer |
| vau_id | 16 | 2 | variable | bit string |
| object_id | 16 | 2 | 0000h to ffffh | bit string |
| object_subid | 16 | 2 | 0000h to ffffh | bit string |
| contine_falg | 2 | 1 | variable | bit string |
| reserved | 6 | | 000000b | bit string |
| layer | 8 | 1 | 0 to 255 | unsigned char |

FIG. 13

TIME STAMP OF Vclick AU

| FIELD | NUMBER OF BITS | NUMBER OF BYTES | VALUE | COMMENT |
|---|---|---|---|---|
| time_type | 16 | 2 | 0001h | bit string |
| VTSN | 8 | 1 | 1 to 99 | unsigned integer |
| TTN | 16 | 2 | 1 to 99 | TTN for TT_DOM (SRPM(4)) |
| VTS_TTN | 16 | 2 | 1 to 99 | VTS_TTN for TT_DOM (SRPM(5)) |
| TT_PGCN | 16 | 2 | variable | TT_PGCN for TT_DOM (SRPM(6)) |
| PTTN | 16 | 2 | 1 to 99 | part_of_Title number for One_Sequential_PGC_Title (SRPM(7)) |
| CN | 8 | 1 | 1 to 255 | Cell number |
| AGLN | 8 | 1 | 1 to 9 | angle number |
| '0010' | 4 | | 0010b | bit string |
| PTS [32..30] | 3 | 5 | variable | bit string |
| marker_bit | 1 | | 1 | bit string |
| PTS [29..15] | 15 | | variable | bit string |
| marker_bit | 1 | | 1 | bit string |
| PTS [14..0] | 15 | | variable | bit string |
| marker_bit | 1 | | 1 | bit string |

FIG. 14

TIME STAMP SKIP OF Vclick AU

| FIELD | NUMBER OF BITS | NUMBER OF BYTES | VALUE | COMMENT |
|---|---|---|---|---|
| time_type | 16 | 2 | 0000h | bit string |

FIG. 15

OBJECT ATTRIBUTE INFORMATION

| FIELD | NUMBER OF BITS | NUMBER OF BYTES | VALUE | COMMENT |
|---|---|---|---|---|
| attribute_length | 16 | 2 | variable | unsigned integer |
| data_bytes | variable | variable | | |

FIG. 16

KIND OF OBJECT ATTRIBUTE INFORMATION

| CATEGORY | ATTRIBUTE | VALUE OF attribute_id | MAXIMUM VALUE |
|---|---|---|---|
| NAME | NAME | 00h | 1 |
| ACTION | ACTION | 01h | 1 |
| CONTOUR | CONTOUR | 02h | 1 |
| AREA | BLINKING AREA | 03h | MAXIMUM AND ONLY ONE ATTRIBUTE EXISTS AMONG THREE |
| | MOSAIC AREA | 04h | |
| | FILLED-IN AREA | 05h | |
| TEXT | TEXT INFORMATION | 06h | 1 |
| | TEXT ATTRIBUTE | 07h | 1 |
| | HIGHLIGHT EFFECT | 08h | MAXIMUM AND ONE ATTRIBUTE AMONG FOUR EXISTS SIMULTANEOUSLY WITH timetext_text |
| | BLINKING EFFECT | 09h | |
| | SCROLL EFFECT | 0ah | |
| | KARAOKE EFFECT | 0bh | |
| LAYER EXTENSION | LAYER EXTENSION | 0ch | 1 |

F I G. 1 7

NAME ATTRIBUTE OF OBJECT

| FIELD | NUMBER OF BITS | NUMBER OF BYTES | VALUE | COMMENT |
|---|---|---|---|---|
| attribute_id | 16 | 2 | 00h | bit string |
| data_length | 16 | 2 | variable | unsigned integer |
| language | 16 | 2 | variable | ISO-639 |
| name_length | >=8 | >=1 | variable | unsigned integer |
| name | name_length*8 | name_length | variable | char string |
| annotation_length | >=8 | >=1 | variable | unsigned integer |
| annotation | annotation_length*8 | annotation_length | variable | char string |

FIG. 18

ACTION ATTRIBUTE OF OBJECT

| FIELD | NUMBER OF BITS | NUMBER OF BYTES | VALUE | COMMENT |
|---|---|---|---|---|
| attribute_id | 16 | 2 | 01h | bit string |
| data_length | 16 | 2 | variable | unsigned integer |
| script_language | 8 | 1 | variable | bit string |
| script_length | >=8 | >=1 | variable | unsigned integer |
| script | script_length*8 | script_length | variable | char string |

FIG. 19

CONTOUR ATTRIBUTE OF OBJECT

| FIELD | NUMBER OF BITS | NUMBER OF BYTES | VALUE | COMMENT |
|---|---|---|---|---|
| attribute_id | 16 | 2 | 02h | bit string |
| data_length | 16 | 2 | 5 | unsigned integer |
| color_r | 8 | 4 | 0 to 255 | unsigned char |
| color_g | 8 | | 0 to 255 | unsigned char |
| color_b | 8 | | 0 to 255 | unsigned char |
| color_a | 8 | | 0 to 255 | unsigned char |
| line_type | 8 | 1 | 0 to 255 | bit string |
| thickness | 8 | 1 | 0 to 255 | unsigned char |

FIG. 20

BLINKING AREA ATTRIBUTE OF OBJECT

| FIELD | NUMBER OF BITS | NUMBER OF BYTES | VALUE | COMMENT |
|---|---|---|---|---|
| attribute_id | 16 | 2 | 03h | bit string |
| data_length | 16 | 2 | 5 | unsigned integer |
| color_r | 8 | 4 | 0 to 255 | unsigned char |
| color_g | 8 |  | 0 to 255 | unsigned char |
| color_b | 8 |  | 0 to 255 | unsigned char |
| color_a | 8 |  | 0 to 255 | unsigned char |
| interval | 8 | 1 | variable | unsigned char |

FIG. 21

MOSAIC AREA ATTRIBUTE OF OBJECT

| FIELD | NUMBER OF BITS | NUMBER OF BYTES | VALUE | COMMENT |
|---|---|---|---|---|
| attribute_id | 16 | 2 | 04h | bit string |
| data_length | 16 | 2 | 2 | unsigned integer |
| mosaic_size | 8 | 1 | 1 to 255 | unsigned char |
| randomness | 8 | 1 |  | unsigned char |

FIG. 22

FILLED-IN AREA ATTRIBUTE OF OBJECT

| FIELD | NUMBER OF BITS | NUMBER OF BYTES | VALUE | COMMEMT |
|---|---|---|---|---|
| attribute_id | 16 | 2 | 05h | bit string |
| data_length | 16 | 2 | 4 | unsigned integer |
| color_r | 8 | | 0 to 255 | unsigned char |
| color_g | 8 | | 0 to 255 | unsigned char |
| color_b | 8 | 4 | 0 to 255 | unsigned char |
| color_a | 8 | | 0 to 255 | unsigned char |

FIG. 23

TEXT INFORMATION OF OBJECT

| FIELD | NUMBER OF BITS | NUMBER OF BYTES | VALUE | COMMEMT |
|---|---|---|---|---|
| attribute_id | 16 | 2 | 05h | bit string |
| data_length | 16 | 2 | variable | unsigned integer |
| language | 16 | 2 | variable | ISO-639 |
| char_code | 4 | | variable | bit string |
| reserved | 1 | 1 | fixed | bit |
| direction | 3 | | variable | bit string |
| text_length | >=8 | >=1 | variable | unsigned integer |
| text | text_length*8 | text_length | variable | char string |

FIG. 24

TEXT ATTRIBUTE OF OBJECT

| FIELD | NUMBER OF BITS | NUMBER OF BYTES | VALUE | COMMENT |
|---|---|---|---|---|
| attribute_id | 16 | 2 | 07h | bit string |
| data_length | 16 | 2 | variable | unsigned integer |
| font_type_length | >=8 | >=1 | variable | unsigned integer |
| font_type | font_length*8 | font_length | variable | char string |
| font_size | 8 | 1 | variable | unsigned char |
| color_r | 8 | | 0 to 255 | unsigned char |
| color_g | 8 | | 0 to 255 | unsigned char |
| color_b | 8 | 4 | 0 to 255 | unsigned char |
| color_a | 8 | | 0 to 255 | unsigned char |

FIG. 25

TEXT HIGHLIGHT EFFECT ATTRIBUTE OF OBJECT

| FIELD | NUMBER OF BITS | NUMBER OF BYTES | VALUE | COMMENT |
|---|---|---|---|---|
| attribute_id | 16 | 2 | 08h | bit string |
| data_length | 16 | 2 | variable | unsigned integer |
| entry | >=8 | 1 | variable | unsigned integer |
| highlight_entries | | | | |

FIG. 26

ENTRY OF TEXT HIGHLIGHT EFFECT ATTRIBUTE OF OBJECT

| FIELD | NUMBER OF BITS | NUMBER OF BYTES | VALUE | COMMEMT |
|---|---|---|---|---|
| start_position | >=8 | variable | variable | bit string |
| end_position | >=8 | variable | variable | unsigned integer |
| color_r | 8 | 4 | 0 to 255 | unsigned char |
| color_g | 8 | | 0 to 255 | unsigned char |
| color_b | 8 | | 0 to 255 | unsigned char |
| color_a | 8 | | 0 to 255 | unsigned char |

FIG. 27

TEXT BLINKING EFFECT ATTRIBUTE OF OBJECT

| FIELD | NUMBER OF BITS | NUMBER OF BYTES | VALUE | COMMEMT |
|---|---|---|---|---|
| attribute_id | 16 | 2 | 09h | bit string |
| data_length | 16 | 2 | variable | unsigned integer |
| entry | 8 | 1 | variable | unsigned integer |
| blink_entries | | | | |

FIG. 28

ENTRY OF TEXT BLINKING EFFECT ATTRIBUTE OF OBJECT

| FIELD | NUMBER OF BITS | NUMBER OF BYTES | VALUE | COMMEMT |
|---|---|---|---|---|
| start_position | >=8 | variable | variable | unsigned integer |
| end_position | >=8 | variable | variable | unsigned integer |
| color_r | 8 | | 0 to 255 | unsigned char |
| color_g | 8 | | 0 to 255 | unsigned char |
| color_b | 8 | 4 | 0 to 255 | unsigned char |
| color_a | 8 | | 0 to 255 | unsigned char |
| interval | 8 | 1 | variable | unsigned char |

FIG. 29

TEXT SCROLL EFFECT ATTRIBUTE OF OBJECT

| FIELD | NUMBER OF BITS | NUMBER OF BYTES | VALUE | COMMEMT |
|---|---|---|---|---|
| attribute_id | 16 | 2 | 0ah | bit string |
| data_length | 16 | 2 | 2 | unsigned integer |
| direction | 8 | 1 | variable | bit string |
| delay | 8 | 1 | variable | unsigned integer |

FIG. 30

TEXT CARAOKE EFFECT ATTRIBUTE OF OBJECT

| FIELD | NUMBER OF BITS | NUMBER OF BYTES | VALUE | COMMEMT |
|---|---|---|---|---|
| attribute_id | 16 | 2 | 0bh | bit string |
| data_length | 16 | 2 | variable | unsigned integer |
| start_time | >=8 | variable | variable | unsigned integer |
| entry | >=8 | variable | variable | unsigned integer |
| karaoke_entries | | | | |

FIG. 31

ENTRY OF TEXT CARAOKE EFFECT ATTRIBUTE OF OBJECT

| FIELD | NUMBER OF BITS | NUMBER OF BYTES | VALUE | COMMEMT |
|---|---|---|---|---|
| end_time | >=8 | variable | variable | unsigned integer |
| start_position | >=8 | variable | variable | unsigned integer |
| end_position | >=8 | variable | variable | unsigned integer |

FIG. 32

LAYER ATTRIBUTE EXTENSION OF OBJECT

| FIELD | NUMBER OF BITS | NUMBER OF BYTES | VALUE | COMMEMT |
|---|---|---|---|---|
| attribute_id | 16 | 2 | 0ch | bit string |
| data_length | 16 | 2 | variable | unsigned integer |
| start_time | >=8 | variable | variable | unsigned integer |
| entry | >=8 | >=1 | variable | unsigned integer |
| layer_entries | | | | |

FIG. 33

ENTRY OF LAYER ATTRIBUTE EXTENSION OF OBJECT

| FIELD | NUMBER OF BITS | NUMBER OF BYTES | VALUE | COMMEMT |
|---|---|---|---|---|
| end_time | >=8 | variable | variable | bit string |
| layer | 8 | 1 | variable | unsigned integer |

FIG. 34

OBJECT AREA DATA OF Vclick AU

| FIELD | NUMBER OF BITS | NUMBER OF BYTES | VALUE | COMMEMT |
|---|---|---|---|---|
| vcr_start_code | 16 | 2 | variable | bit string |
| data_length | 16 | 2 | variable | unsigned integer |
| data_bytes | | | | |

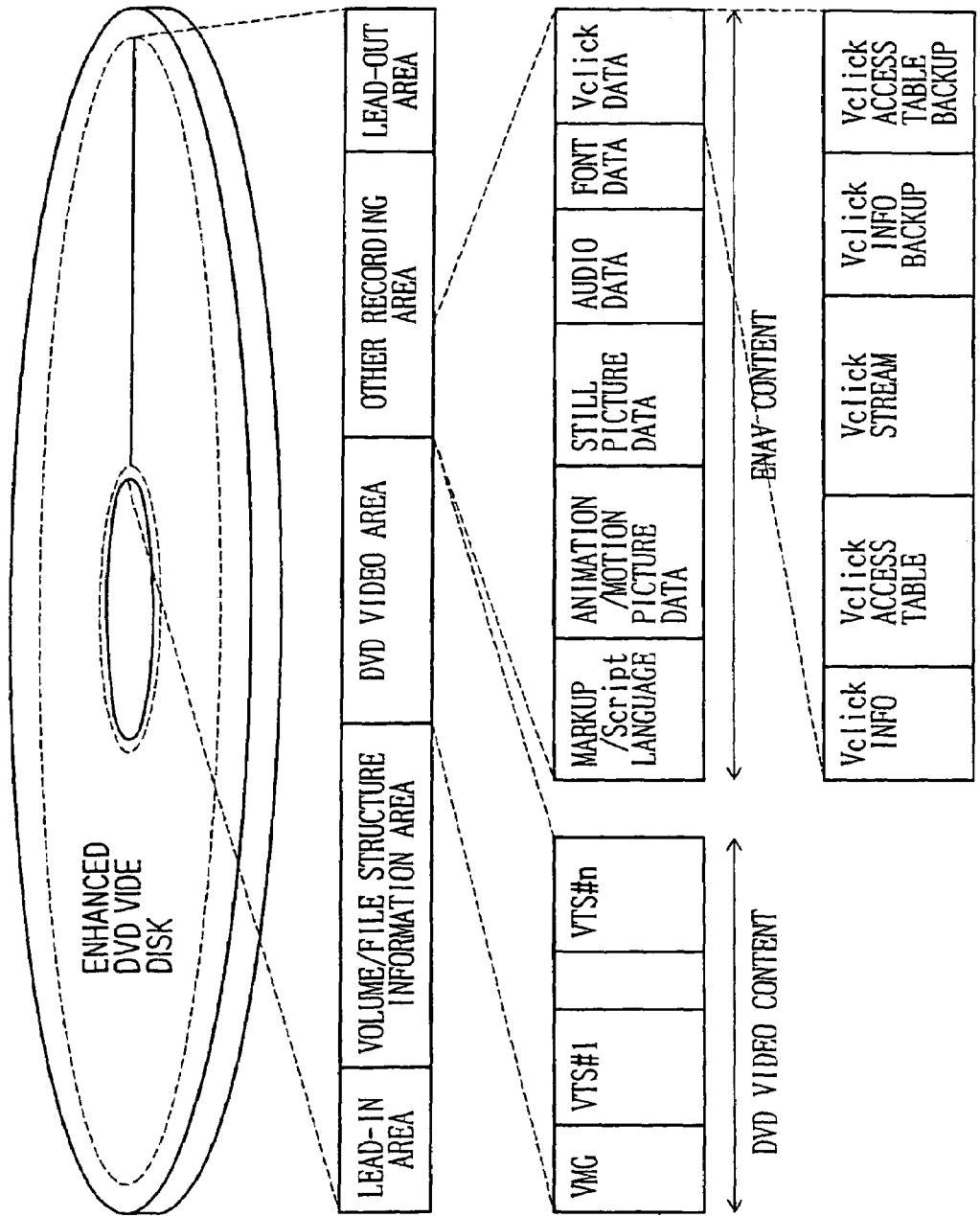

F I G. 4 1
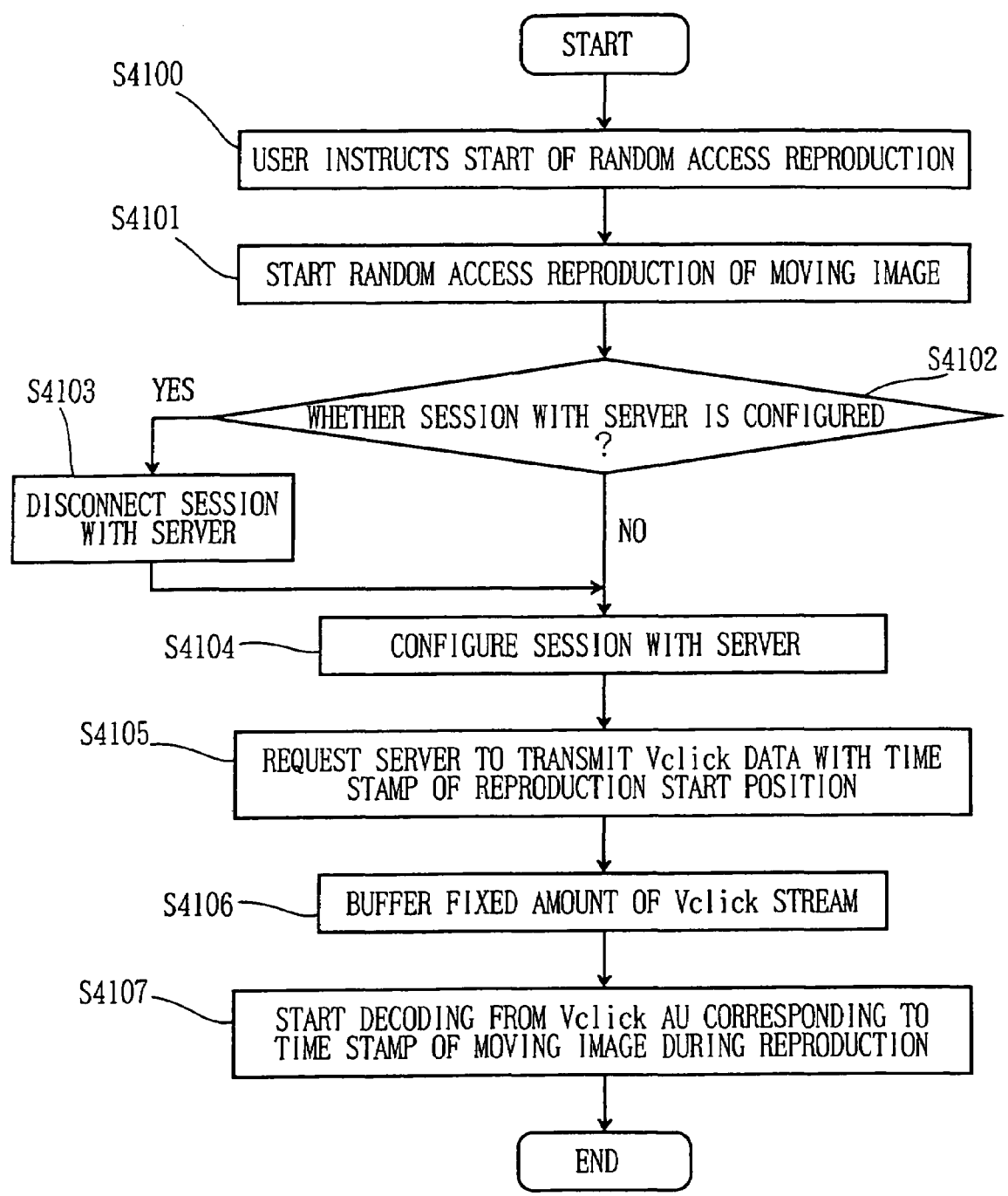

| T | $B_B$ | $B_A$ |
|---|---|---|
| 0.00 | 0.0 | 0.0 |
| 3.20 | 819.2 | 9.2 |
| 10.00 | 1750.0 | 780.0 |
| 14.50 | 1932.0 | -805.0 |
| 19.67 | 518.5 | -1480.5 |
| 28.12 | 682.7 | -275.0 |
| 34.80 | 1435.1 | 384.0 |
| 38.96 | 1449.0 | 402.0 |

F I G. 5 0
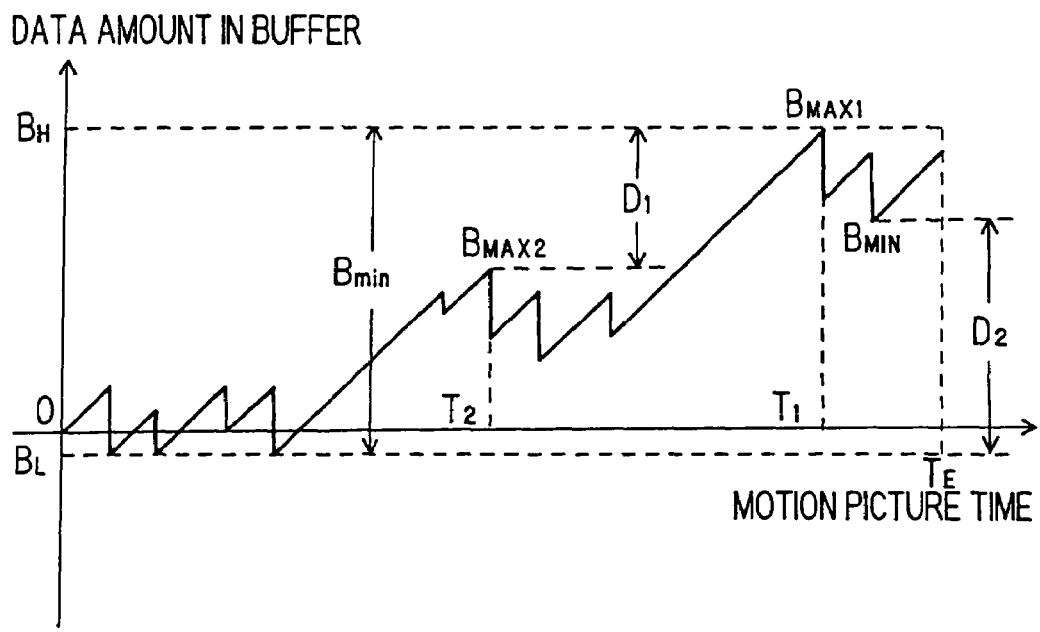
F I G. 5 1
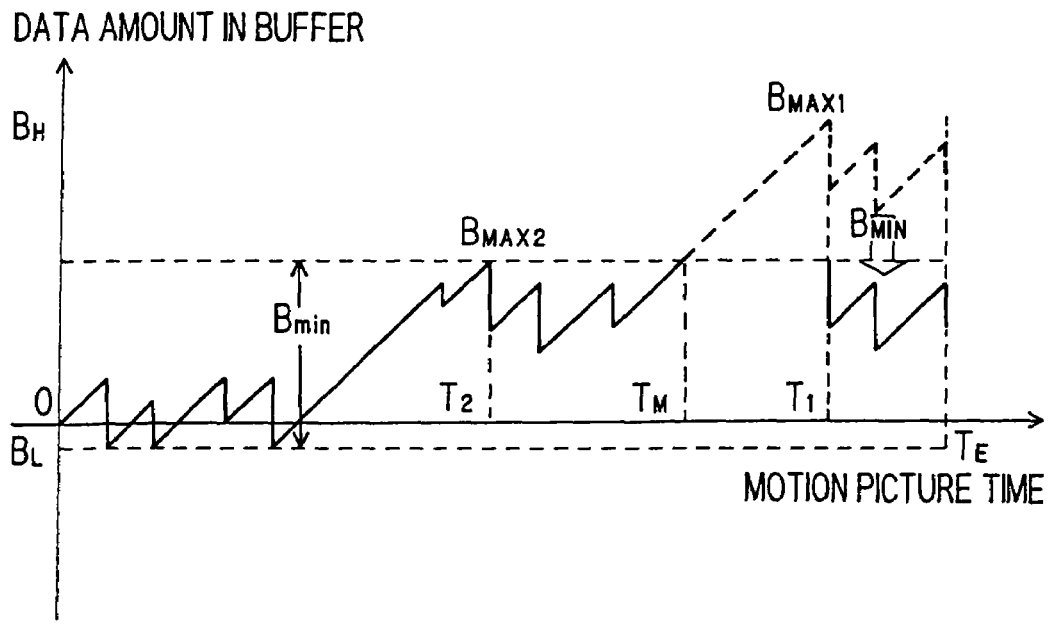

FIG. 55

HEADER OF Vclick STREAM

| FIELD | NUMBER OF BITS | NUMBER OF BYTES | VALUE | COMMEMT |
|---|---|---|---|---|
| vclick_version | 16 | 2 | 02h | bit string |
| vclick_length | 32 | 4 | variable | unsigned integer |
| min_buffer | 32 | 4 | variable | unsigned integer |

FIG. 56

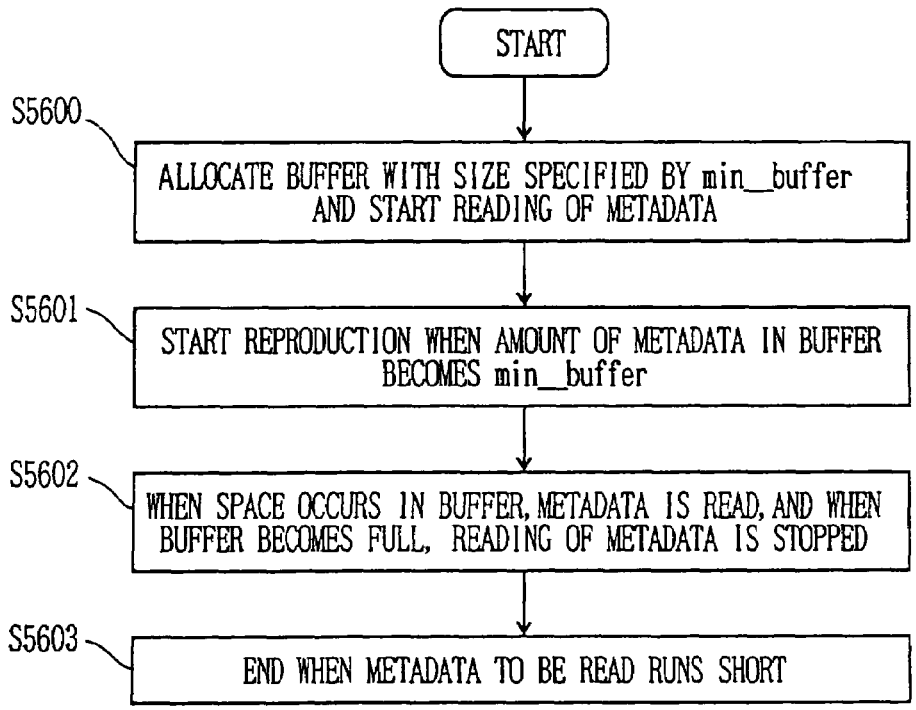

S5600: ALLOCATE BUFFER WITH SIZE SPECIFIED BY min_buffer AND START READING OF METADATA S5601: START REPRODUCTION WHEN AMOUNT OF METADATA IN BUFFER BECOMES min_buffer S5602: WHEN SPACE OCCURS IN BUFFER, METADATA IS READ, AND WHEN BUFFER BECOMES FULL, READING OF METADATA IS STOPPED

S5603: END WHEN METADATA TO BE READ RUNS SHORT

FIG. 57

HEADER OF Vclick STREAM

| FIELD | NUMBER OF BITS | NUMBER OF BYTES | VALUE | COMMEMT |
|---|---|---|---|---|
| vclick_version | 16 | 2 | 02h | bit string |
| vclick_length | 32 | 4 | variable | unsigned integer |
| min_buffer_1 | 32 | 4 | variable | unsigned integer |
| min_buffer_2 | 32 | 4 | variable | unsigned integer |

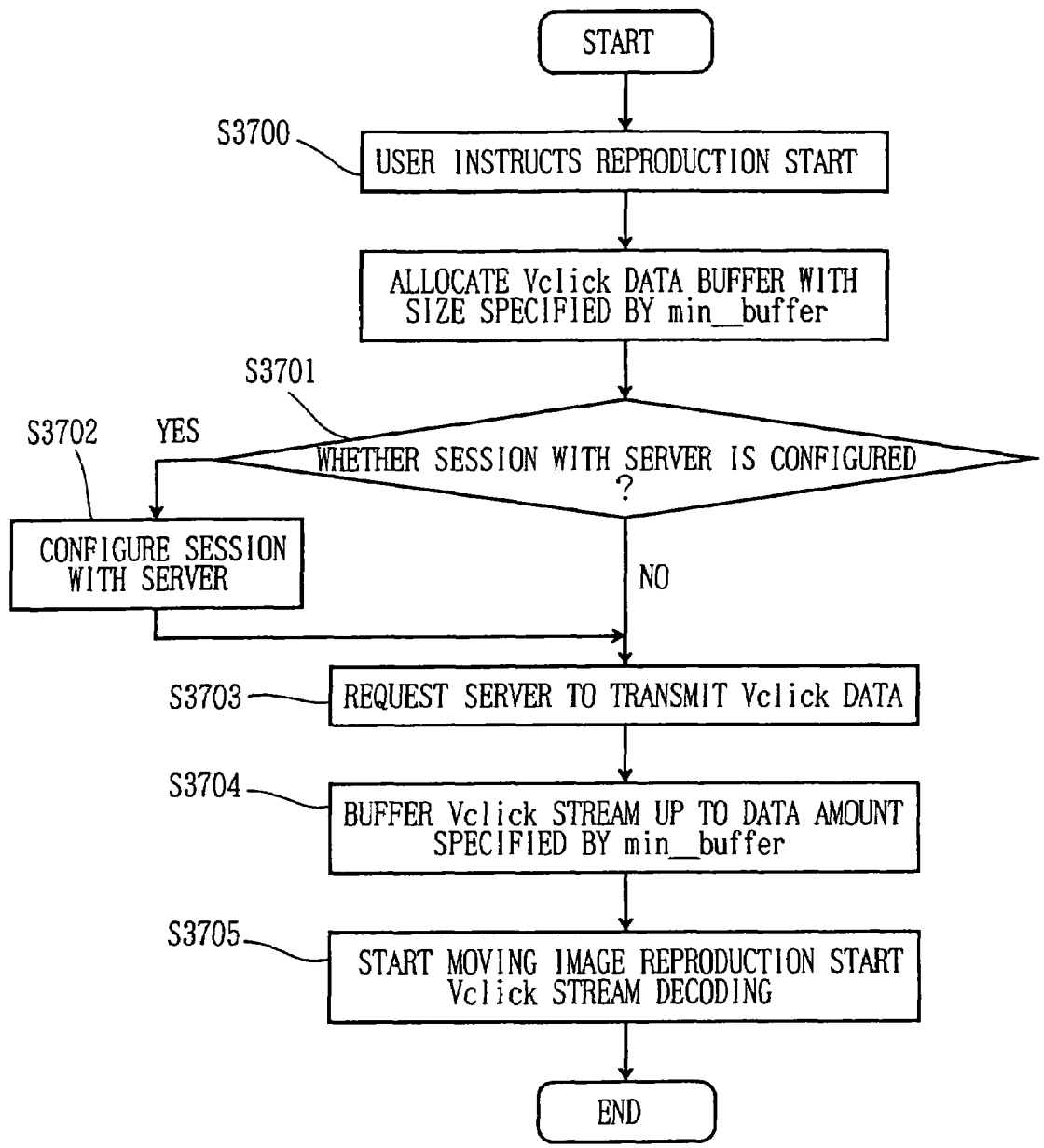

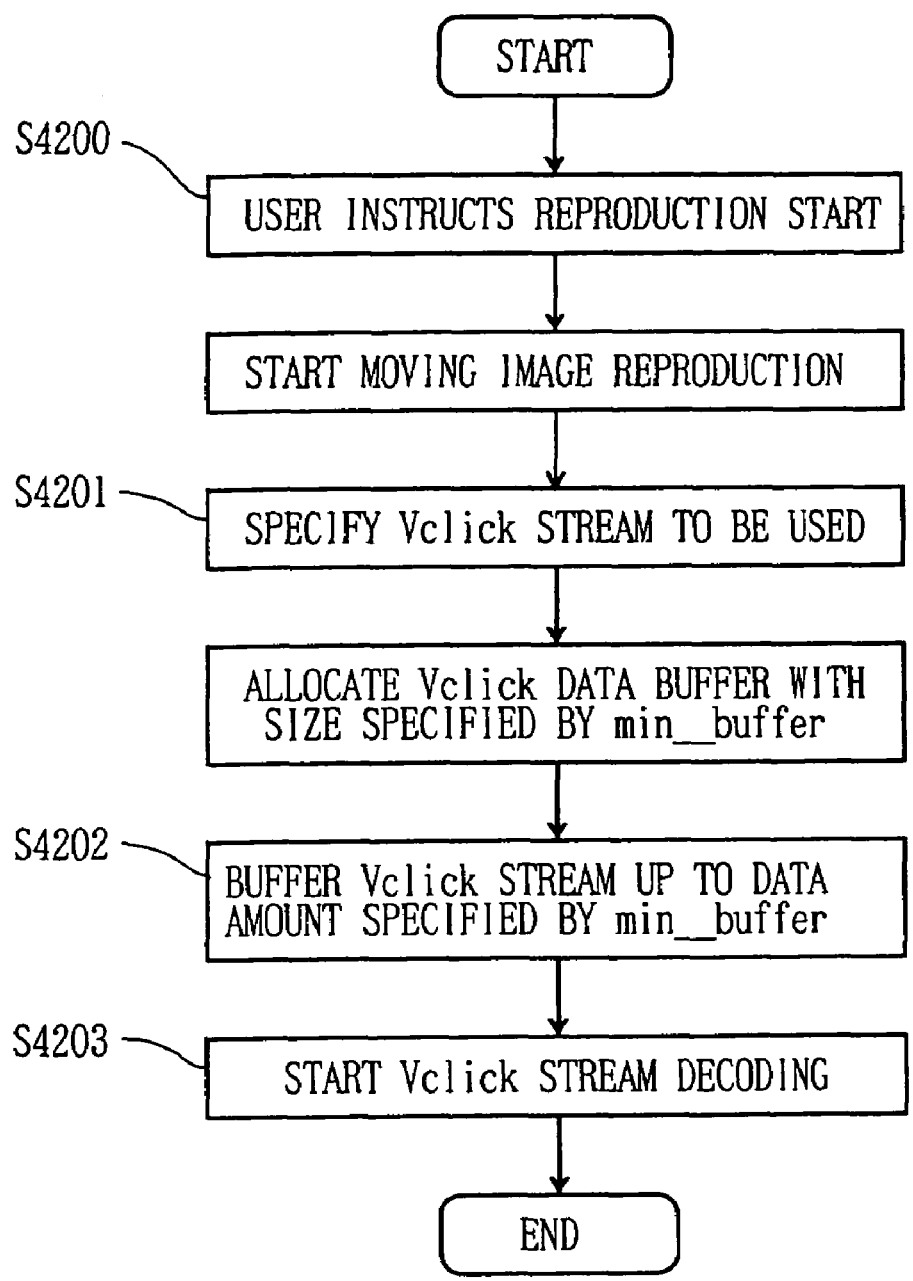

DATA STRUCTURE OF METADATA OF MOVING IMAGE AND REPRODUCTION METHOD OF THE SAME

CROSS-REFERENCE TO RELATED APPLICATIONS

This application is based upon and claims the benefit of priority from the prior Japanese Patent Application No. 2004-180266, filed on 17 June; the entire contents of which are incorporated herein by reference

TECHNICAL FIELD

The present invention relates to a data structure of metadata for realizing a moving image hypermedia by combining moving image data existing in a client apparatus and metadata existing in the client apparatus or a server apparatus on a network and for displaying a telop or a balloon on a moving image, and relates to a reproduction method of the same.

BACKGROUND OF THE INVENTION

A hypermedia is such that a connection called a hyperlink is defined between media such as moving images, still images, audios and texts, and reference can be made mutually or from one to another. For example, in a homepage described in HTML which can be browsed using the Internet, texts and still pictures are arranged, and links are defined throughout the texts and the still pictures. When the link is specified, relevant information as a link destination can be immediately displayed. When an interesting expression is directly specified, access can be made to relevant information, and therefore, the operation is easy and intuitive.

On the other hand, in a hypermedia in which moving images, not texts and still pictures, are main, there is defined a link from an object, such as a person or a thing, appearing on the moving image to relevant content, such as a text or a still picture, for explaining it, and when a viewer specifies this object, the relevant content is displayed. At this time, in order to define the link between a spatio-temporal region of the object appearing on the moving image and its relevant content, data (object area data) expressing the spatio-temporal region of the object in the moving image is required.

As the object area data, it is possible to use a mask image series having a value of a binary value or higher, arbitrary shape coding of MPEG-4, a method of describing a trajectory of a feature point of a figure explained in patent document 1 (JP-A-2000-285253), a method explained in patent document 2 (JP-A-2001-111996), and the like. In order to realize the hypermedia in which the moving image is main, in addition to this, data (operation information) describing an operation to display other relevant content when an object is specified, and the like are required. These data other than the moving image are called metadata.

As a method of providing a moving image and metadata to a viewer, first, there is a method of producing a recording medium (video CD, DVD, etc.) in which both the moving image and the metadata are recorded. Besides, in order to provide the metadata of the moving image which has already been owned as a video CD or a DVD, only the metadata may be downloaded from a network or delivered by streaming. Further, both data of the moving image and the metadata may be delivered through a network. At this time, it is desirable that the metadata has such a format as to be capable of efficiently using a buffer, to be suitable for random access, and to be resistant to data loss in the network.

In the case where switching of the moving image frequently occurs (for example, in the case where moving images taken in plural camera angles are prepared, and the viewer can freely select the camera angle, such as a multi-angle video of a DVD video), the metadata must be switched at high rate correspondingly to the switching of the moving image.

Further, with respect to the metadata, it is necessary that the buffer size and data buffering size before the reproduction start can be determined so that buffer overflow or underflow does not occur.

In the metadata relevant to the moving image owned by the viewer and delivered by streaming to the viewer through the network, or in the metadata owned by the viewer and reproduced, it is desired that the buffer size and data buffering size before the reproduction start can be determined according to the transfer rate of data and the network protocol used.

In view of the above problems, the present invention provides an invention in which a buffer size and a data buffering size before a reproduction start can be determined according to a transfer rate of data and a network protocol used.

BRIEF SUMMARY OF THE INVENTION

According to an aspect of the invention, metadata is relevant to a moving image and is temporarily stored in a buffer until the metadata is reproduced.

The metadata (its data structure) includes one or plural access units each being a data unit which can be independently processed.

Here, the access unit (Vclick_AU of FIG. 4) includes, as information relating to an effective period defined with respect to a time axis of a moving image, first data (402) to specify the effective period, object area data (400) describing a spatio-temporal region in the moving image, and second data (403) including at least one of data to specify a display method relevant to the spatio-temporal region and data to specify a processing to be performed when the spatio-temporal region is specified.

In a case where the metadata is inputted to the buffer at a constant rate, a dynamic range of a data amount in the buffer is described in the moving image metadata, a data buffering size before a reproduction start of the metadata is made a size of the dynamic range, and a buffer size is made two or more times as larger as the dynamic range.

In a case where the metadata is inputted to the buffer in such a state that input is made at a constant rate or input is stopped, a minimum dynamic range of a data amount in the buffer is described in the moving image metadata, a data buffering size before a reproduction start of the metadata is made a size of the dynamic range, and a buffer size is made a size of the dynamic range or larger.

By this, at the metadata reproduction synchronous to the moving image, it can be ensured that the buffer overflow or underflow does not occur. Further, since the suitable buffer size is determined for each stream, waste can be eliminated, and a waiting time until the reproduction start becomes short. In the case where the buffer size may be small, a recording medium can also be used for another usage.

BRIEF DESCRIPTION OF THE DRAWINGS

FIG. 9 is a view for explaining an example of communication between a server and a client according to an embodiment of the invention.

FIG. 11 is a view for explaining an example of data elements of a header of a Vclick stream according to an embodiment of the invention.

FIG. 12 is a view for explaining an example of data elements of a header of a Vclick access unit (AU) according to an embodiment of the invention.

FIG. 13 is a view for explaining an example of data elements of a time stamp of the Vclick access unit (AU) according to an embodiment of the invention.

FIG. 14 is a view for explaining an example of data elements of a time stamp skip of the Vclick access unit (AU) according to an embodiment of the invention.

FIG. 15 is a view for explaining an example of data elements of object attribute information according to an embodiment of the invention.

FIG. 16 is a view for explaining an example of kinds of the object attribute information according to an embodiment of the invention.

FIG. 17 is a view for explaining an example of data elements of a name attribute of an object according to an embodiment of the invention.

FIG. 18 is a view for explaining an example of data elements of an action attribute of the object according to an embodiment of the invention.

FIG. 19 is a view for explaining an example of data elements of a contour attribute of the object according to an embodiment of the invention.

FIG. 20 is a view for explaining an example of data elements of a blinking area attribute of the object according to an embodiment of the invention.

FIG. 21 is a view for explaining an example of data elements of a mosaic area attribute of the object according to an embodiment of the invention.

FIG. 22 is a view for explaining an example of data elements of a filled-in area attribute of the object according to an embodiment of the invention.

FIG. 23 is a view for explaining an example of data elements of text information data of the object according to an embodiment of the invention.

FIG. 24 is a view for explaining an example of data elements of a text attribute of the object according to an embodiment of the invention.

FIG. 25 is a view for explaining an example of data elements of a text highlight effect attribute of the object according to an embodiment of the invention.

FIG. 26 is a view for explaining an example of data elements of an entry of the text highlight effect attribute of the object according to an embodiment of the invention.

FIG. 27 is a view for explaining an example of data elements of a text blinking effect attribute of the object according to an embodiment of the invention.

FIG. 28 is a view for explaining an example of data elements of an entry of the text blinking effect attribute of the object according to an embodiment of the invention.

FIG. 29 is a view for explaining an example of data elements of a text scroll effect attribute of the object according to an embodiment of the invention.

FIG. 30 is a view for explaining an example of data elements of a text karaoke effect attribute of the object according to an embodiment of the invention.

FIG. 31 is a view for explaining an example of data elements of an entry of the text karaoke effect attribute of the object according to an embodiment of the invention.

FIG. 32 is a view for explaining an example of data elements of layer attribute extension of the object according to an embodiment of the invention.

FIG. 33 is a view for explaining an example of data elements of an entry of the layer attribute extension of the object according to an embodiment of the invention.

FIG. 34 is a view for explaining an example of data elements of object area data of a Vclick access unit (AU) according to an embodiment of the invention.

FIG. 35 is a view for explaining an example of a structure of an enhanced DVD video disk according to an embodiment of the invention.

FIG. 41 is a flowchart (in a case where Vclick data is in a server apparatus) showing another start processing procedure of random access reproduction according to an embodiment of the invention.

FIG. 50 is a view for explaining a variation example of a Vclick data amount in a buffer in a model 2 according to an embodiment of the invention.

FIG. 51 is a view for explaining a step of a processing of calculating a dynamic range of the Vclick data amount in the buffer in the model 2 according to an embodiment of the invention.

FIG. 55 is a view for explaining an example of data elements of a header of a Vclick stream different from FIG. 11 according to an embodiment of the invention.

FIG. 56 is a flowchart of a buffer control procedure according to an embodiment of the invention.

FIG. 57 is a view for explaining an example of data elements of a header of a Vclick stream different from FIG. 56 according to an embodiment of the invention.

FIG. 58 is a flowchart showing a first reproduction start processing procedure from a time when a user instructs a reproduction start to a time when the reproduction is started according to an embodiment of the invention.

FIG. 61 is a flowchart showing a fourth reproduction start processing procedure from a time when a user instructs a reproduction start to a time when the reproduction is started according to an embodiment of the invention.

DETAILED DESCRIPTION OF THE INVENTION

Hereinafter, embodiments of the present invention will be described with reference to the drawings.

(1) Outline of Application

Figure 1:
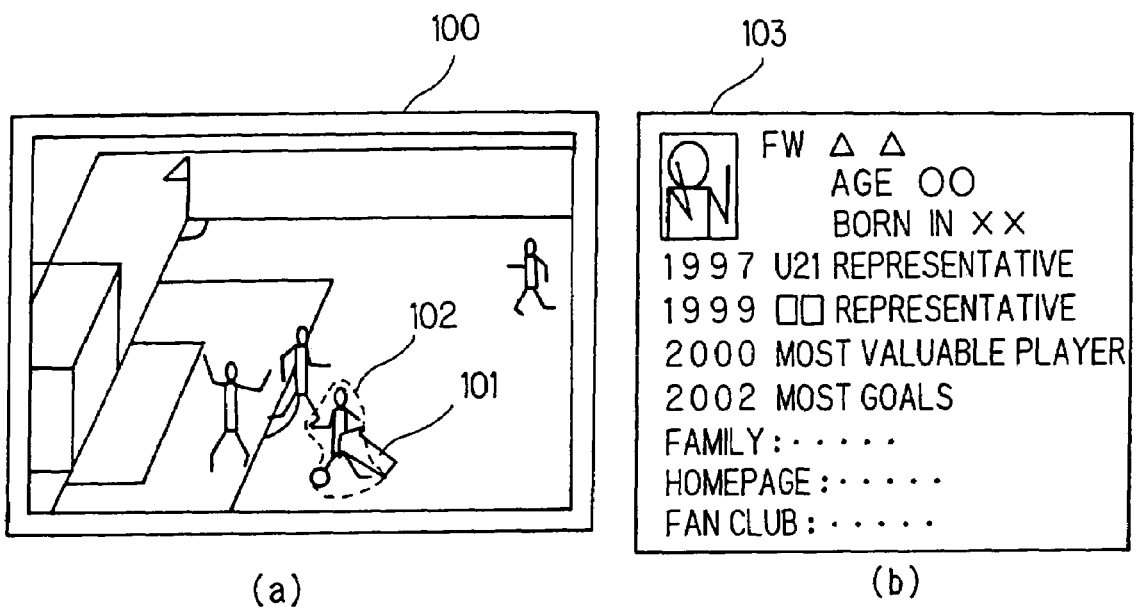
FIGS. 1A and 1B are views for explaining a display example of a hypermedia according to an embodiment of the invention.

FIG. 1 shows a display example, on a screen, of an application (moving image hypermedia) realized by using object metadata of this embodiment together with a moving image.

Reference numeral 100 of FIG. 1A denotes a reproduction screen of a moving image; and 101, a mouse cursor. Data of the moving image reproduced on the reproduction screen 100 of the moving image is recorded on a local moving image data recording medium. Reference numeral 102 denotes an area of an object appearing on the moving image. When the user moves the mouse cursor into the area of the object and selects the object by clicking or the like, a specified function is executed. For example, in FIG. 1B, a document (information relating to the clicked object) 103 on the local disk and/or a network is displayed. In addition, it is possible to perform such functions as to jump to another scene of the moving image, as to reproduce another moving image file, and as to change a reproduction mode.

The data of the area 102 of the object, the operation data of a client apparatus in the case where this area is specified by clicking or the like, and the like will be collectively referred to as object metadata or Vclick data. The Vclick data may be recorded, together with the moving image data, on a local moving image data recording medium (optical disk, hard disk, semiconductor memory, etc.), or may be stored in a server on a network and transmitted to a client through the network.

Figure 44:
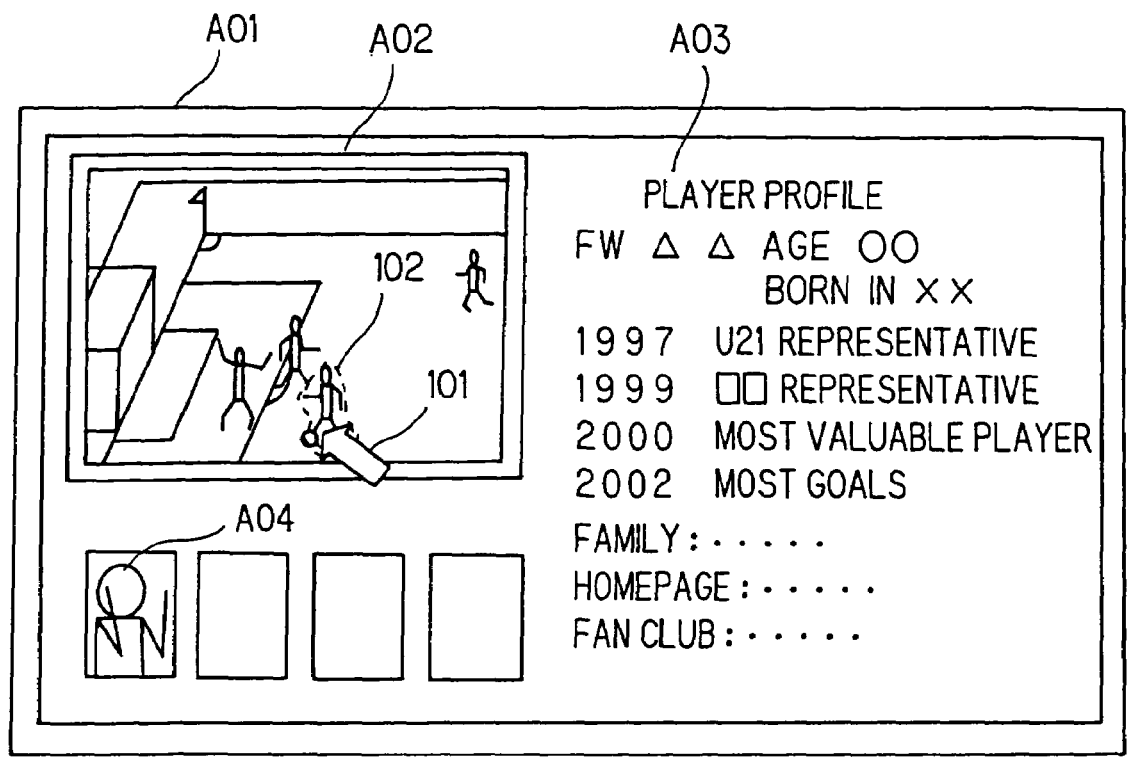
FIG. 44 is a view for explaining a display example of a hypermedia according to an embodiment of the invention.

FIG. 44 shows a display example, on a screen different from FIG. 1, of an application (moving image hypermedia) realized by using the Vclick data of this embodiment together with the moving image.

In FIG. 1, windows on which the moving image and the relevant information are displayed are separate from each other, however, in FIG. 44, a moving image A02 and a relevant information A03 are displayed on one window A01. As the relevant information, not only a text, but also a still picture A04 and a moving image different from A02 can be displayed.

Hereinafter, a detailed description will be given to how to realize the application.

(2) System Structure

Figure 2:
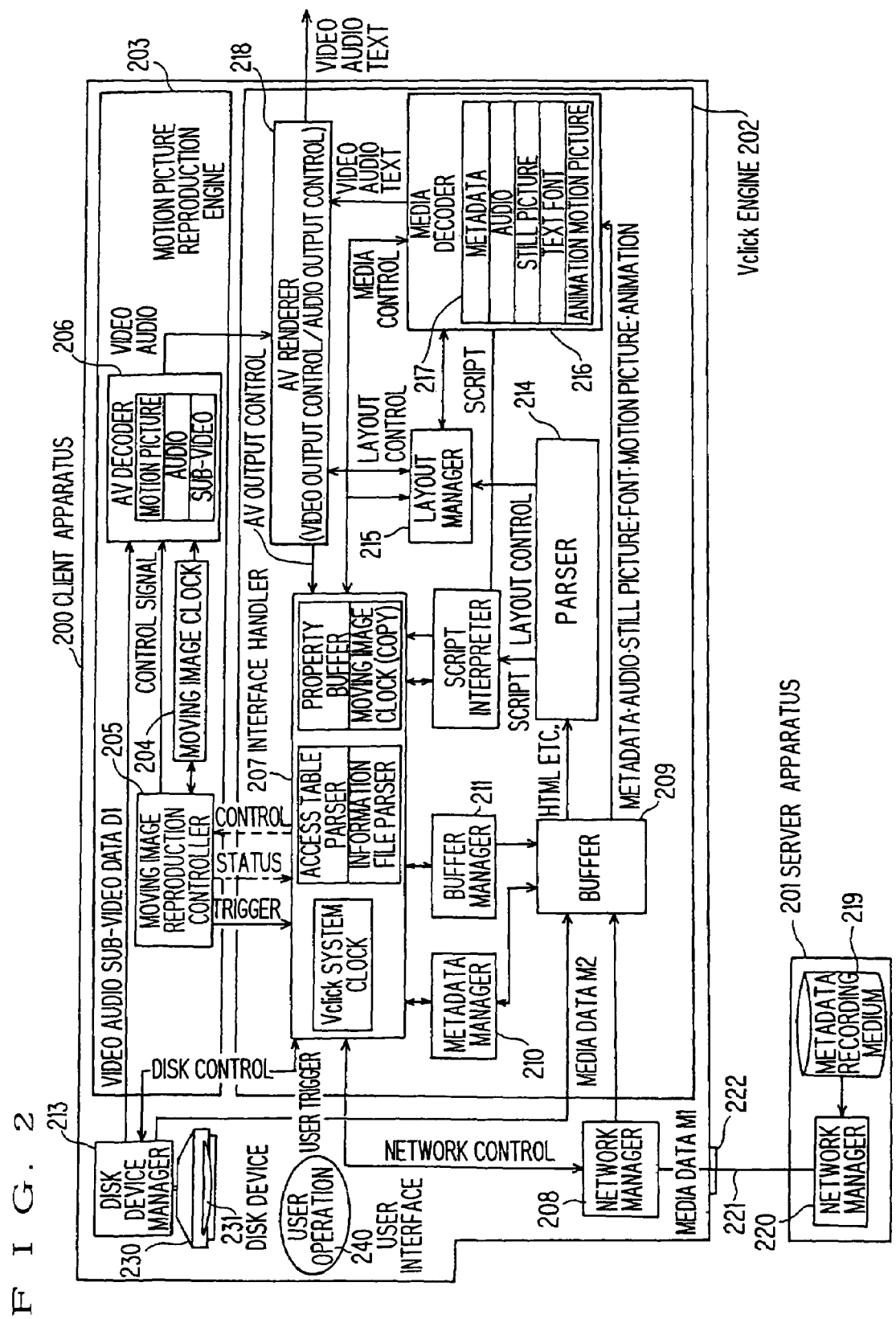
FIG. 2 is a block diagram showing a structural example of a system according to an embodiment of the invention.

FIG. 2 is a view showing a rough structure of a streaming apparatus (network-capable disk player) according to an embodiment of the invention. Functions of respective structural elements will be described by use of FIG. 2.

Reference numeral 200 denotes a client apparatus; 201, a server apparatus; and 221, a network connecting the server apparatus and the client apparatus. The client apparatus 200 includes a motion picture reproduction engine 203, a Vclick engine 202, a disk device 230, a user interface 240, a network manager 208, and a disk device manager 213. Reference numerals 204 to 206 denote devices included in the motion picture reproduction engine; 207, 209 to 212, and 214 to 218, devices included in the Vclick engine; and 219 and 220, devices included in the server apparatus. The client apparatus 200 can reproduce moving image data existing in the disk device 230, and display documents described in markup language such as HTML. It is also possible to display documents in HTML or the like existing on the network. With respect to the Vclick data relating to the moving image data recorded on a moving image data recording medium 231, there is a case where the data, together with the moving image data, is recorded on the moving image data recording medium 231, and there is a case where the data is recorded on a metadata recording medium 219 of the server apparatus 201. In the case where the Vclick data exists in the server apparatus 201, the client apparatus 200 can perform reproduction using the Vclick data and the moving image data in the disk device 230 in a manner as described below. First, in response to a request from the client apparatus 200, the server apparatus 201 transmits media data M1 including the Vclick data to the client apparatus 200 through the network 221. The client apparatus 200 processes the transmitted Vclick data in synchronization with the reproduction of the moving image, and realizes additional functions such as a hypermedia.

The motion picture reproduction engine 203 is an engine for reproducing the moving image data existing in the disk device 230, and includes the devices 204, 205 and 206. Reference numeral 231 denotes a moving image data recording medium, and specifically denotes a DVD, a video CD, a video tape, a hard disk, a semiconductor memory or the like. Digital and/or analog moving image data are recorded on the moving image data recording medium 231. There is also a case where metadata relating to the moving image data, together with the moving image data, is recorded on the moving image data recording medium 231. Reference numeral 205 denotes a controller for moving image reproduction control and is constructed so as to be capable of controlling reproduction of video/audio/sub-video data D1 from the moving image data recording medium 231 according to a "control" signal outputted from the interface handler 207 of the Vclick engine 202.

Specifically, at the time of reproduction of the moving image, according to the "control" signal transmitted from the interface handler 207 when an event (for example, menu call or title jump by user instructions) occurs, the moving image reproduction controller 205 can output a "trigger" signal indicating the reproduction state of the video/audio/sub-video data D1 to the interface handler 207. At that time (simultaneously with the output of the trigger signal, or at a suitable timing before or after that), the moving image reproduction controller 205 can output a "status" signal indicating property information (for example, audio language set in a player, sub-video subtitle language, reproduction operation, reproduction position, various time information, content of a disk, etc.) to the interface handler 207. By the transmission/reception of these signals, it becomes possible to start and stop readout of the moving image data and to access a desired position in the moving image data.

The AV decoder 206 has functions to decode the video data, audio data and sub-video data recorded on the moving image data recording medium 231, and to output the decoded video data (obtained by synthesizing the foregoing video data and the foregoing sub-video data) and the audio data, respectively. By this, the motion picture reproduction engine 203 has the same function as a reproduction engine of a normal DVD video player manufactured based on existing DVD video standards. That is, the client apparatus 200 of FIG. 2 can reproduce data, such as video and audio, of an MPEG 2 program stream structure similarly to a normal DVD video player, and by this, it becomes possible to reproduce an existing DVD video disk (disk in conformity with the conventional DVD video standards) (reproduction compatibility with existing DVD software is guaranteed).

The interface handler 207 performs interface control between modules such as the motion picture reproduction engine 203, the disk device manager 213, the network manager 208, the metadata manager 210, the buffer manager 211, the script interpreter 212, the media decoder 216 (including the metadata decoder 217), the layout manager 215, and the AV render 218. Besides, an input event by a user operation (operation to an input device such as a mouse, touch panel, or a keyboard) is received from the user interface 240, and the event is transmitted to a suitable module.

The interface handler 207 includes an access table parser to interpret a Vclick access table (described later), an information file parser to interpret a Vclick information file (described later), a property buffer to record properties managed by the Vclick engine, a system clock of the Vclick engine, a moving image clock in which a clock of the moving image clock 204 in the motion picture reproduction engine is copied, and the like.

The network manager 208 has a function to acquire documents in HTML or the like and data such as still pictures and audios into the buffer 209 through the network, and controls the operation of an internet connection part 222. When instructions of connection or disconnection to the network are issued by the user operation or by the interface handler 207 receiving a request from the metadata manager 210, the network manager 208 switches between connection and disconnection of the internet connection part 222. Besides, when the network is established between the server apparatus 201 and the internet connection part 222, transmission/reception of the media data such as control data and Vclick data is performed. The media data includes the Vclick data, documents in HTML or the like, still picture and moving image data accompanying this, and the like.

Data transmitted from the client apparatus 200 to the server apparatus 201 include a request for session configuration, a request for session end, a request for transmission of metadata such as Vclick data, and status information such as an OK or an error. Besides, transmission of the state information of the client apparatus may be performed. On the other hand, data transmitted from the server apparatus to the client apparatus include the metadata such as the Vclick data, and the status information such as an OK or an error.

The disk device manager 213 has a function to acquire documents in HTML or the like and data such as still pictures and audios into the buffer 209, and a function to transmit the video/audio/sub-video data D1 to the motion picture reproduction engine 203. The disk device manager 213 performs data transmission processing in accordance with the instructions from the metadata manager 210.

The buffer 209 temporarily stores the media data M1 such as the Vclick data transmitted from the server apparatus 201 through the network (via the network manager). Also in the case where media data M2 is recorded on the moving image data recording medium 231, the media data M2 is similarly stored in the buffer 209 through the disk device manager.

In the case where the media data M2 is recorded on the moving image data recording medium 231, before the video/audio/sub-video data D1 is reproduced, the media data M2 is previously read out of the moving image data recording medium 231 and may be stored in the buffer 209. This becomes a measure to avoid a following disadvantage. That is, since a data storage position of the media data M2 on the moving image data recording medium 231 is different from that of the video/audio/sub-video data D1, in the case where normal reproduction is performed, a seek or the like of the disk occurs and seamless reproduction can not be ensured.

As stated above, the media data M1 such as the Vclick data downloaded from the server apparatus 201 is also stored in the buffer 209 similarly to the media data M2 such as the Vclick data recorded on the moving image data storage medium 231, so that it becomes possible to read and reproduce the video/audio/sub-video data D1 and the media data simultaneously.

Incidentally, the storage capacity of the buffer 209 has a limit. That is, the data size of the media data M1 and M2 which can be stored in the buffer 209 is limited. Thus, unnecessary data may be erased by the control (buffer control) of the metadata manager 210 and/or the buffer manager 211.

The metadata manager 210 manages the metadata stored in the buffer 209, and receives a suitable timing ("moving image clock" signal) synchronous to the reproduction of the moving image from the interface handler 207 and transfers the metadata having a pertinent time stamp from the buffer 209 to the media decoder 216.

Incidentally, in the case where the Vclick data having the pertinent time stamp does not exist in the buffer 209, transfer to the media decoder 216 may not be performed. The metadata manager 210 performs control to read data with a size of the Vclick data transmitted from the buffer 209 or an arbitrary size from the server apparatus 201 or the disk device 230 to the buffer 209. As a specific processing, the metadata manager 210 issues an acquisition request for Vclick data with a specified size to the network manager 208 or the disk device manager 213 via the interface handler 207. The network manager 208 or the disk device manager 213 reads the Vclick data with the specified size into the buffer 209, and notifies, via the interface handler 207, the metadata manager 210 that the Vclick data has been acquired.

The buffer manager 211 manages data (documents in HTML or the like, still picture and moving image data accompanying this, etc.) other than the Vclick data stored in the buffer 209, receives a suitable timing ("moving image clock" signal) synchronous to the reproduction of moving images from the interface handler 207, and transmits the data other than the Vclick data stored in the buffer 209 to the parser 214 or the media decoder 216. The buffer manager 211 may delete data which becomes unnecessary from the buffer 209.

The parser 214 performs parsing of documents written in markup language such as HTML, transmits a script to the script interpreter 212 and transmits information relating to a layout to the layout manager 215.

The script interpreter 212 interprets the script inputted from the parser 214 and executes it. In the execution of the script, an event inputted from the interface handler 207 and information of properties can also be used. In the case where an object in the moving image is specified by the user, the script is inputted from the metadata decoder 217 to the script interpreter 212.

The AV renderer 218 has a function to control video/audio/text output. Specifically, according to a "layout control" signal outputted from the layout manager 215, the AV renderer 218 controls, for example, a display position and a display size of video and text (in addition to these, a display timing and a display time may be included), and the loudness of an audio (in addition to this, an output timing and an output time may be included), and according to the kind of the specified motor and/or the kind of the video to be displayed, pixel conversion of the video is performed. The video/audio/text output as the object of the control is the output from the motion picture reproduction engine 203 and the media decoder 216. Further, the AV renderer 218 has a function to control mixing and switching of the video/audio data inputted from the motion picture reproduction engine 203 and the video/audio/text data inputted from the media decoder in accordance with an "AV output control" signal outputted from the interface handler 207.

The layout manager 215 outputs the "layout control" signal to the AV renderer 218. The "layout control" signal includes information relating to the size and position of the motion picture/still picture/text to be outputted (information relating to a display time such as a display start/end/continuation may be included), and is information to instruct the AV renderer 218 on the selection of a layout in which a display is carried out. Besides, with respect to the input information, such as clicking by the user, inputted from the interface handler 207, it is judged which object has been specified, and an instruction is given to the metadata decoder 217 to extract an operation instruction, such as displaying of relevant information, defined for the specified object. The extracted operation instruction is transmitted to the script interpreter 212 and is executed.

The media decoder 216 (including the metadata decoder) decodes the motion picture/still picture/text data. The decoded video data and text image data are transmitted from the media decoder 216 to the AV renderer 218. Besides, the decode data are decoded by the instruction of the "media control" signal from the interface handler 202, and are decoded in synchronization with the "timing" signal from the interface handler 202.

Reference numeral 219 denotes the metadata recording medium of the server apparatus, and is a hard disk, a semiconductor memory, a magnetic tape or the like on which the Vclick data to be transmitted to the client apparatus 200 is recorded. The Vclick data is the metadata relating to the moving image data recorded on the moving image data recording medium 231. The Vclick data includes object metadata described later. Reference numeral 220 denotes the network manager of the server, and performs transmission/reception of data to/from the client apparatus 200 through the network 221.

(3) EDVD Data Structure and IFO File

FIG. 35 is a view showing an example of a data structure at a time when an enhanced DVD video disk is used as the moving image data recording medium 231. A DVD video area of the enhanced DVD video disk stores DVD video content (having an MPEG2 program stream structure) of the same data structure as DVD video standards. Further, another recording area of the enhanced DVD video disk stores enhanced navigation (hereinafter abbreviated to ENAV) content which can enrich the reproduction of the video content. Incidentally, the existence of the above recording area is also accepted in the DVD video standards.

Here, the basic data structure of the DVD video disk will be described. That is, the recording area of the DVD video disk includes a lead-in area, a volume space and a lead-out area in sequence from the inner periphery. The volume space includes a volume/file structure information area and the DVD video area (DVD video zone), and can further include the other recording areas (DVD other zone) optionally.

The volume/file structure information area 2 is an area assigned for a UDF (Universal Disk Format) bridge structure. A volume of a UDF bridge format is recognized in accordance with part 2 of ISO/IEC13346. A space in which the volume is recognized is made up of continuous sectors, and starts from the first logical sector of the volume space of FIG. 35. The first 16 logical sectors are preserved for system use regulated by ISO9660. In order to guarantee the compatibility with the conventional DVD video standards, the volume/file structure information area with such contents becomes necessary.

Besides, management information called a video manager VMG, and at least one video content called video title set VTS (VTS#1 to VTS#n) are recorded in the DVD video area. The VMG is the management information for all video title sets VTS existing in the DVD video area, and includes control data VMG1, VMG menu data VMGM_VOBS (option) and backup data of VMG. Besides, each video title set VTS includes control data VTSI of the VTS, VTS menu data VTSM_VOMS (option), data VTSTT_VOBS of content (movie, etc.) of the VTS (title), and backup data of the VTSI. In order to guarantee the compatibility with the conventional DVD video standards, the DVD video area with such contents also becomes necessary.

Reproduction selection menu and the like of each title (VTS#1 to VTS#n) is previously given using the VMG by a provider (producer of the DVD video disk). A reproduction chapter selection menu in a specific title (for example, VTS#1), a reproduction procedure of recording content (cell) and the like are previously given using the VTSI by the provider. Accordingly, a viewer (user of the DVD video player) of the disk can enjoy the recorded content of the disk 1 in accordance with the menu of the VMG/VTSI previously prepared by the provider and the reproduction control information (program chain information PGCI) in the VTSI. However, in the DVD video standards, the viewer (user) can not reproduce the content (movie or music) of the VTS by a method different from the VMG/VTSI prepared by the provider.

The enhanced DVD video disk of FIG. 35 is prepared for such contrivance as to enable the reproduction of the content (movie or music) of the VTS by a method different from the VMG/VTSI prepared by the provider and as to enable addition and reproduction of content different from the VMG/VTSI prepared by the provider. The ENAV content included in this disk can not be accessed by the DVD video player manufactured on the basis of the DVD video standards (even if it is accessed, the content can not be used), however, it can be accessed by the DVD video player according to the embodiment of the invention, and the reproduced content can be used.

The ENAV content is constructed to include data such as an audio, still picture, font and text, motion picture, animation and Vclick data, and an ENAV document (this is described in Markup/Script language) as information to control the reproduction of these. In the information to control the reproduction, a reproduction method (display method, reproduction procedure, reproduction switching procedure, selection of reproduction object, etc.) of the ENAV content (including audio, still picture, font/text, motion picture, animation, Vclick data and the like) and/or the DVD video content is described in markup language or Script language. For example, HTML (Hyper Text Markup Language)/XHTML (extensible Hyper Text Markup language) or SMIL (Synchronized Multimedia Integration Language) as the Markup language, and ECMA (European Computer Manufactures Association) Script or Java Scrip as the Script language can be used while they are combined.

Here, in the enhanced DVD video disk of FIG. 35, since the content other than that of the other recording area complies with the DVD video standards, even if an already popular DVD video player is used, the video content recorded in the DVD video area can be reproduced (that is, it is compatible with a conventional DVD video disk). Although the ENAV content recorded in the other recording area can not be reproduced by the conventional DVD video player (or can not be used), it can be reproduced and used by the DVD video player according to the embodiment of the invention. Accordingly, when the DVD video player according to the embodiment of the invention is used and the ENAV content is reproduced, the video reproduction rich in variety becomes possible without being limited only to the content of the VMG/VTSI previously prepared by the provider.

Especially, as shown in FIG. 35, the ENAV content includes the Vclick data, and the Vclick data is constructed to include a Vclick information file (Vclick info), a Vclick access table, a Vclick stream, a Vclick information file backup (Vclick info backup), and a Vclick access table backup.

The Vclick information file is data indicating that an after-mentioned Vclick stream is added to which part of the DVD video content (for example, the whole title of the DVD video content, the whole chapter, or a part thereof). The Vclick access table exists for each of the after-mentioned Vclick streams, and is a table for accessing the Vclick stream. The Vclick stream is a stream including position information of an object in a moving image and data such as an operation description at a time when the object is clicked. The Vclick information file backup is the backup of the foregoing Vclick information file, and always has the same content as the Vclick information file. The Vclick access table backup is the backup of the foregoing Vclick access table, and always has the same content as the Vclick access table. In the example of FIG. 35, the Vclick data is recorded on the enhanced DVD video disk. However, as described before, there is also a case where the Vclick data is placed in the server apparatus on the network.

Figure 36:
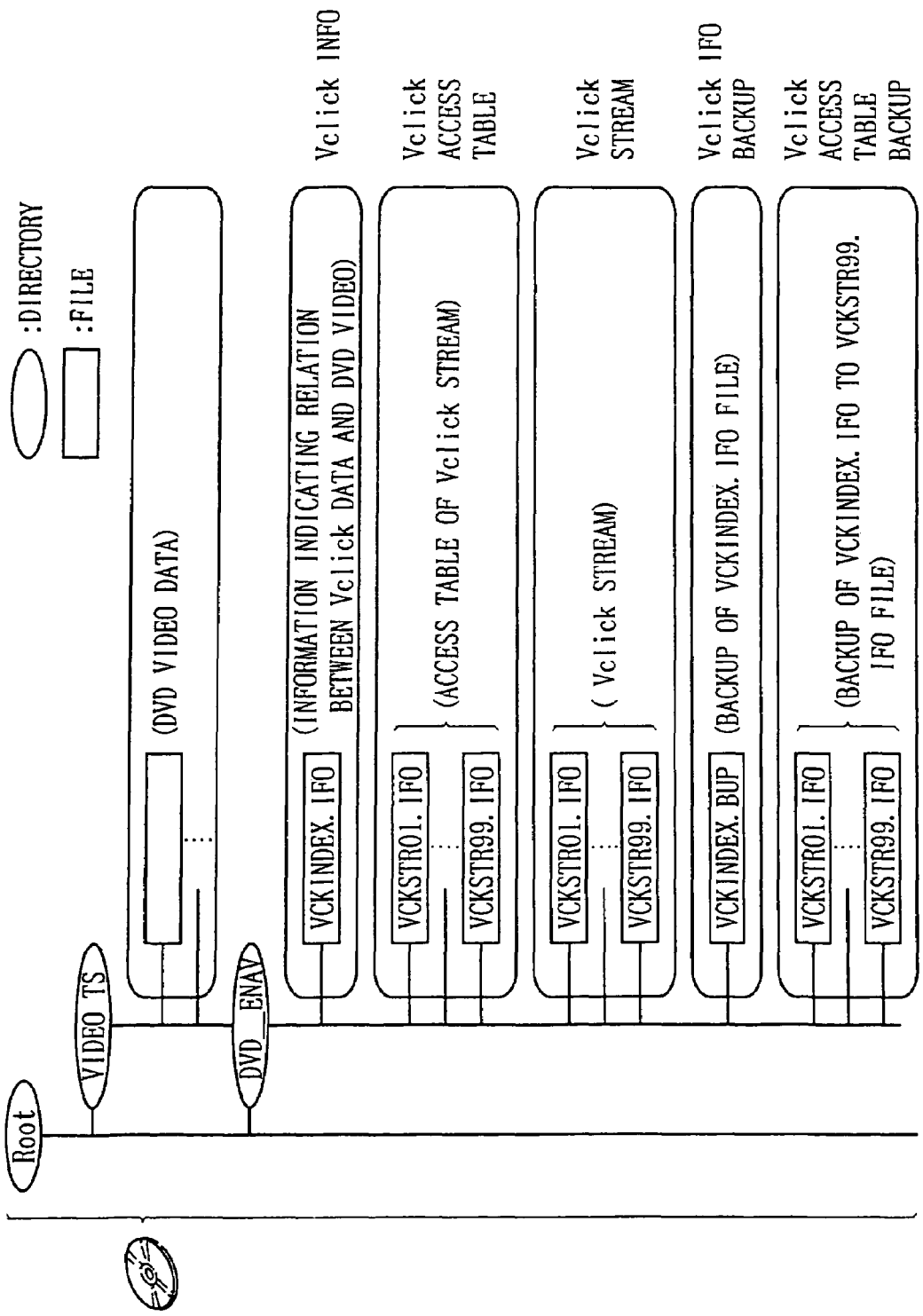
FIG. 36 is a view for explaining an example of a directory structure in the enhanced DVD video disk according to an embodiment of the invention.

FIG. 36 shows an example of files constituting the Vclick information file, the Vclick access table, the Vclick stream, the Vclick information file backup, and the Vclick access table backup. The file (VCKINDEX.IFO) constituting the Vclick information file is described in XML (Extensible Markup Language) language, and the Vclick stream and position information (VTS number, title number, PGC number, etc.) of the DVD video content to which the Vclick stream is added are described. The Vclick access table is constructed of one or more files (VCKSTR01.IFO to VCKSTR99.IFO, or arbitrary file names), and one access table file corresponds to one Vclick stream.

The relation between position information (relative byte size from the head of a file) of the Vclick stream and time information (time stamp of the corresponding moving image or relative time information from the head of the file) is described in the Vclick stream file, and a reproduction start position corresponding to a given time can be retrieved.

The Vclick stream is constructed of one or more files (VCKSTR01.VCK to VCKSTR99.VCK or arbitrary file names) and can be reproduced, together with the added DVD video content, by referring to the description of the Vclick information file. In the case where plural attributes exist (for example, Vclick data for Japanese and Vclick data for English, etc.), it is also possible to construct the Vclick stream different for each of the attributes, that is, different files. Further, the respective attributes are multiplexed, and one Vclick stream, that is, one file can be constructed. Incidentally, in the case of the former (the different attributes are constructed of the plural Vclick streams), buffer occupation capacity at the time when it is once stored in a reproducing apparatus (player) can be decreased. In the case of the latter (the different attributes are constructed of one Vclick stream), when the attribute is switched, since the one file may be kept being reproduced without switching the file, the switching rate can be made high.

Here, the association of the Vclick stream and the Vclick access table can be performed by, for example, the file name. In the foregoing example, one Vclick access table (VCKSTRXX.IFO, XX is 01 to 99) is assigned to one Vclick stream (VCKSTRXX.VCK, XX OS 01 TO 99), and when the file names except extensions are made identical to each other, the association of the Vclick stream and the Vclick access table becomes recognizable.

In addition to this, when the association of the Vclick stream and the Vclick access table is described in the Vclick information file (described in parallel), the association of the Vclick stream and the Vclick access table becomes recognizable.

The Vclick information file backup is constructed of a VCKINDEX.BUP file, and has quite the same content as the Vclick information file (VCKINDEX.IFO). In the case where the VCKINDEX.IFO can not be read because of some reason (because of scratch, dust or the like of the disk), the VCKINDEX.BUP is read instead, so that a desired procedure can be performed. The Vclick access table backup is constructed of VCKSTR01.BUP to VCKSTR99.BUP files, and has quite the same content as the Vclick access table (VCKSTR01.IFO to VCKSTR99.IFO). One Vclick access table backup (VCKSTRXX.BUP, XX is 01 to 99) is assigned to one Vclick access table (VCKSTRXX.IFO, XX is 01 to 99), and when the file names except the extensions are identical to each other, the association of the Vclick access table and the Vclick access table backup becomes recognizable. In the case where the VCKSTRXX.IFO can not be read because of some reason (because of scratch, dust or the like of the disk) the VCKSTRXX.BUP is read instead, so that a desired procedure can be performed.

(4) Outline of Data Structure and Access Table

The Vclick stream includes data relating to an area of an object, such as a person or a thing, appearing on a moving image recorded on the moving image data recording medium 231, and data of a display method of an object in the client apparatus 200 and an operation to be performed by the client apparatus when the object is specified. Hereinafter, the structure of the Vclick data and the outline of its structural element will be described.

First, the object area data as the data relating to the area of the object, such as the person or the thing, appearing on the moving image will be described.

Figure 3:
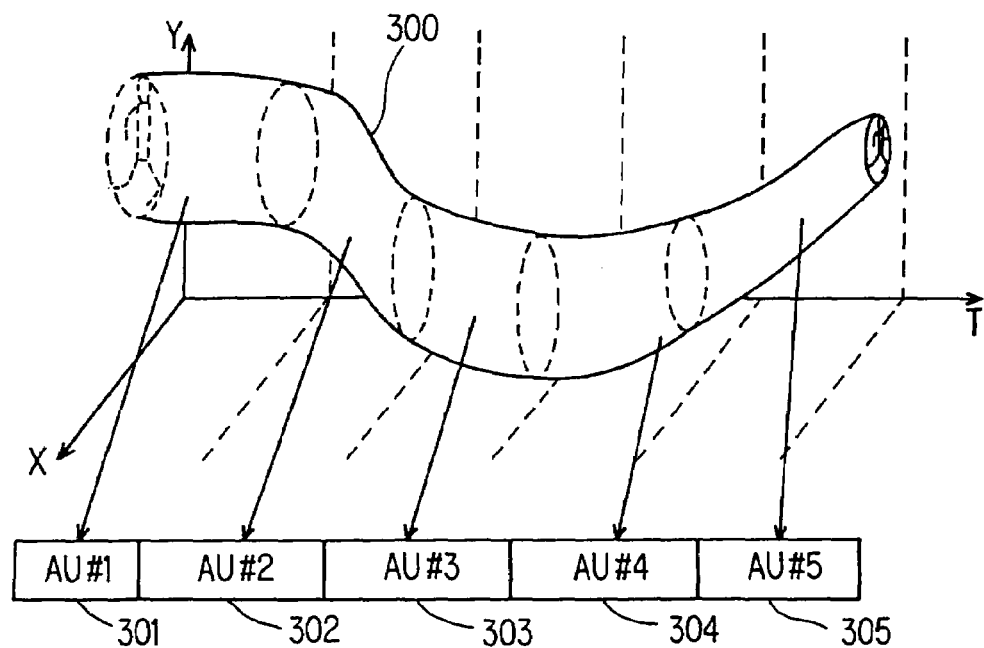
FIG. 3 is a view for explaining a relation between an object area and object area data according to an embodiment of the invention.

FIG. 3 is a view for explaining a structure of the object area data. Reference numeral 300 denotes a trajectory drawn by one object and expressed in three-dimensional coordinates of X (coordinate value of the video in the horizontal direction), Y (coordinate value of the video in the vertical direction), and T (time of the video). The object area is converted into the object area data at intervals of a time within a previously determined range (for example, from 0.5 second to 1.0 second, or from 2 seconds to 5 seconds). In FIG. 3, one object area 300 is converted into five object area data 301 to 305, and these object area data are stored in separate Vclick access units (AU) (described later). As a conversion method at this time, for example, MPEG-4 shape coding or MPEG-7 spatio-temporal region descriptor can be used. Since the MPEG-4 shape coding or the MPEG-7 spatio-temporal locator is a system in which the data amount is reduced by using a temporal correlation of the object area, there is a problem that data can not be decoded from the middle, and in the case where data at a certain time is lost, data around the time can not also be decoded. As shown in FIG. 3, the area of the object appearing on the moving image continuously for a long time is divided in the time direction and is converted into data, so that random access can be made easy, and an influence of a dropout of partial data can be reduced. Each Vclick_AU is effective only in a specific time section in the moving image. The time section in which the Vclick_AU is effective is called an effective period (lifetime) of the Vclick_AU.

Figure 4:
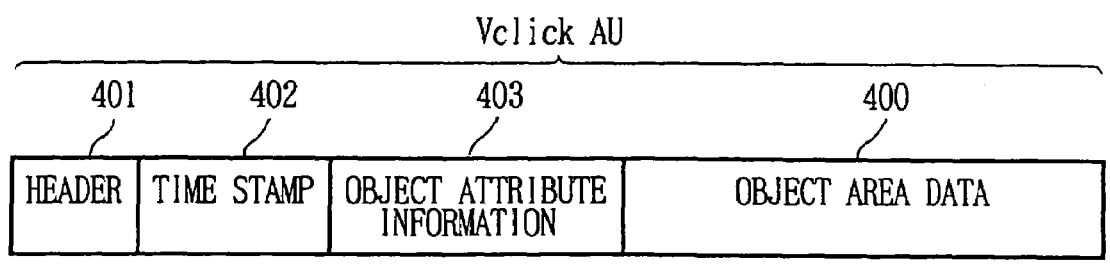
FIG. 4 is a view for explaining an example of a data structure of an access unit of object metadata according to an embodiment of the invention.

FIG. 4 shows a structure of one unit (Vclick_AU) which can be independently accessed in the Vclick stream used in the embodiment of this invention. Reference numeral 400 denotes object area data. As described in FIG. 3, here, the trajectory in a certain continuous time section of one object area is converted into data. The time section in which this object area is described is called an active period (active time) of the Vclick_AU. In general, the active period of the Vclick_AU is the same as the effective period of the Vclick_AU. However, it is also possible to make the active period of the Vclick_AU a part of the effective period of the Vclick_AU.

Reference numeral 401 denotes a header of the Vclick_AU. The header 401 includes an ID for identifying the Vclick_AU, and data for specifying the data-size of the AU. Reference numeral 402 denotes a time stamp, and denotes the time stamp of an effective period start of the Vclick_AU. In general, since the active period of the Vclick_AU and the effective period thereof are equal to each other, it also indicates that the object area described in the object area data 400 corresponds to which time in the moving image. As shown in FIG. 3, since the object area extends over a time range, in general, the time of the head of the object area is written in the time stamp 402. Of course, the time interval of the object area described in the object area data and the time of the end of the object area may also be described. Reference numeral 403 denotes object attribute information, and includes, for example, a name of the object, an operation description at a time when the object is specified, a display attribute of the object, and the like. Data in the Vclick_AU will be described later in detail. It is better to sequentially arrange and record the Vclick_AU in the order of the time stamp so that it can be processed from the head.

Figures 5, 6:
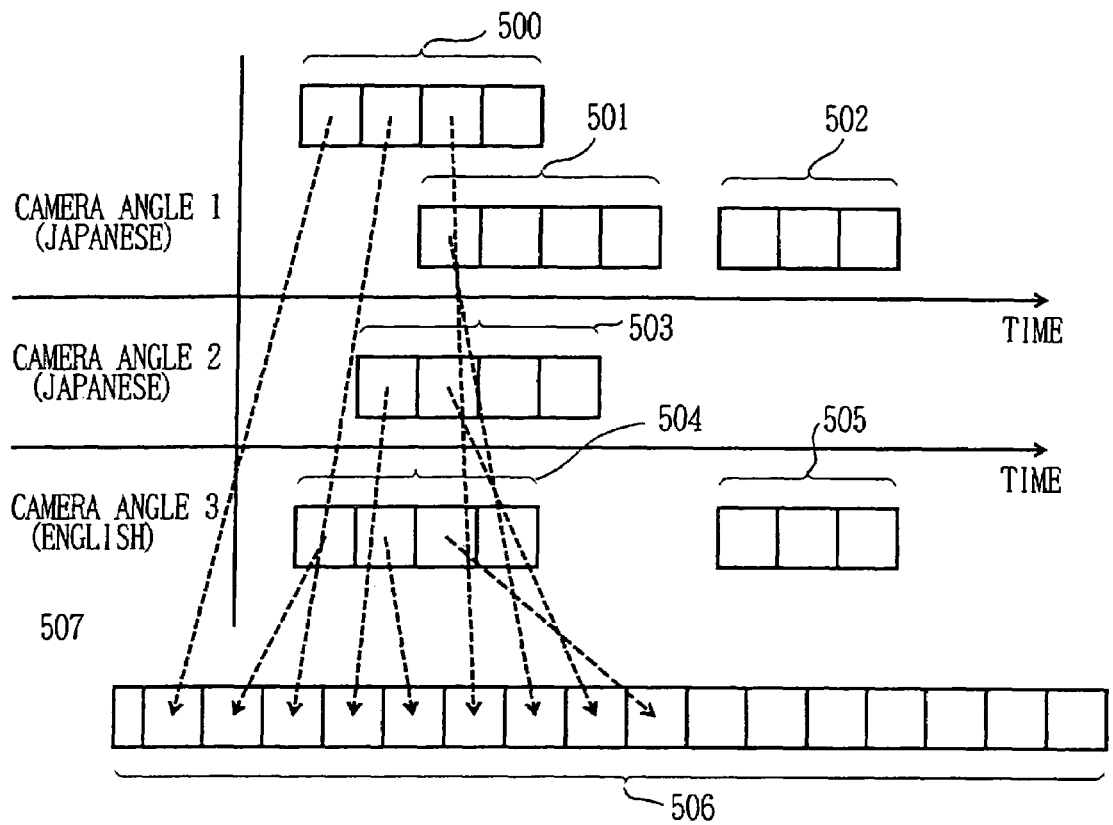
FIG. 5 is a view for explaining a construction method of a Vclick stream according to an embodiment of the invention.
FIG. 6 is a view for explaining a structural example of a Vclick access table according to an embodiment of the invention.

FIG. 5 is a view for explaining a method in which plural AUs are arranged in the order of the time stamp and the Vclick stream is generated. In this drawing, there are two camera angles, that is, a camera angle 1 and a camera angle 2, and it is assumed that when the camera angle is switched in the client apparatus, the moving image to be displayed is also switched. Besides, it is assumed that the selectable language mode includes two kinds, that is, Japanese and English, and separate Vclick data are prepared for the respective languages.

In FIG. 5, Vclick_AUs 500, 501 and 502 are for the camera angle 1 and for Japanese, and Vclick AU 503 is for the camera angle 2 and for Japanese. Vclick AUs 504 and 505 are for English. Each of the Vclick_AUs 500 to 505 is data corresponding to one object in the moving image. That is, as described in FIGS. 3 and 4, metadata relating to one object is constructed of one or plural Vclick_AUs (in FIG. 5, one rectangle denotes one AU). The horizontal axis in this drawing corresponds to the time in the moving image, and the Vclick_AUs 500 to 505 are expressed correspondingly to the appearance time of the object.

Although the temporal separator of each Vclick_AU may be arbitrary, as exemplified in FIG. 5, when the separators of the Vclick_AUs are aligned for all objects, the management of data becomes easy. Reference numeral 506 denotes a Vclick stream constructed of these Vclick_AUs (500 to 705). The Vclick stream is constructed by arranging the Vclick_AUs in the order of the time stamp subsequently to the header part 507.

Since there is a high possibility that the selected camera angle is changed by the user during viewing, it is better to form the Vclick stream by multiplexing the Vclick_AUs with different camera angles in the Vclick stream. This is because display switching at high speed can be performed in the client apparatus. For example, when the Vclick data is placed in the server apparatus 201, and when the Vclick stream including the Vclick_AUs of the plural camera angles are transmitted to the client apparatus as it is, since the Vclick_AU corresponding to the camera angle during viewing is always sent to the client apparatus, switching of the cameral angle can be instantaneously performed. Of course, setting information of the client apparatus 200 is sent to the server apparatus 201, and only necessary Vclick_AU is selected from the Vclick stream and can be transmitted. However, in this case, since it is necessary to perform communication with the server, the processing becomes somewhat slow (however, when a high speed measure such as an optical fiber is used for the communication, the problem of the processing delay can be solved).

On the other hand, since the attributes such as the moving image title, PGC of DVD video, an aspect ratio of the moving image, and a viewing region have a low frequency of change, when they are prepared as separate Vclick streams, the processing of the client apparatus becomes light, and the load of the network also becomes light. In the case where plural Vclick streams exist, as described before, by referring to the Vclick information file, it is possible to determine which Vclick stream should be selected.

In the case where the Vclick data exists in the server apparatus 201, and in the case where the moving image is reproduced from the head, the server apparatus 201 has only to deliver the Vclick stream in sequence from the head to the client apparatus. However, in the case where random access occurs, it is necessary to deliver the data from the middle of the Vclick stream. At this time, in order to access a desired position in the Vclick stream at high speed, it becomes necessary to provide a Vclick access table.

FIG. 6 shows an example of the Vclick access table. This table is previously prepared and is recorded together with the Vclick stream. The table can also be made the same file as the Vclick information file. Reference numeral 600 denotes an arrangement of time stamps, and the time stamps of the moving image are listed. Reference numeral 601 denotes an arrangement of access points, and offset values of the Vclick stream corresponding to the time stamps of the moving image from the head are listed. In the case where a value corresponding to the time stamp of the random access destination of the moving image does not exist in the Vclick access table, reference is made to an access point of a time stamp of a close value, and the transmission start place is searched while referring to the time stamp in the Vclick stream in the vicinity of the access point. Alternatively, a time stamp at a time before the time stamp of the random access destination of the moving image is searched from the Vclick access table, and the Vclick stream is transmitted from the access point corresponding to the time stamp.

The Vclick access table is stored in the server apparatus, and is provided to help the server apparatus to retrieve the Vclick data to be transmitted according to the random access from the client. However, the Vclick access table stored in the server apparatus is downloaded to the client apparatus, and the client apparatus may be made to search the Vclick stream. Especially, in the case where the Vclick stream is downloaded from the server apparatus to the client apparatus at once, the Vclick access table is also downloaded from the server apparatus to the client apparatus at once.

On the other hand, there is also a case where the Vclick stream is recorded on a moving image recording medium such as a DVD and is provided. Also in this case, in order to retrieve data to be used according to the random access of reproduction content, it is effective that the client apparatus uses the Vclick access table. In this case, similarly to the Vclick stream, the Vclick access table is recorded on the moving image recording medium, and the client apparatus reads the Vclick access table from the moving image recording medium into the inner main storage or the like and uses it.

The random reproduction of the Vclick stream which is produced in connection with the random reproduction of the moving image, is processed by the metadata decoder 217. In the Vclick access table of FIG. 6, the time stamp "time" is time information having a format of the time stamp of the moving image recorded on the moving image recording medium. For example, when the moving image is compressed by MPEG-2 and is recorded, the time stamp "time" has a format of PTS of MPEG-2. Further, in the case where the moving image has a navigation structure such as a title and a program chain as in, for example, a DVD, parameters (TTN, VTS_TTN, TT_PGCN, PTTN, etc.) expressing them are included in the format of the time stamp "time". Values of the time stamps are arranged in ascending order or descending order. For example, in the case where the PTS is used for the time stamp, they can be arranged in the order of time. Also with respect to the time stamp including parameters of the DVD, since the sequence relation can be defined in accordance with a natural reproduction sequence of the DVD, it is possible to arrange the time stamps in sequence.

In the Vclick access table of FIG. 6, an access point "offset" indicates a position on the Vclick stream. For example, the Vclick stream is a file, and the access point "offset" indicates the value of a file pointer of the file. The relation of the access point "offset" paired with the time stamp "time" is as follows:

i) The position indicated by "offset" is a head position of a certain Vclick_AU.

ii) The value of a time stamp of the certain AU is not larger than a value of the time stamp "time".

iii) The value of the time stamp of an AU one before the certain AU is truly smaller than the time stamp "time".

The arrangement intervals of the time stamps "time" in the Vclick access table may be arbitrary, and are not required to be uniform. However, in view of convenience of retrieval or the like, they may be made uniform.

Next, a protocol between the server apparatus and the client apparatus will be described. As the protocol used when the Vclick data is transmitted from the server apparatus 201 to the client apparatus 200, there is, for example, an RTP (Real-time Transport Protocol). The RTP is compatible with UDP/IP, and importance is attached to real-time properties, so that there is a possibility that a packet is lost. When the RTP is used, the Vclick stream is divided into transmission packets (RTP packets) and is transmitted. Here, an example of a storage method of the Vclick stream into the transmission packet will be described.

Figure 7:
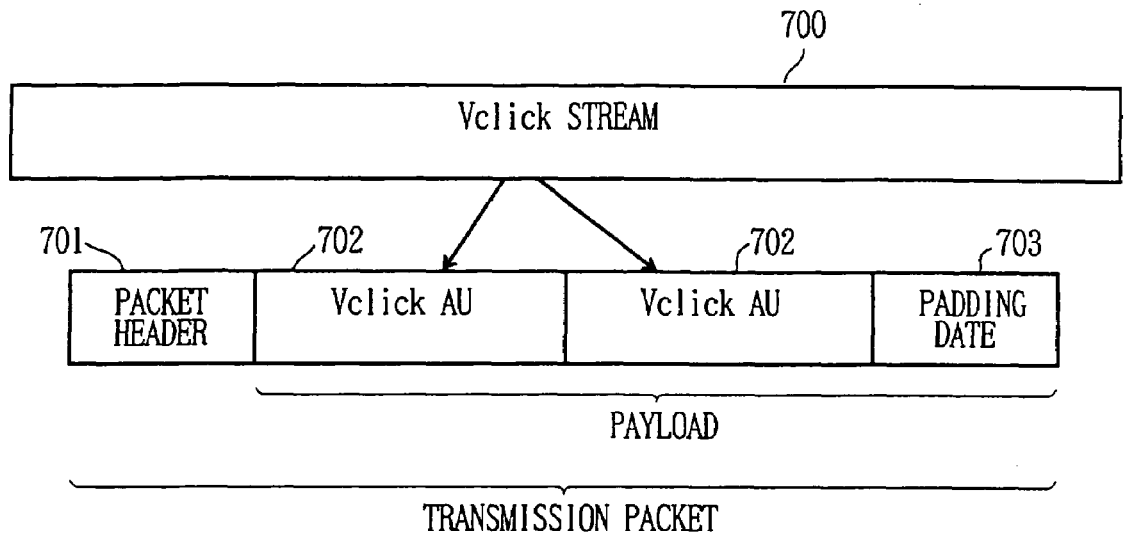
FIG. 7 is a view for explaining a structural example of a transmission packet according to an embodiment of the invention.
Figure 8:
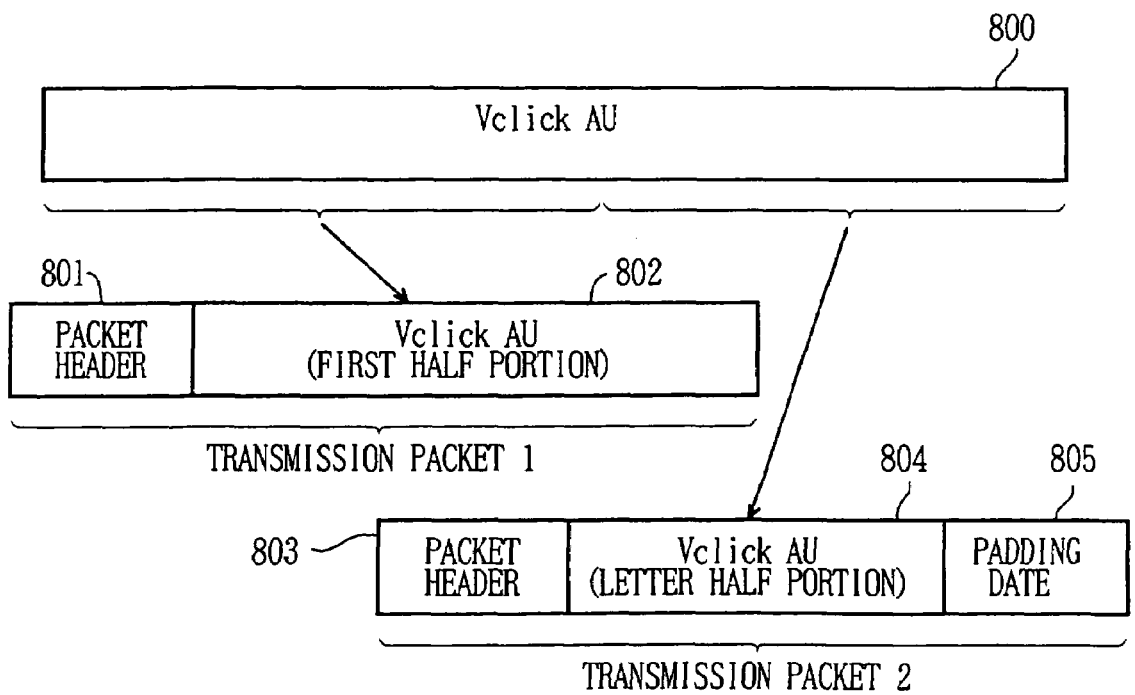
FIG. 8 is a view for explaining another structural example of a transmission packet according to an embodiment of the invention.

FIGS. 7 and 8 are views for explaining a transmission packet construction method in a case where the data size of a Vclick_AU is small and that in a case where the data size thereof is large. Reference numeral 700 of FIG. 7 denotes a Vclick stream. The transmission packet includes a packet header 701 and a payload. The packet header 701 includes a serial number of the packet, a transmission time, specific information of a transmission origin and the like. The payload is a data area for storing transmission data. Vclick_AU (702) extracted in sequence from the Vclick_AU 700 is stored in the payload. In the case where a next Vclick_AU can not be received in the payload, padding data 703 is inserted into a remaining portion. The padding data is dummy data for adjusting the size of data, and is, for example, the continuation of 0 values. In the case where the size of the payload can be made equal to the size of one or plural Vclick_AUs, the padding data is unnecessary.

On the other hand, FIG. 8 shows a construction method of a transmission packet in a case where one Vclick_AU can not be received in a payload. First, only a portion (802) of a Vclick_AU (800) which can be fitted into a payload of a first transmission packet is stored in the payload. Remaining data (804) is stored in a payload of a second transmission packet, and when a surplus occurs in the storage size of the payload, it is embedded with padding data 805. A similar method applies to a case where one Vclick_AU is divided into three or more packets.

As a protocol other than the RTP, HTTP (Hypertext Transport Protocol) or HTTPS can be used. The HTTP is compatible with TCP/IP, and in this case, since missing data is retransmitted, highly reliable data communication can be performed. However, in the case where a throughput of the network is low, there is a fear that a data delay occurs. Since data is not dropped in the HTTP, it is not necessary to consider how the Vclick stream is divided into packets and is stored.

(5) Reproduction Procedure in a Case where Vclick Data Exists in the Server Apparatus Next, a procedure of a reproduction processing in a case where a Vclick stream exists in the server apparatus 201 will be described.

Figure 37:
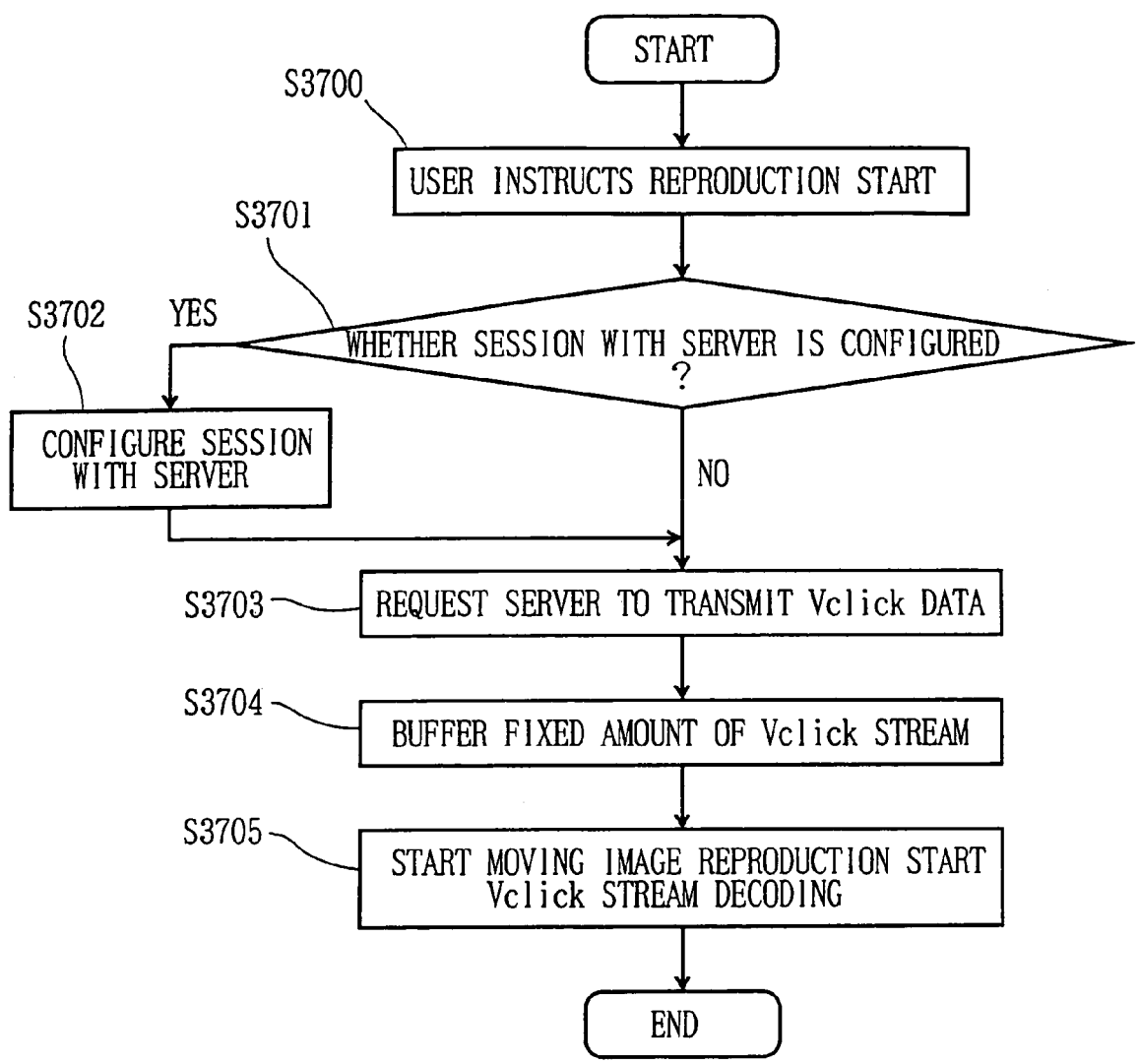
FIG. 37 is a flowchart (in a case where Vclick data is in a server apparatus) showing a start processing procedure of normal reproduction according to an embodiment of the invention.

FIG. 37 is a flowchart expressing a reproduction start processing procedure from user's instruction of a reproduction start to the reproduction start. First, at step S3700, the instruction of the reproduction start is inputted by the user. The interface handler 207 receives this input, and issues an instruction of a moving image reproduction preparation to the moving image reproduction controller 205. Next, as a branch processing step S3701, it is judged whether or not a session with the server apparatus 201 has already been configured. When the session is not configured yet, the processing proceeds to step S3702, and when the session is already configured, it proceeds to step S3703. At step S3702, the processing of configuring the session between the server and the client is performed.

FIG. 9 shows an example of a communication procedure from the session configuration to the session disconnect in the case where RTP is used for the communication protocol between the server and the client. Although it is necessary to perform a negotiation between the server and the client at the start of the session, in the case of the RTP, RTSP (Real Time Streaming Protocol) is often used. However, since high reliability is required for the communication of the RTSP, it is preferable that the communication is performed by TCP/IP in the RTSP and by UDP/IP in the RTP. First, in order to configure the session, the client apparatus (200 in the example of FIG. 2) requests the server apparatus (201 in the example of FIG. 2) to provide information relating to the Vclick data to be subjected to streaming (DESCRIBE method of RTSP).

Here, it is assumed that the address of the server to deliver data corresponding to the moving image to be reproduced is previously known to the client by a method of, for example, recording the address information on the moving image data recording medium. In response to this, the server apparatus sends the information of the Vclick data to the client apparatus. Specifically, information such as a protocol version of the session, session owner, session name, connection information, time information of the session, metadata name, and metadata attribute is sent to the client apparatus. As an information description method of these, for example, SDP (Session Description Protocol) is used. Next, the client apparatus requests the server apparatus to configure the session (SETUP method of RTSP). The server apparatus prepares the streaming, and returns a session ID to the client apparatus. The processing up to this point is the processing of step S3702 in the case where the RTP is used.

Figure 10:
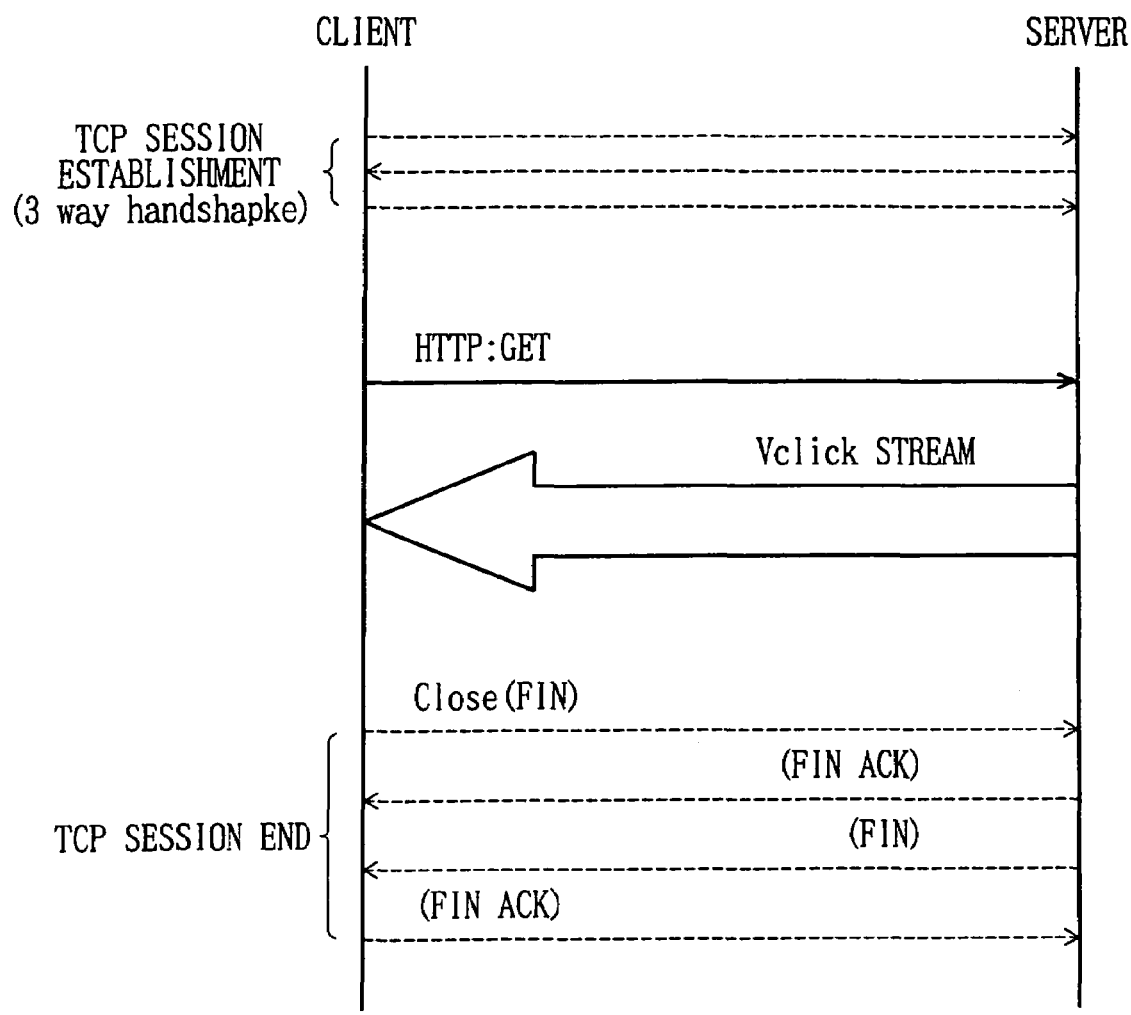
FIG. 10 is a view for explaining another example of communication between a server and a client according to an embodiment of the invention.

The communication procedure in the case where the HTTP, not the RTP, is used is performed as shown in, for example, FIG. 10. First, session configuration (3 way handshake) at TCP as a layer lower than the HTTP is performed. Here, similarly to the above, it is assumed that an address of the server to deliver data corresponding to the moving image to be reproduced is previously known to the client. Thereafter, a processing of transmitting a state of the client apparatus (for example, manufacture country, language, selection state of various parameters, etc.) to the server apparatus by using SDP or the like may be performed. The processing up to this point is the processing of step S3702 in the case of the HTTP.

At step S3703, in a state where a session between the server apparatus and the client apparatus is configured, the processing of requesting the server to transmit the Vclick data is performed. This is performed in such a way that the interface handler issues an instruction to the network manager 208, and the network manager 208 issues a request to the server. In the case of the RTP, the network manager 208 sends a PLAY method of RTSP to the server, and requests the Vclick data transmission. The server apparatus refers to the information received from the client up to now and the Vclick info existing in the server apparatus, and specifies the Vclick stream to be transmitted. Further, the server apparatus uses time stamp information of the reproduction start position included in the Vclick data transmission request and the Vclick access table existing in the server apparatus to specify the transmission start position in the Vclick stream, divides the Vclick stream into packets, and sends them to the client apparatus by the RTP.

On the other hand, in the case of the HTTP, the network manager 208 transmits the GET method of the HTTP, and requests Vclick data transmission. This request may include information of the time stamp of the reproduction start position of the moving image. The server apparatus specifies the Vclick stream to be transmitted and the transmission start position in the stream by a similar method to the time of the RTP, and sends the Vclick stream to the client apparatus by the HTTP.

Next, at step S3704, a processing of buffering the Vclick stream sent from the server into the buffer 209 is performed. This is performed to avoid such a state that the Vclick stream transmission from the server becomes insufficient during the reproduction of the Vclick stream, and the buffer becomes empty. When it is notified from the metadata manager 210 to the interface handler that the sufficient Vclick stream is stored in the buffer, the processing proceeds to step S3705. At step S3705, the interface handler issues a reproduction start instruction of the moving image to the controller 205, and instructs the metadata manager 210 to start the transmission of the Vclick stream to the metadata decoder 217.

Figure 38:
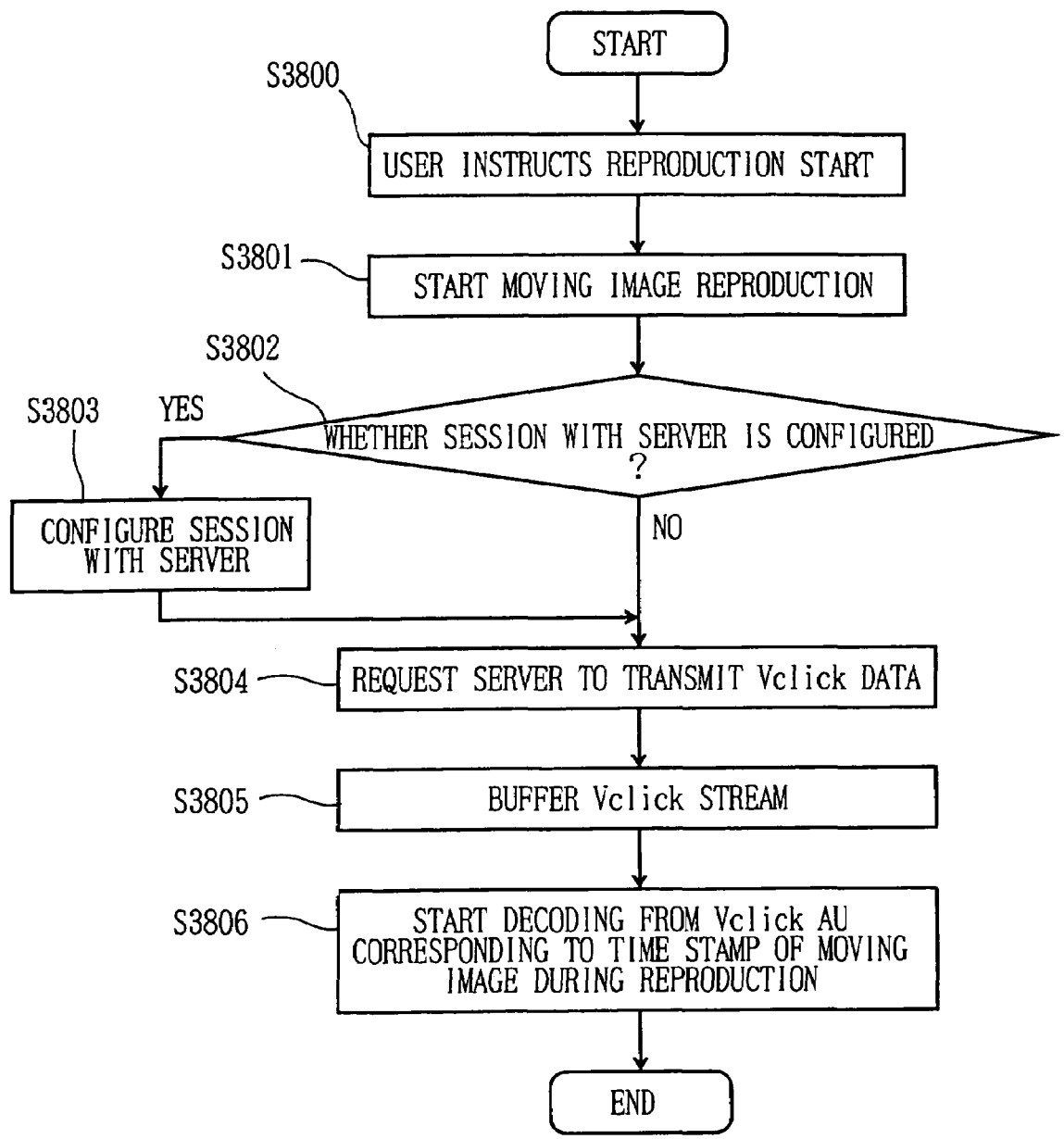
FIG. 38 is a flowchart (in a case where Vclick data is in a server apparatus) showing another start processing procedure of normal reproduction according to an embodiment of the invention.

FIG. 38 is a flowchart for explaining a reproduction start processing procedure different from FIG. 37. In the processing explained in the flowchart of FIG. 37, according to the state of the network and the processing capacity of the server and the client apparatus, there is a case where it takes much time to perform the processing of buffering a fixed amount of Vclick stream at step S3704. That is, there is a case where it takes much time from user's instruction of reproduction to the start of the actual reproduction. In the processing procedure of FIG. 38, when the user instructs the reproduction start at step S3800, the reproduction of the moving image is immediately started at next step S3801. That is, the interface handler 207 receiving the reproduction start instruction from the user immediately issues the reproduction start instruction to the controller 205. By this, the user is not kept waiting until the moving image can be viewed after the instruction of the reproduction. Processings from next step S3802 to step S3805 are the same as the processings from step S3701 to step S3704 of FIG. 37.

At step S3806, the processing of decoding the Vclick stream in synchronization with the moving image during reproduction is performed. That is, when receiving from the metadata manager 210 the notification that a fixed amount of Vclick stream is stored in the buffer, the interface handler 207 instructs the metadata manager 210 to start the transmission of the Vclick stream to the metadata decoder. The metadata manager 210 receives the time stamp of the moving image during reproduction from the interface handler, specifies the Vclick_AU corresponding to the time stamp from the data stored in the buffer, and transmits it to the metadata decoder.

In the processing procedure of FIG. 38, although the user is not kept waiting until the moving image can be viewed after the instruction of the reproduction, there is a problem that since decoding of the Vclick stream is not performed immediately after the reproduction start, the display concerning the object is not performed, or even if the object is clicked, any operation does not occur.

During the reproduction of the moving image, the network manager 208 of the client apparatus receives the Vclick stream sequentially sent from the server apparatus, and stores it in the buffer 209. The stored object metadata is sent to the metadata decoder 217 at a suitable timing. That is, the metadata manager 208 refers to the time stamp of the moving image during reproduction sent from the metadata manager 210, specifies the Vclick_AU corresponding to the time stamp from the data stored in the buffer 209, and sends the specified object metadata to the metadata decoder 217 in AU units. The metadata decoder 217 decodes the received data. However, data for a camera angle different from a camera angle presently selected by the client apparatus may be made not to be decoded. In the case where it is known that the Vclick_AU corresponding to the time stamp of the moving image during reproduction exists in the metadata decoder 217, the object metadata may be made not to be sent to the metadata decoder.

The time stamp of the moving image during reproduction is sequentially sent from the interface handler to the metadata decoder 217. The metadata decoder decodes the Vclick_AU in synchronization with the time stamp, and sends necessary data to the AV renderer 218. For example, in the case where the display of the object area is instructed by the attribute information described in the Vclick_AU, a mask image and a contour of the object area are created, and are sent to the AV renderer 218 in synchronization with the time stamp of the moving image during reproduction. Besides, the metadata decoder compares the time stamp of the moving image during reproduction with the effective time of the Vclick_AU to judge old object metadata which is unnecessary, and deletes the data.

Figure 39:
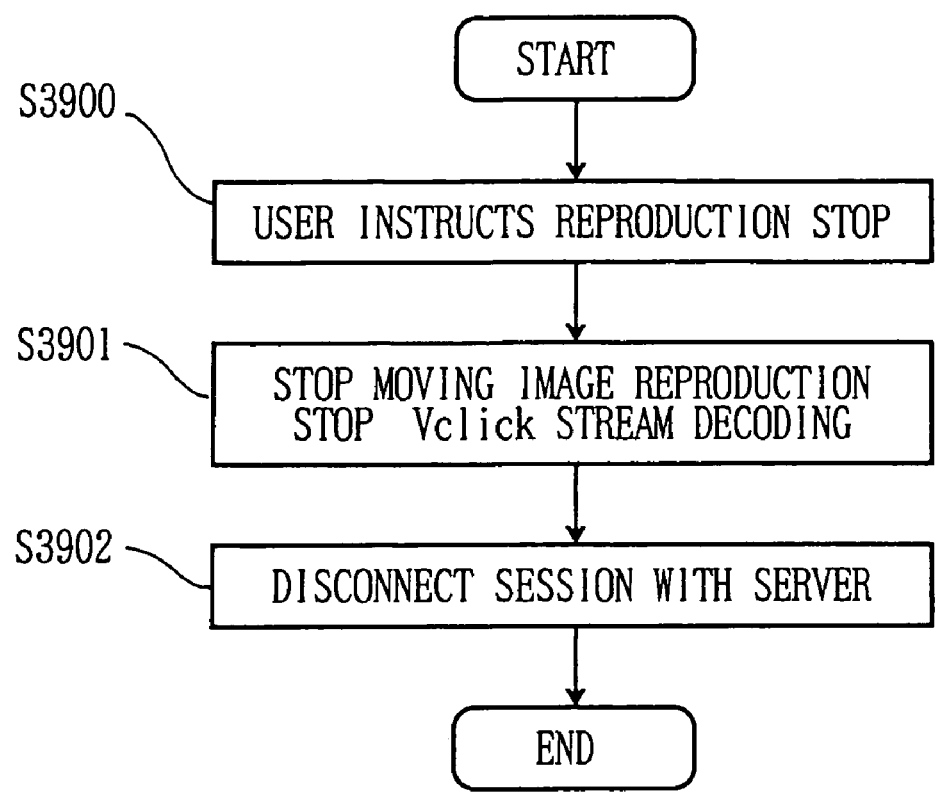
FIG. 39 is a flowchart (in a case where Vclick data is in a server apparatus) showing an end processing procedure of normal reproduction according to an embodiment of the invention.

FIG. 39 is a flowchart for explaining a procedure of a reproduction stop processing. At step S3900, the user instructs a reproduction stop during the reproduction of the moving image. Next, at step S3901, a processing of stopping the reproduction of the moving image is performed. This is performed in such a way that the interface handler 207 issues the stop instruction to the controller 205. At the same time, the interface handler instructs the metadata manager 210 to stop the transmission of the object metadata to the metadata decoder.

Step S3902 is a processing to disconnect the session with the server. In the case where the RTP is used, as shown in FIG. 9, TEARDOWN method of RTSP is sent to the server. When receiving the message of TEARDOWN, the server apparatus stops the data transmission, ends the session, and sends a confirmation message to the client apparatus. By this processing, a session ID used for the session becomes invalid. On the other hand, in the case where the HTTP is used, as shown in FIG. 10, Close method of the HTTP is sent to the server, and the session is ended.

(6) Random Access Procedure in a Case where Vclick Data Exists in the Server Apparatus Next, a procedure of random access reproduction in a case where the Vclick stream exists in the server apparatus 201 will be described.

Figure 40:
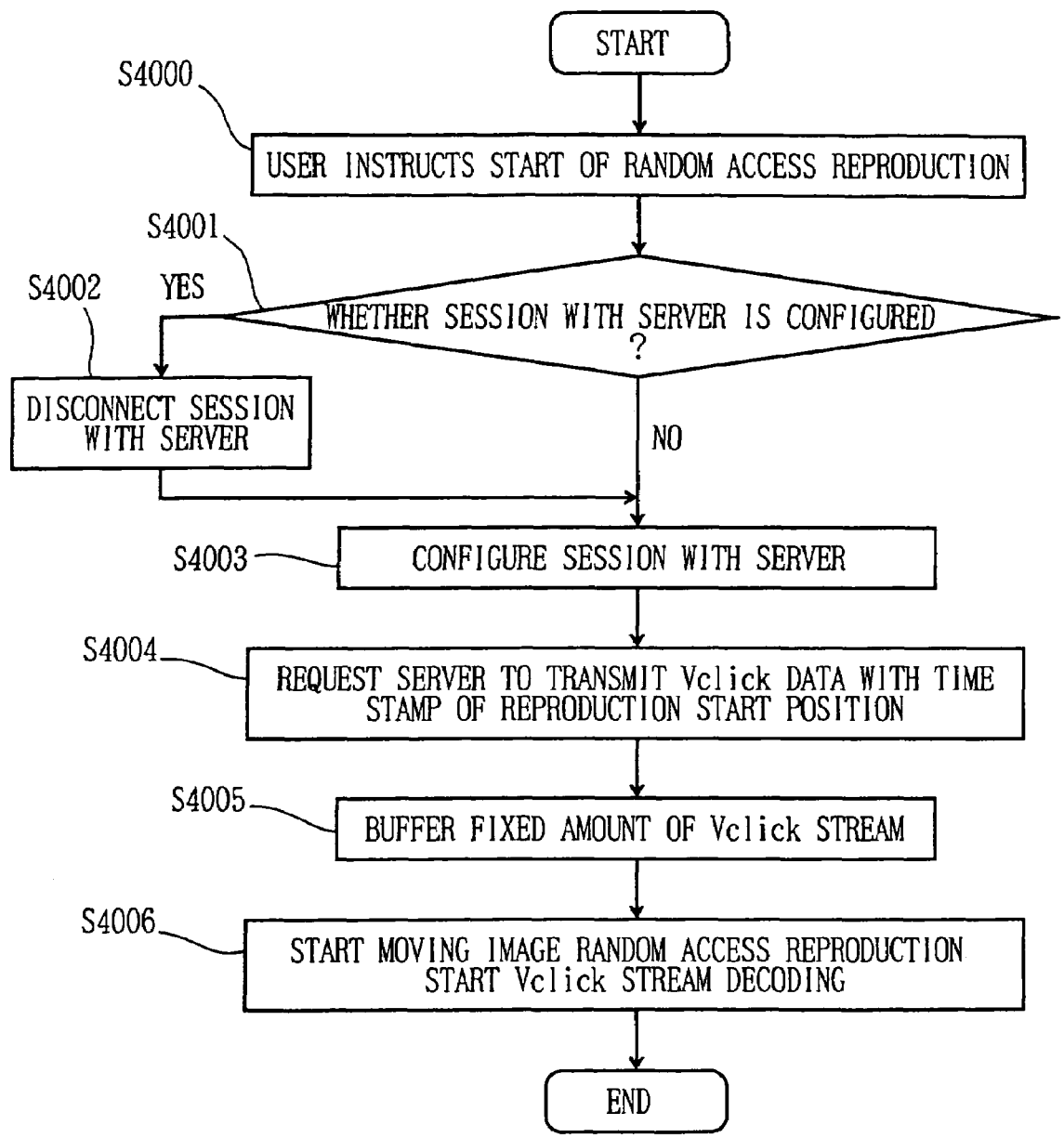
FIG. 40 is a flowchart (in a case where Vclick data is in a server apparatus) showing a start processing procedure of random access reproduction according to an embodiment of the invention.

FIG. 40 is a flowchart showing a processing procedure from user's instruction of a start of random access reproduction to the start of the reproduction. First, at step S4000, the start instruction of the random access reproduction is inputted by the user. As a method of the input, there is a method in which the user makes selection from a list of accessible positions such as a chapter, a method in which the user specifies one point from a slide bar corresponding to the time stamps of the moving image, or a method in which the time stamp of the moving image is directly inputted. The interface handler 207 receives the inputted time stamp, and issues an instruction of a moving image reproduction preparation to the moving image reproduction controller 205. In case the moving image is already being reproduced, the reproduction stop of the moving image during the reproduction is instructed, and the instruction of the moving image reproduction preparation is issued. Next, as a branch processing step S4001, it is judged whether or not the session with the server apparatus 201 has already been configured. In the case where the session has already been configured as in, for example, the case where the moving image is being reproduced, a session disconnect processing of step S4002 is performed. When the session is not configured yet, the processing of step S4002 is not performed, and the processing proceeds to step S4003. At step S4003, a processing of configuring the session between the sever and the client is performed. This processing is the same processing as step S3702 of FIG. 37.

Next, at step S4004, in the state where the session between the server apparatus and the client apparatus is configured, the time stamp of the reproduction start position is specified for the server, and a processing to request Vclick data transmission is performed. This is performed in such a manner that the interface handler issues the instruction to the network manager 208, and the network manager 208 issues the request to the server. In the case of the RTP, the network manager 208 sends the PLAY method of the RTSP to the server, and requests the Vclick data transmission. At this time, the time stamp to specify the reproduction start position is also sent to the server by a method of using a Range description. The server apparatus refers to the information received from the client up to now and the Vclick info existing in the server apparatus, and specifies the object metadata stream to be transmitted. Further, the server apparatus uses the time stamp information of the reproduction start position included in the Vclick data transmission request and the Vclick access table existing in the server apparatus to specify the transmission start position in the Vclick stream, divides the Vclick stream into packets, and sends them to the client apparatus by the RTP.

On the other hand, in the case of the HTTP, the network manager 208 transmits the GET method of the HTTP, and requests the Vclick data transmission. This request includes information of the time stamp of the reproduction start position of the moving image. Similarly to the RTP, the server apparatus refers to the Vclick information file to specify the Vclick stream to be transmitted, and further uses the time stamp information and the Vclick access table existing in the server apparatus to specify the transmission start position in the Vclick stream, and sends the Vclick stream to the client apparatus by the HTTP.

Next, at step S4005, a processing of buffering the Vclick stream sent from the server into the buffer 209 is performed. This is performed in order to avoid such a state that the Vclick stream transmission from the server becomes insufficient during the reproduction of the Vclick stream, and the buffer becomes empty. When it is notified to the interface handler from the metadata manager 210 that the sufficient Vclick stream is stored in the buffer, the processing proceeds to step S4006. At step S4006, the interface handler issues the reproduction start instruction of the moving image to the controller 205, and further issues the instruction to the metadata manager 210 to start the transmission of the Vclick stream to the metadata decoder.

FIG. 41 is a flowchart for explaining a procedure of a random access reproduction start processing different from FIG. 40. In the processing explained in the flowchart of FIG. 40, according to the state of the network and the processing capacity of the server and the client apparatus, there is a case where it takes much time to perform the processing of buffering a fixed amount of Vclick stream at step S4005. That is, there is a case where it takes much time from user's instruction of reproduction to the start of the actual reproduction.

On the other hand, in the processing procedure of FIG. 41, at step S4100, when the user instructs the reproduction start, the reproduction of the moving image is immediately started at step S4101. That is, the interface handler 207 receiving the reproduction start instruction from the user immediately issues the random access reproduction start instruction to the controller 205. By this, the user is not kept waiting until the moving image can be viewed after the instruction of the reproduction. Processings from next step S4102 to step S4106 are the same as the processings from step S4001 to step S4005 of FIG. 40.

At step S4107, a processing of decoding the Vclick stream is performed in synchronization with the moving image during reproduction. That is, when receiving from the metadata manager 210 a notification that a fixed amount of Vclick stream is stored in the buffer, the interface handler 207 instructs the metadata manager 210 to start the transmission of the Vclick stream to the metadata decoder. The metadata manager 210 receives the time stamp of the moving image under reproduction from the interface handler, specifies the Vclick_AU corresponding to this time stamp from the data stored in the buffer, and transmits it to the metadata decoder.

In the processing procedure of FIG. 41, although the user is not kept waiting until the moving image can be viewed after the instruction of the reproduction, since the decoding of the Vclick stream is not performed immediately after the reproduction start, there is a problem that the display concerning the object is not performed, or even if the object is clicked, any operation does not occur.

Incidentally, since the processing during the reproduction of the moving image and the moving image stop processing are the same as the case of the normal reproduction processing, their explanation will be omitted.

(7) Reproduction Procedure in a Case where Vclick Data Exists in the Client Apparatus Next, a procedure of a reproduction processing in a case where the Vclick stream exists in the moving image data recording medium 231 will be described.

Figure 42:
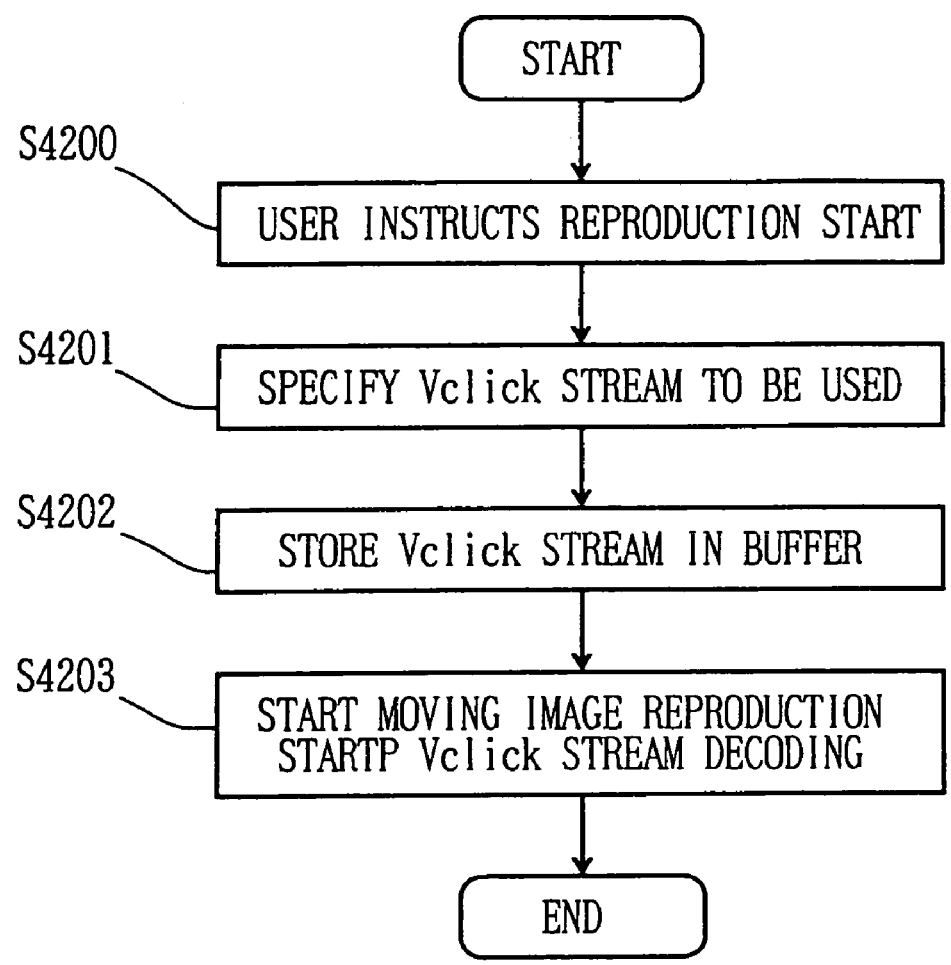
FIG. 42 is a flowchart (in a case where Vclick data is in a client apparatus) showing a start processing procedure of normal reproduction according to an embodiment of the invention.

FIG. 42 is a flowchart showing a reproduction start processing procedure from user's instruction of a reproduction start to the reproduction start. First, at step S4200, the instruction of the reproduction start is inputted by the user. The interface handler 207 receives this input and issues an instruction of a moving image reproduction preparation to the moving image reproduction controller 205. Next, at step S4201, a processing of specifying a Vclick stream to be used is performed. At this processing, the interface handler refers to the Vclick information file on the moving image data recording medium 231, and specifies the Vclick stream corresponding to the moving image whose reproduction is instructed by the user.

At step S4202, a processing of storing the Vclick stream in the buffer is performed. In order to perform this processing, the interface handler 207 first instructs the metadata manager 210 to allocate the buffer. Although the size of the buffer to be allocated is determined to be a sufficient size to store the specified Vclick stream, in general, a buffer initializing document describing this size is recorded on the moving image data recording medium 231. In the case where there is no initializing document, a previously determined size is applied. When the allocating of the buffer is completed, the interface handler 207 issues an instruction to the controller 205 to read the specified Vclick stream and to store it in the buffer.

When the Vclick stream is stored in the buffer, the reproduction start processing at step S4203 is next performed. At this processing, the interface handler 207 issues an reproduction instruction of a moving image to the moving image reproduction controller 205, and simultaneously issues an instruction to the metadata manager 210 to start the transmission of the Vclick stream to the metadata decoder.

During the reproduction of the moving image, the Vclick_AU read from the moving image data recording medium 231 is stored in the buffer 209. The stored Vclick stream is sent to the metadata decoder 217 at a suitable timing. That is, the metadata manager 208 refers to the time stamp of the moving image during reproduction sent from the metadata manager 210, specifies the Vclick_AU corresponding to the time stamp from the data stored in the buffer 209, and sends this specified Vclick_AU to the metadata decoder 217. The metadata decoder 217 decodes the received data. However, the data for a camera angle different from a camera angle presently selected by the client apparatus may not be decoded. In the case where it is known that the Vclick_AU corresponding to the time stamp of the moving image during reproduction already exists in the metadata decoder 217, the Vclick stream may not be sent to the metadata decoder.

The time stamp of the moving image during reproduction is sequentially sent from the interface handler to the metadata decoder 217. The metadata decoder decodes the Vclick_AU in synchronization with the time stamp, and sends necessary data to the AV renderer 218. For example, in the case where the display of an object area is instructed by attribute information described in the AU of the object metadata, a mask image and a contour of the object area are created and are sent to the AV renderer 218 in synchronization with the time stamp of the moving image during reproduction. Besides, the metadata decoder compares the time stamp of the moving image during reproduction with the effective time of the Vclick_AU, judges old Vclick_AU which is unnecessary, and deletes the data.

When a reproduction stop is instructed by the user during the reproduction of the moving image, the interface handler 207 issues the stop instruction of the moving image reproduction and the stop instruction of the readout of the Vclick stream to the controller 205. By the instructions, the reproduction of the moving image is ended.

(8) Random Access Procedure in a Case where Vclick Data Exists in the Client Apparatus Next, a processing procedure of random access reproduction in a case where a Vclick stream is on the moving image data recording medium 231 will be described.

Figure 43:
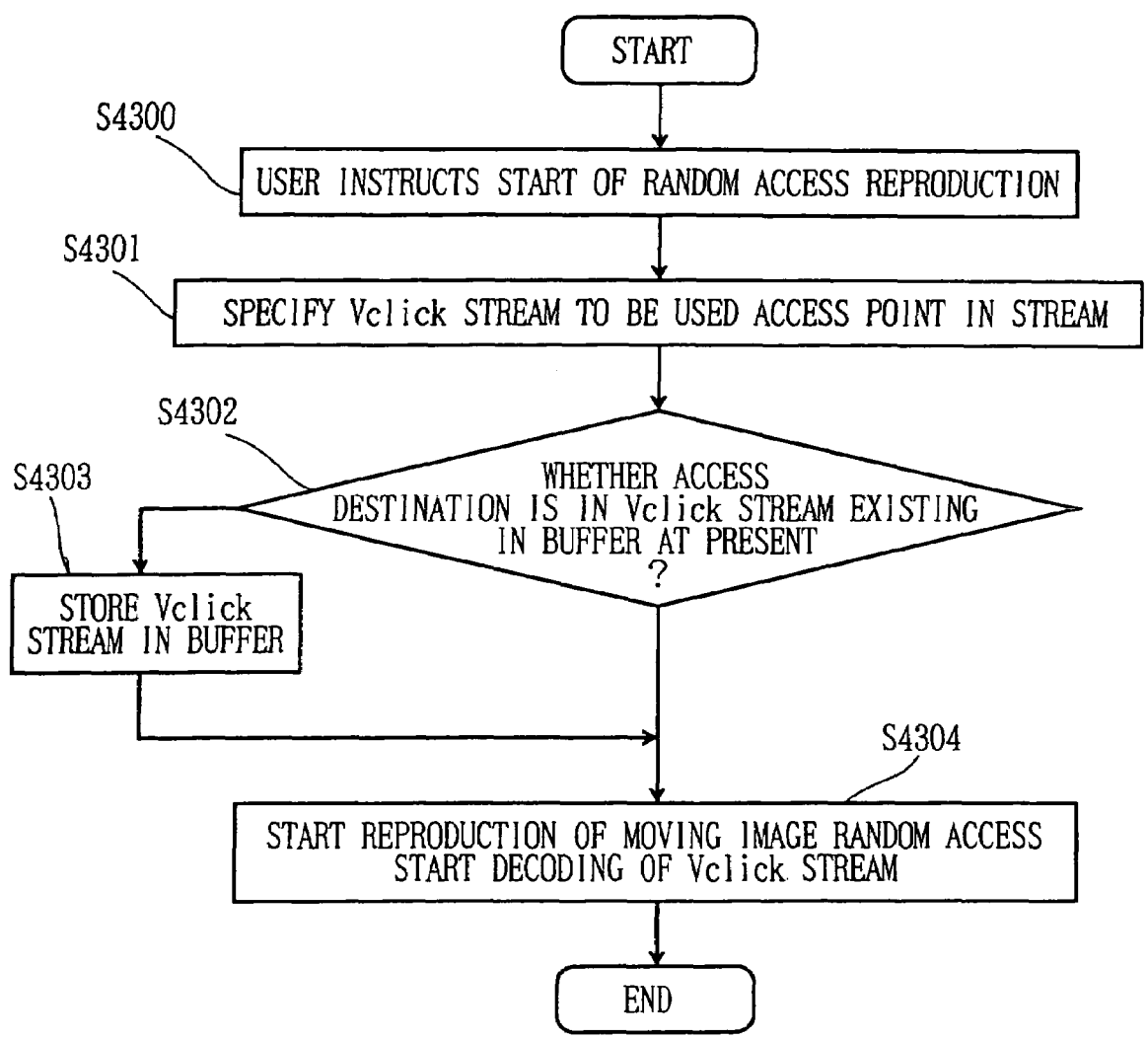
FIG. 43 is a flowchart (in a case where Vclick data is in a client apparatus) showing a start processing procedure of random access reproduction according to an embodiment of the invention.

FIG. 43 is a flowchart showing a processing procedure from user's instruction of a start of random access reproduction to the start of the reproduction. First, at step S4300, the instruction of the random access reproduction start is inputted by the user. As a method of the input, there is a method in which the user makes selection from a list of accessible positions such as a chapter, a method in which the user specifies one point from a slide bar made to correspond to the time stamps of the moving image, or a method in which the time stamp of the moving image is directly inputted. The interface handler 207 receives the inputted time stamp, and issues an instruction of a random access reproduction preparation of the moving image to the moving image reproduction controller 205.

Next, at step S4301, a processing of specifying a Vclick stream to be used is performed. At this processing, the interface handler refers to the Vclick information file on the moving image data recording medium 231, and specifies the Vclick stream corresponding to the moving image whose reproduction is instructed by the user. Further, the interface handler refers to the Vclick access table on the moving image data recording medium 231 or the Vclick access table read onto the memory, and specifies the access point in the Vclick stream corresponding to the random access destination of the moving image.

Step S4302 is a branch processing, and it is judged whether the specified Vclick stream is read in the buffer 209 at present. In the case where it is not read in the buffer, after the processing of step S4303 is performed, the processing proceeds to step S4304. In the case where it is read in the buffer at present, the processing of step S4303 is not performed, and the processing proceeds to step S4304. At step S4304, the random access reproduction of the moving image is started, and the decoding of the Vclick stream is started. At this processing, the interface handler 207 issues the random access reproduction instruction of the moving image to the moving image reproduction controller 205, and simultaneously issues the instruction to the metadata manager 210 to start the transmission of the Vclick stream to the metadata decoder. Thereafter, the decoding processing of the Vclick stream is performed in synchronization with the reproduction of the moving image. Since the processing during the moving image reproduction and the moving image reproduction stop processing are the same as the case of the normal reproduction processing, their explanation will be omitted.

(9) Procedure from Click to Display of Relevant Information

Next, an operation of the client apparatus in a case where the user uses a pointing device such as a mouse to click an object area will be described. When the user clicks, a clicked coordinate position on the moving image is inputted to the interface handler 207. The interface handler sends the time stamp and the coordinate of the moving image at the time of the click to the metadata decoder 217. From the time stamp and the coordinate, the metadata decoder performs a processing to identify an object indicated by the user.

The metadata decoder decodes the Vclick stream in synchronization with the reproduction of the moving image. Accordingly, since the area of the object of the time stamp at the time of the click is produced, this processing can be easily performed. In the case where plural object areas exist at the clicked coordinate, reference is made to layer information included in the Vclick_AU, and the most forward object is identified.

When the object specified by the user is identified, the metadata decoder 217 sends an action description (script to indicate an operation) described in the object attribute information 403 to the script interpreter 212. The script interpreter having received the action description interprets the operation content and executes it. For example, the specified HTML file is displayed, or the reproduction of the specified moving image is started. The HTML file and the moving image data may be recorded in the client apparatus 200, may be sent from the server apparatus 201 through the network, or may exist in another server on the network.

(10) Details of Data Structure

Next, a more specific structural example of a data structure will be described. As described in FIG. 5, the Vclick stream 506 includes the header of the Vclick stream and the plural Vclick AUs. FIG. 11 shows an example of the data structure of the header of the Vclick stream. The meaning of each of data elements is as follows:

"vclick_version" denotes the start of the header of the Vclick stream, and specifies a version of a format; and "vclick_length" denotes, in bytes, the data length of a portion after "vclick_length" in the Vclick stream.

Next, the detailed data structure of the Vclick AU will be described. The rough data structure of the Vclick AU is as described in FIG. 4.

FIG. 12 shows an example of the data structure of the header 401 of the Vclick AU. The meaning of each of data elements is as follows:

"vau_start_code" denotes the start of each of the Vclick_AUs;

"vau_length" denotes, in bytes, the data length of a portion after "vau_length" in the header of the Vclick_AU;

"vau_id" denotes an identification ID of the Vclick_AU, and it is judged by parameters expressing the state of the client apparatus and this ID whether the Vclick_AU should be decoded;

"object_id" denotes an identification number of an object described in the Vclick data, and in the case where the same value of "object_id" is used in two Vclick_AUs, both semantically denote data for the same object;

"object_subid" denotes semantic continuity of the object, and in the case where both "object_id" and "object_subid" are the same in two Vclick_AUs, it is meant that both are continuous (appearing on the same scene and identical) objects;

"continue_flag" denotes a flag (In the case where the first one bit is "1", it indicates that the object area described in the Vclick_AU is continuous with the object area described in the former Vclick_AU having the same object_id. In the case of not, this flag becomes "0". Similarly, the second bit indicates the continuity of the object area described in the Vclick_AU and the object area described in the next Vclick_AU and having the same "object_id".); and "layer" denotes a layer value of an object. When the layer value is large (or small), it is meant that the object is positioned forward on the screen. In the case where plural objects exist in the clicked place, it is judged that the object having the largest (or smallest) layer value is clicked.

FIG. 13 shows an example of a data structure of the time stamp 402 of the Vclick_AU. In this example, it is assumed that a DVD is used as the moving image data recording medium 204. By using a following time stamp, it becomes possible to specify an arbitrary time of a moving image on the DVD, and the synchronization of the moving image and the Vclick data can be realized. The meaning of each of data elements is as follows:

"time_type" denotes the start of the time stamp for the DVD;

"VTSN" denotes a VTS (Video Title Set) number of the DVD video;

"TTN" denotes a title number in a title domain of the DVD video, and corresponds to a value stored in a system parameter SPRM (4) of the DVD player;

"VTS_TTN" denotes a VTS title number in the title domain of the DVD video, and corresponds to a value stored in a system parameter SPRM (5) of the DVD player;

"TT_PGCN" indicates a title PGC (Program Chain) number in the title domain of the DVD video, and corresponds to a value stored in a system parameter SPRM (6) of the DVD player;

"PTTN" denotes a partial title (Part_of_Title) number of the DVD video, and corresponds to a value stored in a system parameter SPRM (7) of the DVD player;

"CN" denotes a cell number of the DVD video;

"AGLN" denote an angle number of the DVD video; and

"PTS[s . . . e]" denotes data from an sth bit to an eth bit in the display time stamp of the DVD video.

FIG. 14 shows an example of a data structure of a time stamp skip of the Vclick_AU. In the case where the time stamp skip is described in the Vclick_AU instead of the time stamp, it is meant that the time stamp of the Vclick_AU is the same as the time stamp of the Vclick_AU just before. The meaning of each data element is as follows:

"time_type" denotes a start of the time stamp skip.

FIG. 15 shows an example of a data structure of the object attribute information 403 of the Vclick_AU. The meaning of each of data elements is as follows:

"attribute_length" denotes, in bytes, the data length of a portion after "attribute_length" in the object attribute information; and "data_bytes" denotes a data part of the object attribute information. One or plural attribute data shown in FIG. 16 are described in this portion. An example of the maximum number of data which can be described in one Vclick_AU with respect to each attribute is indicated in a column of "maximum value" of FIG. 16. A data element "attribute_id" denotes an ID included in each attribute data, and denotes data for distinguishing the kinds of attributes. A "name" attribute indicates information for specifying a name of an object. In an "action" attribute, it is described what action should be performed when an object area in a moving image is clicked. A "contour" attribute indicates an attribute how to display a contour of an object. A "blinking area" attribute specifies a blinking color at a time when an object area is blinked and displayed. In a "mosaic area" attribute, a way of forming a mosaic at a time when an object area is mosaicked and displayed is described. A "filled_in area" attribute specifies a color at a time when an object area is colored and displayed.

An attribute belonging to a "text" category defines an attribute relating to a character to be displayed when the character is desired to be displayed on a moving image. A text to be displayed is described in "text information". A "text attribute" specifies attributes of a color, a font and the like of a text to be displayed. A "highlight effect" attribute specifies what character is highlight-displayed in what way when part of or all of the text is highlight-displayed. A "blinking effect" attribute specifies what character is blink-displayed in what way when part of or all of the text is blink-displayed. In a "scroll effect" attribute, it is described in which direction and at what speed scrolling is performed when a text to be displayed is scrolled. In a "karaoke effect" attribute, it is specified that when a color of a text is sequentially changed, a color of which character should be changed at what timing. Finally, a "layer extension" attribute is used to define a timing of a change of a layer value and its value in a case where the layer value of an object is changed in the Vclick_AU. The data structures of the above attributes will be respectively described below.

FIG. 17 shows an example of the data structure of the name attribute of the object. The meaning of each of data elements is as follows:

"attribute_id" denotes a type of attribute data, and this value is made 00h with respect to the name attribute;

"data_length" denotes, in bytes, a data length after "data_length" of the name attribute data;

"language" denotes a language used for description of following elements (name and annotation), and ISO-639 [code for the representation of names of languages] is used for specifying the language;

"name_length" denotes, in bytes, a data length of a "name" element;

"name" denotes a character string, and expresses the name of the object described in this Vclick_AU;

"annotation_length" denotes a data length of an "annotation" element; and

"annotation" denotes a character string, and expresses an annotation relating to the object described in the Vclick_AU.

FIG. 18 shows an example of the data structure of the action attribute of the object. The meaning of each of data elements is as follows:

"attribute_id" denotes a type of attribute data, and this value is made 01h with respect to the "action" attribute;

"data_length" denotes, in bytes, a data length of a portion after "data_length" in the action attribute data;

"script_language" denotes a kind of a script language described in a "script" element;

"script_length" denotes a data length of a "script" element in byte units; and

"script" denotes a character string, and an action to be executed in the case where an object described in the Vclick_AU is specified by the user is described in the script language specified by "script_language".

FIG. 19 shows an example of the data structure of the contour attribute of the object. The meaning of each of data elements is as follows:

"attribute_id" denotes a type of an attribute, and this value is made 02h with respect to the contour attribute;

"data_length" denotes a data length of a portion after "data_length" in the contour attribute data;

"color_r", "color_g", "color_b" and "color_a" denote display colors of a contour of an object described in the object metadata AU;

"color_r", "color_g" and "color_b" respectively denote values of red, green, and blue in an RGB expression of colors, and "color_a" denotes transparency;

"line_type" denotes the kind (solid line, broken line, etc.) of a contour of an object described in the Vclick_AU; and "thickness" denotes the thickness of a contour of an object described in the Vclick_AU.

FIG. 20 shows an example of the data structure of the blinking area attribute of an object. The meaning of each of data elements is as follows:

"attribute_id" denotes the type of attribute data, and this value is made 03h with respect to the blinking area attribute data;

"data_length" denotes, in bytes, a data length of a portion after "data_length" in the blinking area attribute data;

"color_r", "color_g", "color_b" and "color_a" denote display colors of an area of the object described in the Vclick_AU ("color_r", "color_g", "color_b" respectively denotes values of red, green and blue in the RGB expression of colors. On the other hand, "color_a" denotes transparency. Blinking of the object area is realized by alternately displaying the color specified in the filled-in area attribute and the color specified by this attribute); and "interval" denotes a time interval of blinking.

FIG. 21 shows an example of the data structure of the mosaic area attribute of the object. The meaning of each of data elements is as follows:

"attribute_id" denotes the type of attribute data, and this value is made 04h with respect to mosaic area attribute data;

"data_length" denotes, in bytes, a data length of a portion after "data_length" in mosaic area attribute data;

"mosaic_size" denotes the size of a mosaic block in pixel units; and

"randomness" denotes the degree of random exchange in a case where positions of mosaicked blocks are exchanged.

FIG. 22 shows an example of the data structure of the mosaic area attribute of the object. The meaning of each of data elements is as follows:

"attribute_id" denotes the type of attribute data, and this value is made 05h with respect to the filled-in area attribute data;

"data_length" denotes, in bytes, a data length of a portion after "data_length" in the filled-in attribute data; and "color_r", "color_g", "color_b" and "color_a" denote display colors of an object area described in the Vclick_AU, and "color_r", "color_g" and "color_b" respectively denote values of red, green and blue in the RGB expression of colors, and on the other hand, "color_a" denotes transparency.

FIG. 23 shows an example of the data structure of the text information of the object. The meaning of each of data elements is as follows:

"attribute_id" denotes the type of attribute data, and this value is made 06h with respect to the text information of the object;

"data_length" denotes, in bytes, a data length of a portion after "data_length" in the text information of the object;

"language" denotes a language of a described text, and as a designation method of the language, for example, ISO-639 "code for the representation of names of languages" can be used;

"char_code" denotes the code kind of a text, and for example, UTF-8, UTF-16, ASCII or Shift JIS is specified;

"direction" denotes a left direction, a right direction, a lower direction, or an upper direction as a direction in which characters are arranged (For example, in English or French, characters are normally arranged in the left direction. On the other hand, in Arabic, characters are arranged in the right direction, and in Japanese, they are arranged in the left direction or the lower direction. However, a direction other than the arrange direction determined for each language may be specified. Besides, an oblique direction may be specified.):

"text_length" denotes, in bytes, a length of "timed text"; and

"text" denotes a character string, and denotes a text described using the character code specified by "char_code".

FIG. 24 shows an example of the data structure of the text attribute of the object. The meaning of each of data elements is as follows:

"attribute_id" denotes the type of attribute data, and this value is made 07h with respect to the text attribute of the object;

"data_length" denotes, in bytes, a data length of a portion after "data_length" in the text attribute of the object;

"font_length" denotes a description length of a font in byte units;

"font" denotes a character string, and specifies a font used when a text is displayed; and "color_r", "color_g", "color_b" and "color_a" denote display colors used when a text is displayed. A color is expressed by RGB, and "color_r", "color_g" and "color_b" respectively denote values of red, green and blue, and "color_a" denotes transparency.

FIG. 25 shows an example of the data structure of the text highlight effect attribute of the object. The meaning of each of data elements is as follows:

"attribute_id" denotes the type of attribute data, and this value is made 08h with respect to the text highlight effect attribute data of the object;

"data_length" denotes, in bytes, a data length of a portion after "data_length" in the text highlight effect attribute data of the object;

"entry" denotes the number of "highlight_effect_entry" in the text highlight effect attribute data; and "highlight_entries" includes an "entry" number of "highlight_effect_entry".

The specification of "highlight_effect_entry" will be described next.

FIG. 26 shows an example of the data structure of an entry of the text highlight effect attribute of the object. The meaning of each of data elements is as follows:

"start_position" denotes a start position of a character to be emphasized by the number of characters from the head to the character;

"end_position" denotes an end position of the character to be emphasized by the number of characters from the head to the character; and "color_r", "color_g", "color_b" and "color_a" denote display colors of the character after emphasis. A color is expressed by RGB. Besides, "color_r", "color_g" and "color_b" respectively denote values of red, green and blue, and "color_a" denotes transparency.

FIG. 27 shows an example of the data structure of the text blinking effect attribute of the object. The meaning of each of data elements is as follows:

"attribute_id" denotes the type of attribute data, and this value is made 09h with respect to the blinking effect attribute data of the object;

"data_length" denotes, in bytes, a data length of a portion after "data_length" in the text blinking effect attribute data;

"entry" denotes the number of "blink_effect_entry" in the text blinking effect attribute data; and "blink_entries" includes an "entry" number of "blink_effect_entry".

The specification of "blink_effect_entry" will be described below.

FIG. 28 shows an example of the data structure of the text blinking effect attribute of the object. The meaning of each of data elements is as follows:

"start_position" denotes a start position of a character to be blinked by the number of characters from the head to the character;

"end_position" denotes an end position of the character to be blinked by the number of characters from the head to the character;

"color_r", "color_g", "color_b" and "color_a" denote display colors of a blinking character (A color is expressed by RGB. Besides, "color_r", "color_g" and "color_b" respectively denote values of red, green and blue, and "color_a" denote transparency. The color specified here and the color specified by the text attribute are alternately displayed so that the character is blinked.): and "interval" denotes a time interval of blinking.

FIG. 29 shows an example of the data structure of an entry of the text scroll effect attribute of the object. The meaning of each of data elements is as follows:

"attribute_id" denotes the type of attribute data, and this value is made 0ah with respect to the text scroll effect attribute data of the object;

"data_length" denotes a data length of a portion after "data_length" in the text scroll effect attribute data in byte units;

"direction" denotes a direction in which characters are scrolled, and for example, 0 denotes a direction from right to left, 1 denotes a direction from left to right, 2 denotes a direction from upper to down, and 3 denotes a direction from lower to upper; and "delay" denotes a scrolling speed expressed by a time difference between the display of a first character to be displayed and the display of a final character.

FIG. 30 shows an example of the data structure of an entry of the text karaoke effect attribute of the object. The meaning of each of data elements is as follows:

"attribute_id" denotes the type of attribute data, and this value is made 0bh with respect to the text karaoke effect attribute data of the object;

"data_length" denotes a data length of a portion after "data_length" in the text karaoke effect attribute data in byte units;

"start_time" denotes a change start time of a character color of a character string specified by the first "karaoke_effect_entry" included in "data_bytes" of the attribute data;

"entry" indicates the number of "karaoke_effect_entry" in the text karaoke effect attribute data; and "karaoke_entries" includes an "entry" number of "karaoke_effect_entry".

The specification of "karaoke_effect_entry" will be described next.

FIG. 31 shows an example of the data structure of an entry ("karaoke_effect_entry") of the text karaoke effect attribute of the object. The meaning of each of data elements is as follows:

"end_time" denotes a change end time of a character color of a character string specified by this entry, and in the case where there is an entry subsequent to this entry, it also denotes a change start time of a character color of a character string specified by the next entry;

"start_position" denotes a position of a first character of a character string in which a character color is to be changed by the number of characters from the head to the character; and "end_position" denotes a position of a final character of the character string in which the character color is to be changed by the number of characters from the head to the character.

FIG. 32 shows an example of the data structure of the layer attribute extension of the object. The meaning of each data elements is as follows.

"attribute_id" denotes the type of attribute data, and this value is made 0ch with respect to the layer attribute extension data of the object;

"data_length" denotes a data length of a portion after "data_length" in the layer attribute extension data in byte units;

"start_time" denotes a start time when a layer value specified by the first "layer_extension_entry" included in "data_bytes" of the attribute data becomes effective;

"entry" denotes the number of "layer_extension_entry" included in the layer attribute extension data; and "layer_entries" includes an "entry" number of "layer_extension_entry".

The specification of "layer_extension_entry" will be described next.

FIG. 33 shows an example of the data structure of an entry (layer_extension_entry) of the layer attribute extension of the object. The meaning of each of data elements is as follows:

"end_time" denotes a time when a layer value specified by "layer_extension_entry" becomes ineffective, and in the case where there is also an entry next to this entry, it also simultaneously denotes a time when a layer value specified by the next entry becomes effective; and "layer" denotes a layer value of the object.

FIG. 34 shows an example of the data structure of the object area data 400 of the AU of the object metadata. The meaning of each of data elements is as follows:

"vcr_start_code" denotes a start of object area data;

"data_length" denotes, in bytes, a data length of a portion after "data_length" in the object area data; and "data_bytes" denotes a data part in which the object area is described. For example, a binary format of "Spatio Temporal Locator" of MPEG-7 can be used for the description of the object area.

(11) Vclick Buffer

Next, a variation of a data amount in the buffer 209 will be described, and then, a method of determining the timing of a reproduction start of a moving image will be described.

(11-1) Variation Model (Model 1) of Data Amount

First, a variation model (model 1) of the data amount in the buffer will be described.

In the model 1, the variation of the data amount in the buffer at the time when data transfer is in the most severe state is assumed. Here, that [data transfer is in the most severe state] means the state in which the data transfer rate at the time when the data is read from a network or a disk and is inputted to the buffer is the minimum rate r (bps) which can be always ensured. Accordingly, the buffer can not perform control to change the transfer rate of the data inputted or to temporarily stop. As an example in which the model 1 is well applicable, a data streaming through a network using UDP/IP as a protocol can be cited.

(11-1-1) Example of Data Amount Variation in Buffer

Figures 45, 46:
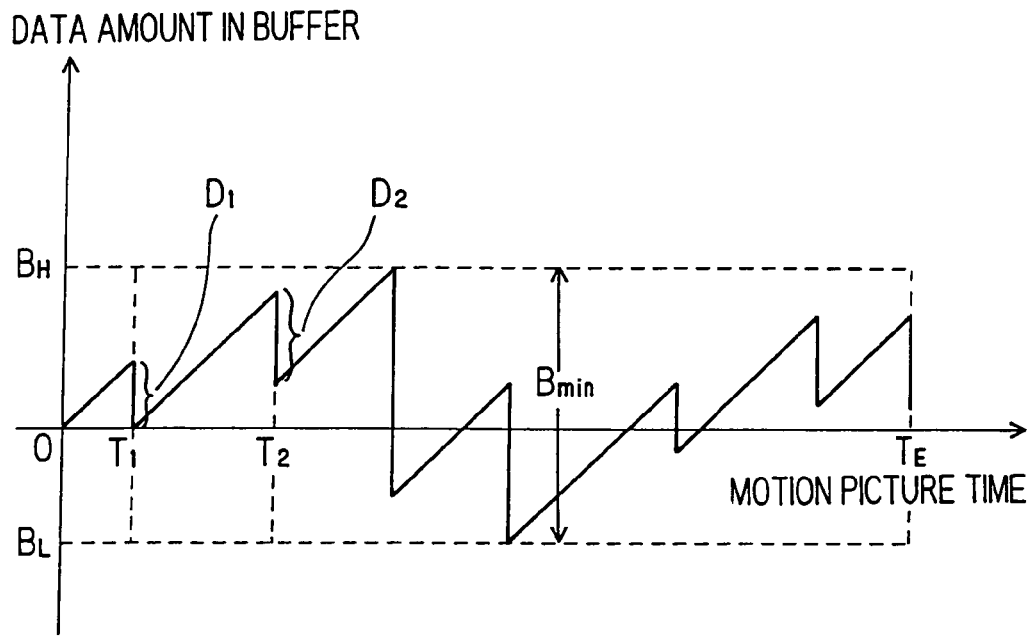
FIG. 45 is a view for explaining a variation example of a Vclick data amount in a buffer in a model 1 according to an embodiment of the invention.
FIG. 46 is a view for explaining a structure of a table equivalent to a graph of FIG. 45 according to an embodiment of the invention.

FIG. 45 shows an example of data amount variation in a buffer in accordance with the model 1. The horizontal axis of the drawing indicates a motion picture time, and the vertical axis indicates the data amount (of Vclick stream) in the buffer. In the model 1, data in the buffer is outputted from the buffer at once at a motion picture time when it is required. For example, since the size of data required at time $T_1$ is $D_1$, the data amount in the buffer at the time $T_1$ is decreased by $D_1$ at once. Similarly, at time $T_2$, data with a data size $D_2$ is outputted from the buffer. The times $T_1$ and $T_2$ correspond to the time stamps of the Vclick AU. All data of the Vclick AUs with the same time stamp are outputted from the buffer at the time of the time stamp. When there is no data output from the buffer, the data in the buffer is always increased at a rate r.

Reference characters $B_H$ and $B_L$ of the drawing denote a maximum value and a minimum value of the data amount in the buffer in the whole variation of the data amount. Reference character $B_{min}$ denotes a dynamic range of the data amount, and is calculated by $B_{min}=B_H-B_L$. In the model 1, the case where $B_L$ becomes smaller than 0 means that underflow occurs, and the Vclick data becomes insufficient for the moving image reproduction. In order not to cause the underflow in the case where $B_L$ is negative, the start of data input to the buffer is made earlier than the start of moving image reproduction, and the data amount in the buffer at the time of the start of the moving image reproduction is increased by $-B_L$. On the other hand, in the case where $B_H$ is larger than the actually used buffer size, it means that overflow occurs, and the Vclick data is dropped by data overflow. When $B_H$ becomes larger than the buffer size used, the data amount in the buffer at the time of the start of moving image reproduction is made smaller, so that the overflow can be prevented. However, in the case where $B_{min}$ is smaller than the buffer size used, it is impossible to avoid the underflow or overflow. Accordingly, it is important to calculate $B_{min}$.

(11-1-2) Calculation Method of $B_{min}$

In order to calculate $B_{min}$, first, the variation of the data amount in the buffer in the defined model 1 is expressed by a table of T, $B_B$ and $B_A$.

FIG. 46 shows the data amount variation of FIG. 45 by using a table. Reference character T denotes 0 and a time when data is outputted from the buffer, $B_B$ denotes the data amount in the buffer just before the data is outputted, and $B_A$ denotes the data amount in the buffer just after the data is outputted. Obviously, this table has the whole information of the graph of FIG. 45. For example, $B_{min}$ can be calculated from the maximum value of $B_B$ and the minimum value of $B_A$ of this table.

Figure 47:
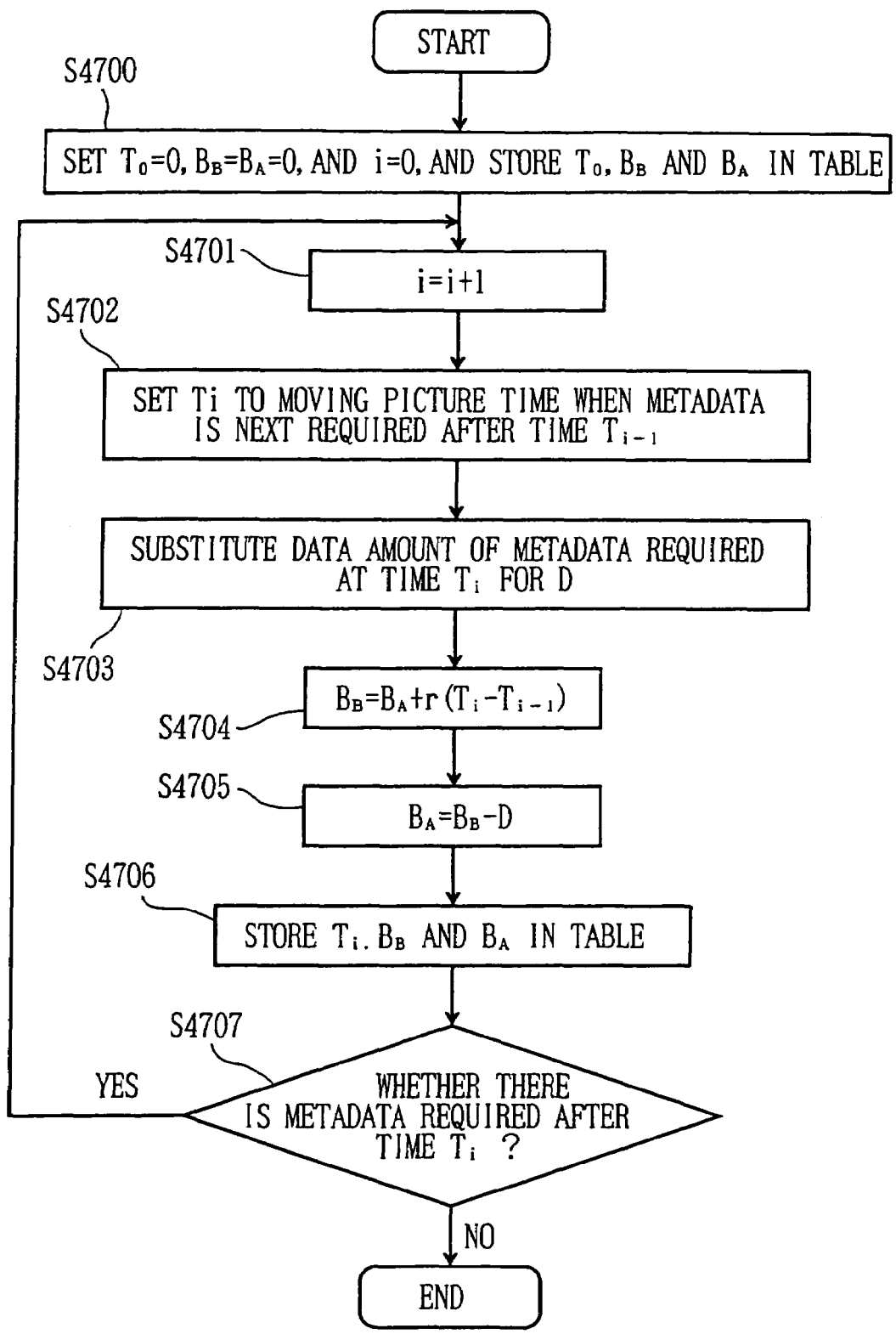
FIG. 47 is flowchart for explaining an example of a processing for calculating a dynamic range of the Vclick data amount in the buffer in the model 1 according to an embodiment of the invention.

The table can be created of the data transfer rate r of the minimum limit which can be ensured and the Vclick stream. FIG. 47 shows an example of a table creation algorism.

First, step S4700 as an initialization processing is performed. Here, initial value 0 is substituted for variables $T_0$, $B_B$ and $B_A$, and they are registered in the table. Besides, initial value 0 is also substituted for variable i. At step S4701, an increment processing to increase the variable i by 1 is performed.

At step S4702, time Ti when data is outputted from the buffer is set. This processing is performed in such a way that time stamps of the Vclick AU are sequentially checked, and a minimum time stamp among time stamps larger than $T_{i-1}$ is found and is set.

At step S4703, a size D of data outputted from the buffer at time $T_i$ is set. This is equal to the sum of sizes of all data of the Vclick AUs having the time stamp $T_i$.

At step S4704 and step S4705, values of $B_B$ and $B_A$ at Ti are calculated. A value $(B_A+r(T_i-T_{i-1}))$ becomes a new value of $B_B$, and a value $(B_B-D)$ becomes a new value of $B_A$. At step S4706, the calculated $T_i$, $B_B$ and $B_A$ are registered in the table.

At a branch processing of step S4707, the end of the processing is judged by judging whether or not the time stamp of the Vclick AU is maximum.

From the above processing, $B_{min}$ is calculated.

(11-1-3) Determination of Buffer Size

Figure 48:
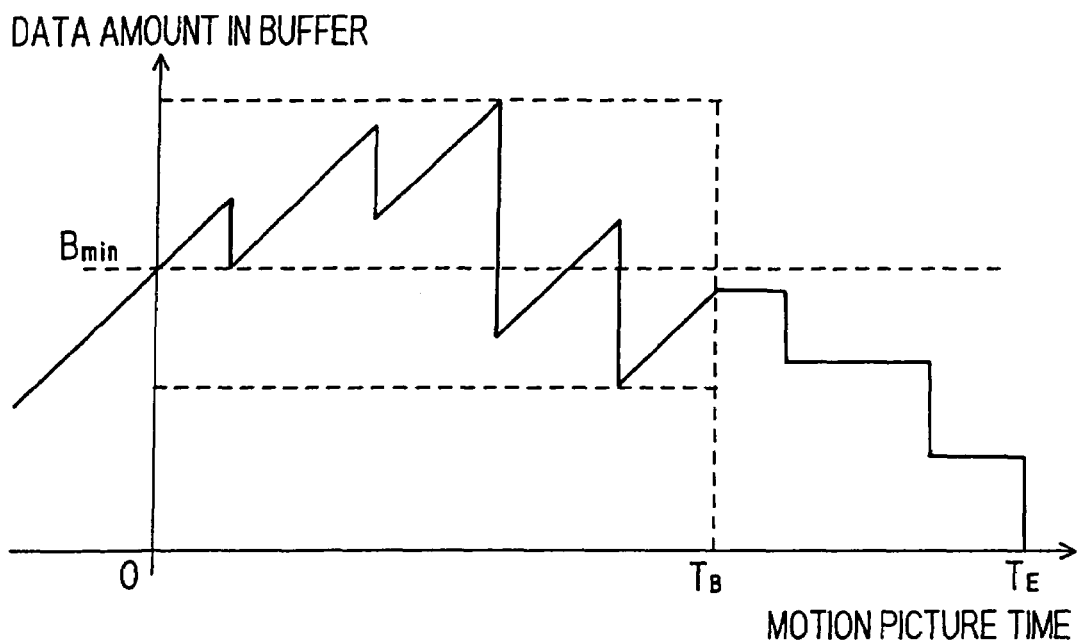
FIG. 48 is a view for explaining a variation example of a Vclick data amount in a buffer when reproduction is performed using the dynamic range calculated by the processing of FIG. 47 according to an embodiment of the invention.

When $B_{min}$ is calculated by the above processing, the buffer size at the time of the reproduction start is made $B_{min}$, so that the underflow can be certainly removed. When the data size in the buffer at the time of the moving image reproduction start is made $B_{min}$, the variation of FIG. 45 becomes variation as shown in FIG. 48. Time $T_E$ is a time when all data (Vclick stream) have been inputted to the buffer. Since the width of the variation of the data amount in the buffer from time 0 to $T_E$ is $B_{min}$ or less, it is sufficient if the buffer size is made $2 \times B_{min}$.

Figure 49:
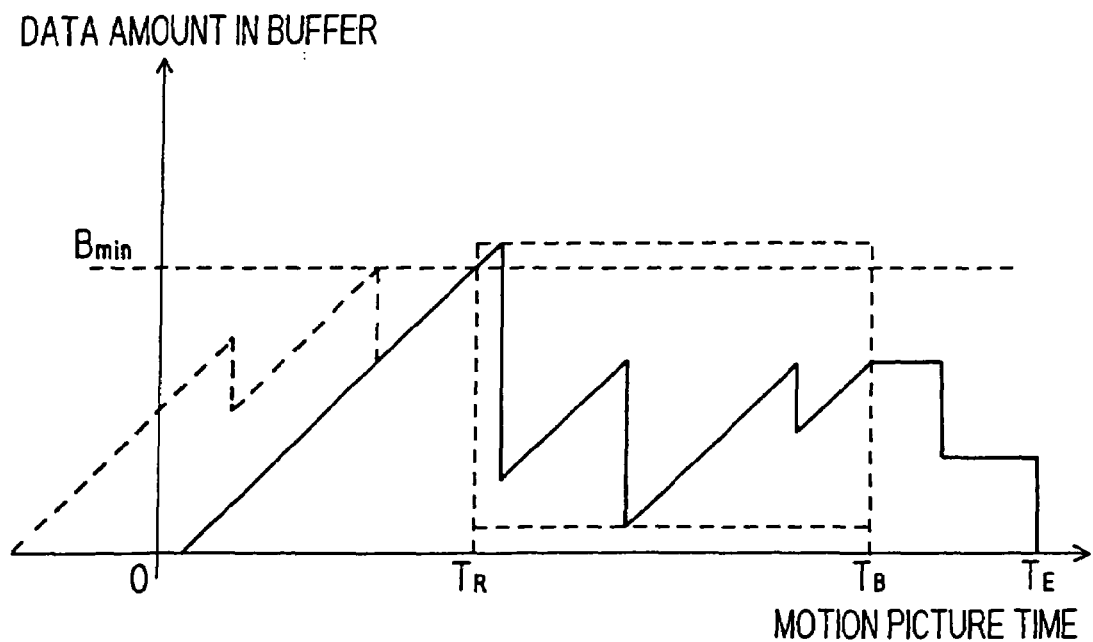
FIG. 49 is a view for explaining a variation example of a Vclick data amount in a buffer when random access reproduction is performed using the dynamic range calculated by the processing of FIG. 47 according to an embodiment of the invention.

The same applies to a case of random access. FIG. 49 shows an example of a case where the reproduction of a moving image is started from time $T_R$. Since the variation width of a buffer amount in a period from $T_R$ to $T_E$ is $B_{min}$ or less, when the data amount in the buffer at the time of the random access reproduction start is made $B_{min}$, the underflow does not occur. Besides, when the buffer size is made $2 \times B_{min}$ or more similarly to the above, the overflow does not occur.

From the above, when the reproduction (including the random access) is started after the data size in the buffer becomes $B_{min}$, and the buffer size is made $2 \times B_{min}$ or more, even in the state (model 1) in which the data transfer is in the most severe state, the moving image and the Vclick data can be reproduced without problem.

(11-2) Model (Model 2) in a Case where Stop/Resumption is Possible as Control of Data Input to Buffer Next, consideration will given to a model (model 2) in the case where it is possible to select r or 0 as a data transfer rate, that is, the case where stop/resumption is possible as the control of data input to the buffer. Since such control is possible in the case where data is read from a local disk, the model 2 is the model closer to the actual situation than the model 1. Even in the case where data is read through the network, when TCP/IP is used as the protocol, the model 2 is more appropriate than the model 1.

FIG. 50 shows an example of variation of a data amount in the buffer in the model 1 when Vclick data different from FIG. 45 is used. In FIG. 50, since the model 1 is assumed, the data is always inputted to the buffer at the data transfer rate r.

On the other hand, FIG. 51 shows a case where although the same Vclick data as FIG. 50 is used, the data input to the buffer is stopped during a period from time $T_M$ to $T_1$. In the case of FIG. 51, $B_{min}$ is obviously smaller than that in the case of FIG. 50. As stated above, since the value of $B_{min}$ in the model 2 can be made smaller than that in the model 1, a buffering time required before the start of the moving image reproduction becomes short, and a necessary buffer size also becomes small.

(11-2-1) Calculation Method of Minimum Dynamic Range $B_{min}$

Figure 52:
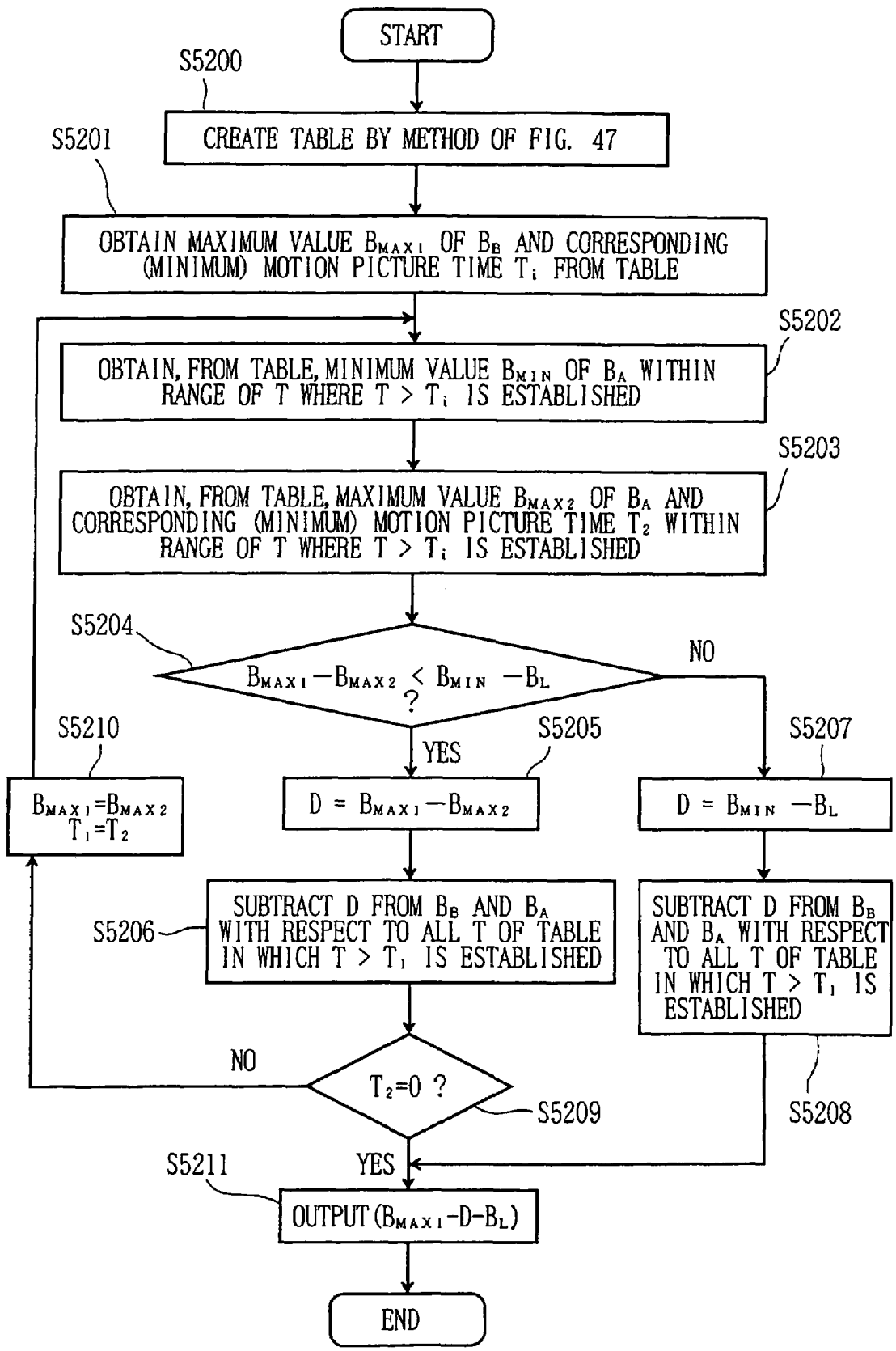
FIG. 52 is a flowchart for explaining an example of the processing of calculating the dynamic range of the Vclick data amount in the buffer in the model 2 according to an embodiment of the invention.

As the calculation of the minimum dynamic range $B_{min}$ in the model 2, for example, a processing shown in FIG. 52 can be used.

At first processing step S5200, a table of the data amount variation according to the model 1 is created by the method described in FIG. 47. FIG. 50 shows an example in which the created table is expressed in graph.

At next processing step S5201, a maximum value of $B_B$ is made $B_{MAX1}$, and a time when the maximum value $B_{MAX1}$ is given is made $T_1$. In the case where there are plural times when the maximum value is given, a minimum time thereof is made $T_1$.

Further, at step S5202, a minimum value of $B_A$ within a range of T in which $T \geq T_1$ is established is obtained and is made $B_{MIN}$. At step S5203, a maximum value within a range of T in which $T<T_1$ is established is obtained and is made $B_{MAX2}$, and a time at that time is made $T_2$. In the case where there are plural times when $B_{MAX2}$ is given within the range of $T<T_1$, a minimum time thereof is made $T_2$ (see FIG. 50).

In a branch processing of step S5204, a comparison is made between $(B_{MAX1}-B_{MAX2})$ and $(B_{MIN}-M_L)$. This is a processing to judge how much the data amount in the buffer after the time $T_1$ can be reduced, and in the example of FIG. 50, $D_1$ and $D_2$ in the drawing are compared with each other. When $(B_{MAX1}-B_{MAX2})$ is smaller, the procedure proceeds to step S5205, and in the other case, the procedure proceeds to step S5207.

At step S5205, $(B_{MAX1}-B_{MAX2})$ is substituted for a reduction data size D. At step S5206, D is subtracted from $B_A$ with respect to all data at T of the table in which $T \geqq T_1$ is established. The processing of step S5206 is equivalent to a case where data input to the buffer is stopped just before the time $T_1$, and the data amount in the buffer after the time $T_1$ is reduced (see FIG. 51). In the table after this processing, the dynamic range becomes minimum in the data range after the time $T_2$. Because, as is apparent from FIG. 51, the maximum value of the data amount in the buffer is always given in the section of data transfer rate 0 (data input to the buffer is stopped), and when the transfer rate in this section is made r, the maximum value is increased. On the contrary, when the section in which the transfer rate is r is changed so that its transfer rate is 0, the minimum value of the data amount in the buffer is further decreased, and the dynamic range is increased. This is the basis on which the minimum dynamic range $B_{min}$ of FIG. 52 can be calculated by the processing of FIG. 52.

In the case where the processing proceeds to step S5207 at the branch of step S5204, first, at step S5207, the reduction data size D is set to $(B_{MIN}-B_L)$. Similarly to step S5206, with respect to all data at T in the table in which $T \geqq T1$ is established, a processing of subtracting D from $B_A$ is performed.

After the processing of step S5206 is performed, at step S5209, it is judged whether or not the processing from step S5202 is repeatedly performed. However, in the case where the processing of step S5208 is performed, $B_{min}$ is immediately calculated and outputted at step S5211, and the processing is ended. This is because the table for giving the minimum dynamic range is completed after step S5208.

At step S5209, it is checked whether or not $T_2$ is 0, and if not 0, the procedure proceeds to step S5210 in order to repeat the processing. At step S5210, an update processing of variables is performed, $B_{MAX2}$ is substituted for $B_{MAX1}$, and $T_2$ is substituted for $T_1$, and the procedure proceeds to step S5202 again.

Figure 53:
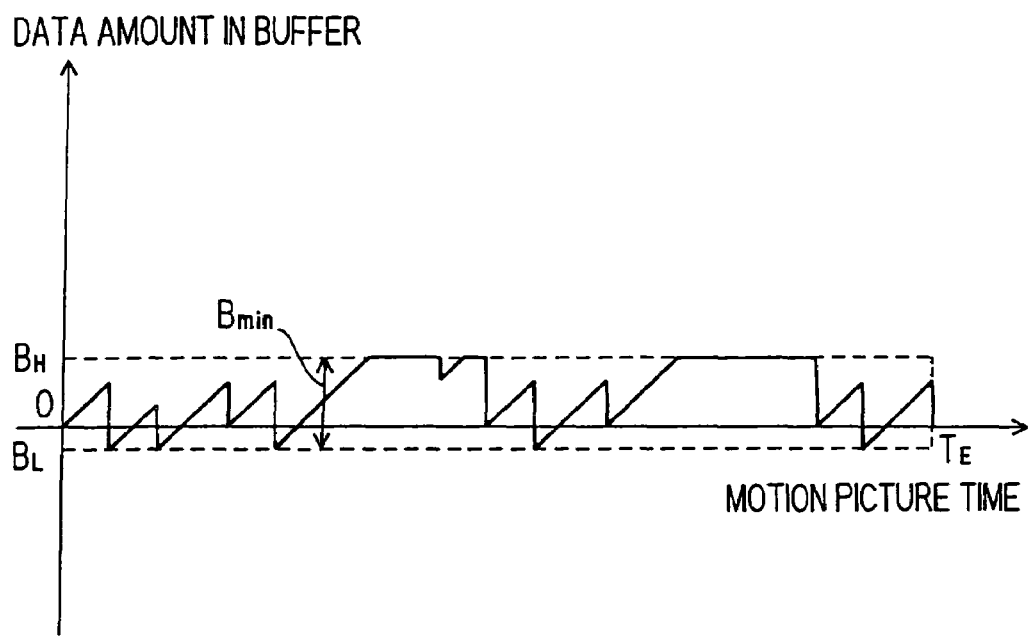
FIG. 53 is a view for explaining a variation example of the Vclick data amount in the buffer at a time point when the processing of FIG. 52 according to an embodiment of the invention is ended.

At step S5211, the value of the minimum dynamic range $B_{min}$ in the model 2 is calculated as $(B_{MAX1}-D-B_L)$, and the processing is ended. FIG. 53 is a graph of the data amount variation in the buffer after the processing of FIG. 52 is ended. It is understood that the far small $B_{min}$ is obtained as compared with FIG. 50.

By the above processing, the dynamic range $B_{min}$ is calculated.

(11-2-2) Determination of Buffer Size

When the dynamic range $B_{min}$ calculated by the above processing is found, the data amount in the buffer necessary at the time of the moving image reproduction and the necessary size of the buffer can be found.

That is, in the model 2, when the reproduction is started after the data amount in the buffer becomes $B_{min}$, it is ensured that the underflow does not occur. Besides, when the buffer size is made $B_{min}$ or more, the overflow also does not occur.

Figure 54:
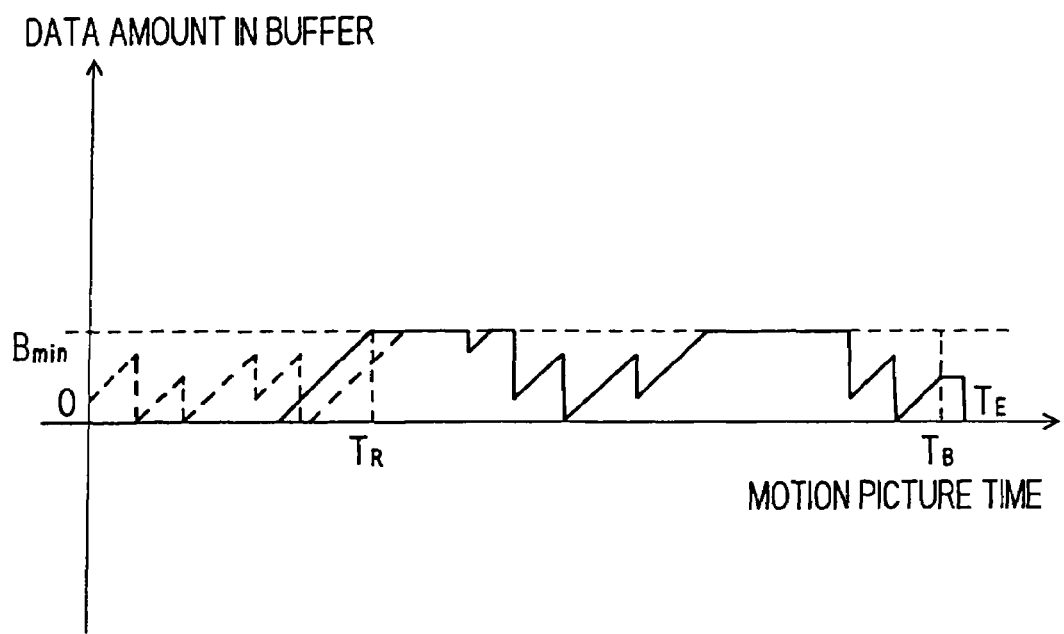
FIG. 54 is a view for explaining a variation example of a Vclick data amount in a buffer at a time when random access reproduction is performed using the dynamic range calculated by the processing of FIG. 52 according to an embodiment of the invention.

FIG. 54 shows variation of the data amount in the buffer when random access reproduction is performed from time $T_R$. When the reproduction is started at the time point when the data amount in the buffer becomes $B_{min}$, similarly to the above, it is ensured that the buffer underflow does not occur.

Similarly, also with respect to the buffer size, when it is made $B_{min}$ or more, it is ensured that the overflow does not occur.

The model 2 is the model in which it is possible to select r or 0 as the transfer rate. However, even in the case where not less than r or 0 can be selected as the transfer rate, when the data amount in the buffer at the time of the moving image reproduction start set by using the model 2 and the buffer size are used, the underflow or the overflow does not occur. Since the transfer rate of the network is actually varied, the model in which not less than r or 0 can be selected as the transfer rate is almost the same as the actual operation. Accordingly, the data amount to be buffered at the start of the moving image reproduction set by using the model 2 and the buffer size can be used in an actual application.

(11-3) Data Structure of Header of Vclick Stream

FIG. 55 shows a data structure of a header of a Vclick stream which enables the dynamic range $B_{min}$ calculated with the model 1 or the model 2 to be used in the system of FIG. 2.

In the data structure of FIG. 55, in addition to the data structure of FIG. 11, "min_buffer" is newly added. The value of $B_{min}$ calculated using the model 1 or the model 2 is stored in "min_buffer". As to which of the dynamic ranges $B_{min}$ calculated with the models should be adopted, a judgment is made according to which model is closer to the use state. In the case where it is hard to distinguish between the models, or various use environments are conceivable, it is better to adopt the value calculated with the model 1.

Incidentally, in order to specify which of the two models was used to calculate the value stored in "min_buffer", a flag buffer_model to specify the model may be added to the data structure of FIG. 55. For example, when the flag is set so as to mean that the model 1 is adopted when "buffer-model" is 0, and the model 2 is adopted when "buffer_model" is 1, it is possible to identify the model.

(11-4) Procedure of Buffer Control

FIG. 56 shows a procedure of buffer control in the case where the data of FIG. 55 is used.

First, at step S5600, the buffer manager 211 allocates, in the buffer 209, an area with a size of "min_buffer" or more (in the case where the model 2 is used) as the buffer for Vclick or a size two or more times as large as "min_buffer" (in the case where the model 1 is used). Then, reading of the Vclick data into the buffer is started. Subsequently, at step S5601, the reproduction of the moving image and the Vclick data is started after the size of the Vclick data stored in the buffer 209 becomes "min_buffer". At step S5602, when a space occurs in the buffer, the Vclick data is read in the buffer, and when the buffer becomes full, the reading of the Vclick data is stopped. When the Vclick data to be read runs short, the processing is ended (S5603). By the above control, simultaneous reproduction of the Vclick data and the moving image becomes possible without causing the buffer underflow or overflow. Of course, a value larger than the dynamic range may be described in "min_buffer". In this case, although the buffer size more than necessary is allocated, there is no problem in operation.

(11-5) Another Data Structure of Header of Vclick Stream

FIG. 57 shows a data structure of a header of a Vclick stream different from FIG. 55.

In this example, the dynamic range $B_{min}$ calculated with the model 1 is described in "min_buffer__1", and the dynamic range $B_{min}$ calculated with the model 2 is described in "min_buffer__2".

In the client apparatus 200, according to the use state of the Vclick data, it is judged which of "min_buffer__1" and "min- _buffer_2" is to be used. For example, in the case where the Vclick data is received from the server apparatus 201 by the RTP protocol based on UDP/IP, buffer control is performed using "min_buffer_1" which is the dynamic range calculated with the model 1. That is, in the buffer 209, an area with a size two or more times as large as "min_buffer_1" is allocated as the buffer for Vclick, and when the reproduction of the moving image is start, the control is made so that the reproduction is started after the size of the Vclick data stored in the buffer 209 becomes "min_buffer_1".

On the other hand, in the case where the Vclick data is received by the HTTP protocol based on TCP/IP from the server apparatus 201, the buffer control is performed using "min_buffer_2" which is the dynamic range calculated with the model 2. That is, in the buffer 209, an area with a size of "min_buffer_2" or more is allocated as the buffer for Vclick, and when the reproduction of the moving image is started, the control is performed so that the reproduction is started after the size of the Vclick data stored in the buffer 209 becomes "min_buffer_2". Similarly to the data structure of FIG. 55, a value larger than the dynamic range $B_{min}$ calculated with the model 1 or the model 2 may be described in "min_buffer_1" or "min_buffer_2".

(11-6) First Reproduction Start Processing Procedure

FIG. 58 is a flowchart showing a first reproduction start processing procedure from user's instruction of a reproduction start to the reproduction start, and the basic flow is the same as the procedure shown in FIG. 37.

First, at step S3700, the instruction of the reproduction start is inputted by the user. The interface handler 207 receives this input and issues an instruction of a moving image reproduction preparation to the moving image reproduction controller 205.

Next, the area with the size of "min_buffer" or more is allocated as the buffer for Vclick in the buffer 209 described above.

As a branch processing step S3701, a judgment is made as to whether or not a session with the server apparatus 201 has already been configured. When the session has not been configured, the processing proceeds to step S3702, and when the session has been already configured, the processing proceeds to step S3703. At step S3702, a processing of configuring the session between the server and the client is performed.

In the following processings of S3703 to S3705, the moving image reproduction is performed with the contents explained in FIG. 37.

(11-7) Second Reproduction Start Processing Procedure

Figure 59:
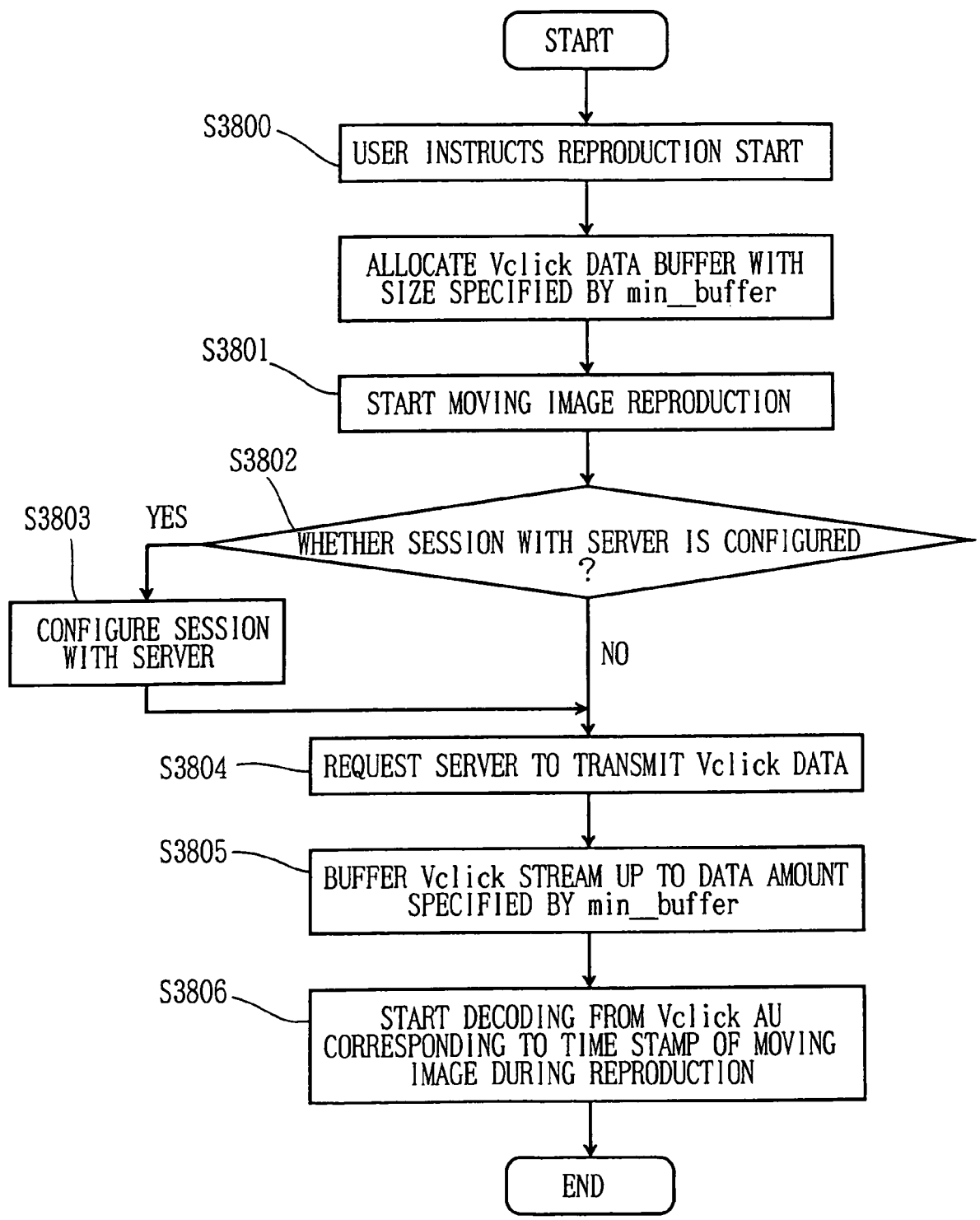
FIG. 59 is a flowchart showing a second reproduction start processing procedure from a time when a user instructs a reproduction start to a time when the reproduction is started according to an embodiment of the invention.

FIG. 59 is a flowchart for explaining a reproduction start processing procedure different from FIG. 58.

In the processing explained in the flowchart of FIG. 58, according to the state of the network or the processing capacity of the server and the client apparatus, there is a case where it takes much time to perform a processing of buffering a fixed amount of Vclick stream at step S3704. That is, there is a case where it take much time from a time when the user instructs reproduction to a time when the reproduction is actually started.

In the processing procedure of FIG. 59, the user instructs a reproduction start at step S3800.

Next, an area with a size of "min_buffer" or more is allocated as a buffer for Vclick in the buffer 209 described above.

At next step S3801, the reproduction of the moving image is immediately started. Processings from next step S3802 to step S3806 are the same as the processings from step S3702 to step S3706 of FIG. 38.

(11-8) Third Reproduction Start Processing Procedure

Figure 60:
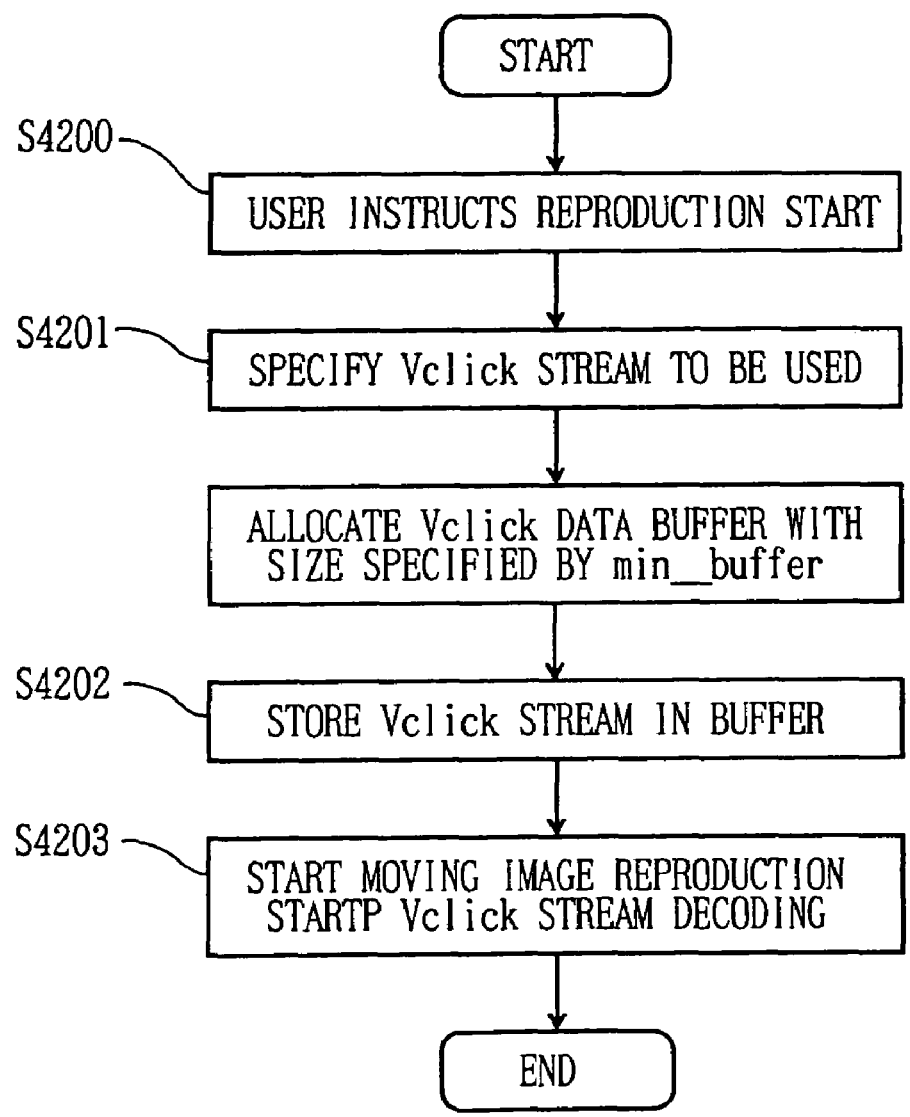
FIG. 60 is a flowchart showing a third reproduction start processing procedure from a time when a user instructs a reproduction start to a time when the reproduction is started according to an embodiment of the invention.

FIG. 60 is a flowchart showing a reproduction start processing procedure from user's instruction of a reproduction start to the reproduction start, and the basic flow is the same as the procedure shown in FIG. 47.

First, at step S4200, the instruction of the reproduction start is inputted by the user. The interface handler 207 receives this input, and issues an instruction of a moving image reproduction preparation to the moving image reproduction controller 205.

Next, at step S4201, a processing of specifying a Vclick stream to be used is performed. In this processing, the interface handler refers to the Vclick information on the moving image data recording medium 231, and specifies the Vclick stream corresponding to the moving image whose reproduction is instructed by the user.

Next, an area with a size of "min_buffer" or more is allocated as a buffer for Vclick in the buffer 209 described above.

At step S4202, a processing of storing the Vclick stream in the buffer is performed.

In the following processing of S4203, the moving image reproduction is performed with the content explained in FIG. 37.

(11-9) Fourth Reproduction Start Processing Procedure

FIG. 61 is a flowchart for explaining a reproduction processing procedure different from FIG. 60.

In the processing explained in the flowchart of FIG. 60, according to the state of the network and the processing capacity of the server and the client apparatus, there is a case where it takes much time to perform a processing of buffering a fixed amount of Vclick. That is, there is a case where it takes much time from a time when the user instructs the reproduction to a time when the reproduction is actually started.

In the processing procedure of FIG. 61, at step S4200, the user instructs a reproduction start.

At next step, the reproduction of the moving image is immediately started.

Next, at step S4201, a processing of specifying the Vclick stream to be used is performed. In this processing, the interface handler refers to the Vclick information file on the moving image data recording medium 231, and specifies the Vclick stream corresponding to the moving image whose reproduction is instructed by the user.

Next, an area with a size of "min_buffer" or more is allocated as a buffer for Vclick in the buffer 209 described above.

In the following processing, the moving image reproduction is performed with the content explained in FIG. 37.

MODIFIED EXAMPLE

Incidentally, the present invention is not strictly limited to the foregoing embodiments, and at a practical stage, the structural elements can be variously modified and can be embodied within the scope not departing from the gist of the invention.

(1) Modified Example 1

For example, the invention can be applied to not only a DVD-ROM video popular on a global scale at present, but also a recordable/reproducible DVD-VR (video recorder) whose demand is rapidly increased in recent years. Further, the invention can also be applied to a reproduction system or a recording system of a next generation HD-DVD which appears to become popular in near future.

(2) Modified Example 2

By suitably combining the plural structural elements disclosed in the embodiment, various inventions can be structured. For example, some structural elements may be deleted from all structural elements disclosed in the embodiment. Further, structural elements of different embodiments may be suitably combined.

What is claimed is:

1. A reproduction method of metadata which is relevant to a moving image and is temporarily stored in a buffer until the metadata is reproduced,
    wherein the metadata has a stream data structure including one or plural access units each access unit being a data unit which can be independently processed,
    wherein said each access unit of the access units comprises:
    first data to specify an effective period defined with respect to a time axis of the moving image;
    object area data describing a spatio-temporal region in the moving image;
    second data including one of or both of data to specify a display method relevant to the spatio-temporal region and data to specify a processing to be performed when the spatio-temporal region is specified; and
    third data including information to specify an amount of metadata to be previously stored in the buffer before a reproduction start time of the metadata in order to prevent underflow and overflow from the buffer, wherein the metadata is inputted to the buffer at a constant rate; and
    the third data is a dynamic range in a case where the metadata is outputted from the buffer in units of the access unit at a start time of the effective period of the access unit, and
    wherein the reproduction method comprises:
    storing the metadata amount in the buffer on a basis of the third data in a case where a reproduction instruction of the metadata is issued; and
    reproducing the metadata after storage of the metadata amount.

2. A reproduction method of metadata which is relevant to a moving image and is temporarily stored in a buffer until the metadata is reproduced,
    wherein the metadata has a stream data structure including one or plural access units each access unit being a data unit which can be independently processed,
    wherein said each access unit of the access units comprises:
    first data to specify an effective period defined with respect to a time axis of the moving image;
    object area data describing a spatio-temporal region in the moving image;
    second data including one of or both of data to specify a display method relevant to the spatio-temporal region and data to specify a processing to be performed when the spatio-temporal region is specified; and
    third data including information to specify an amount of metadata to be previously stored in the buffer before a reproduction start time of the metadata in order to prevent underflow from the buffer,
    wherein a selection is made at any time as to whether the metadata is inputted to the buffer at a constant rate or input is stopped; and
    the third data is a minimum dynamic range in a case where the metadata is outputted from the buffer in units of the access unit at a start time of the effective period of the access unit, and
    wherein the reproduction method comprises:
    storing the metadata amount in the buffer on a basis of the third data in a case where a reproduction instruction of the metadata is issued; and
    reproducing the metadata after storage of the metadata amount.

3. A reproduction method of metadata which is relevant to a moving image and is temporarily stored in a buffer until the metadata is reproduced,
    wherein the metadata has a stream data structure including one or plural access units each access unit being a data unit which can be independently processed,
    wherein said each access unit of the access units comprises:
    first data to specify an effective period defined with respect to a time axis of the moving image;
    object area data describing a spatio-temporal region in the moving image;
    second data including one of or both of data to specify a display method relevant to the spatio-temporal region and data to specify a processing to be performed when the spatio-temporal region is specified; and
    third data including information to specify an amount of metadata to be previously stored in the buffer before a reproduction start time of the metadata in order to prevent underflow and overflow from the buffer,
    wherein the third data includes both a dynamic range in a case where the metadata is outputted from the buffer in units of the access unit at a start time of the effective period of the access unit in case that the metadata is inputted to the buffer at a constant rate, and a minimum dynamic range in a case where the metadata is outputted from the buffer in units of the access unit at a start time of the effective period of the access unit in case that a selection is made at any time as to whether the metadata is inputted to the buffer at a constant rate or input is stopped, and
    wherein the reproduction method comprises:
    storing the metadata amount in the buffer on a basis of the third data in a case where a reproduction instruction of the metadata is issued; and
    reproducing the metadata after storage of the metadata amount.

4. A recording medium having stored therein a reproduction program for causing a computer to realize a reproduction method of metadata which is relevant to a moving image and is temporarily stored in a buffer until the metadata is reproduced,
    wherein the metadata has a stream data structure including one or plural access units each access unit being a data unit which can be independently processed,
    wherein said each access unit of the access units comprises:
    first data to specify an effective period defined with respect to a time axis of the moving image;
    object area data describing a spatio-temporal region in the moving image;
    second data including one of or both of data to specify a display method relevant to the spatio-temporal region and data to specify a processing to be performed when the spatio-temporal region is specified; and
    third data including information to specify an amount of metadata to be previously stored in the buffer before a reproduction start time of the metadata in order to prevent underflow and overflow from the buffer, wherein the metadata is inputted to the buffer at a constant rate, and the third data is a dynamic range in a case where the metadata is outputted from the buffer in units of the access unit at a start time of the effective period of the access unit, wherein the computer realizes:

storing the metadata amount in the buffer on a basis of the third data in a case where a reproduction instruction of the metadata is issued; and reproducing the metadata after storage of the metadata amount.

5. A recording medium having stored therein a reproduction program for causing a computer to realize a reproduction method of metadata which is relevant to a moving image and is temporarily stored in a buffer until the metadata is reproduced, wherein the metadata has a stream data structure including one or plural access units each access unit being a data unit which can be independently processed, wherein said each access unit of the access units comprises:

first data to specify an effective period defined with respect to a time axis of the moving image;

object area data describing a spatio-temporal region in the moving image;

second data including one of or both of data to specify a display method relevant to the spatio-temporal region and data to specify a processing to be performed when the spatio-temporal region is specified; and third data including information to specify an amount of metadata to be previously stored in the buffer before a reproduction start time of the metadata in order to prevent underflow from the buffer, wherein a selection is made at any time as to whether the metadata is inputted to the buffer at a constant rate or input is stopped; and the third data is a minimum dynamic range in a case where the metadata is outputted from the buffer in units of the access unit at a start time of the effective period of the access unit, and wherein the computer realizes:

storing the metadata amount in the buffer on a basis of the third data in a case where a reproduction instruction of the metadata is issued; and reproducing the metadata after storage of the metadata amount.

6. A recording medium having stored therein a reproduction program for causing a computer to realize a reproduction method of metadata which is relevant to a moving image and is temporarily stored in a buffer until the metadata is reproduced, wherein the metadata has a stream data structure including one or plural access units each access unit being a data unit which can be independently processed, wherein said each access unit of the access units comprises:

first data to specify an effective period defined with respect to a time axis of the moving image;

object area data describing a spatio-temporal region in the moving image;

second data including one of or both of data to specify a display method relevant to the spatio-temporal region and data to specify a processing to be performed when the spatio-temporal region is specified; and third data including information to specify an amount of metadata to be previously stored in the buffer before a reproduction start time of the metadata in order to prevent underflow and overflow from the buffer, wherein the third data includes both a dynamic range in a case where the metadata is outputted from the buffer in units of the access unit at a start time of the effective period of the access unit in case that the metadata is inputted to the buffer at a constant rate, and a minimum dynamic range in a case where the metadata is outputted from the buffer in units of the access unit at a start time of the effective period of the access unit in case that a selection is made at any time as to whether the metadata is inputted to the buffer at a constant rate or input is stopped, and wherein the computer realizes:

storing the metadata amount in the buffer on a basis of the third data in a case where a reproduction instruction of the metadata is issued; and reproducing the metadata after storage of the metadata amount.

* * * * *